(12) United States Patent
Uluakar et al.

(10) Patent No.: US 7,191,188 B2
(45) Date of Patent: Mar. 13, 2007

(54) METHOD AND APPARATUS FOR CREATING AN ADAPTIVE APPLICATION

(75) Inventors: Tamer Uluakar, Plainsboro, NJ (US);
John Bartholomew Pettit, III, Westfield, NJ (US); Lutfu Batakci, Middletown, PA (US); Bulent Kivanc, Bethlehem, PA (US); Govindaraj Kadambi, Belle Mead, NJ (US); Christopher Fredrick Merkel, Bethlehem, PA (US)

(73) Assignee: Adaptik Corporation, Westfield, NJ (US)

(*) Notice: Subject to any disclaimer, the term of this patent is extended or adjusted under 35 U.S.C. 154(b) by 7 days.

(21) Appl. No.: 10/835,640

(22) Filed: Apr. 30, 2004

(65) Prior Publication Data

US 2004/0210557 A1 Oct. 21, 2004

Related U.S. Application Data

(62) Division of application No. 10/173,145, filed on Jun. 17, 2002, now Pat. No. 6,895,409.

(51) Int. Cl.
*G06F 17/30* (2006.01)

(52) U.S. Cl. .................................. 707/102

(58) Field of Classification Search ..... 707/100–104.1, 707/1; 717/107, 162–165; 719/331, 332
See application file for complete search history.

(56) References Cited

U.S. PATENT DOCUMENTS

| | | | | |
|---|---|---|---|---|
| 5,812,849 A | * | 9/1998 | Nykiel et al. | 707/100 |
| 5,918,010 A | * | 6/1999 | Appleman et al. | 709/203 |
| 5,960,200 A | * | 9/1999 | Eager et al. | 717/147 |
| 6,016,394 A | | 1/2000 | Walker | 395/701 |
| 6,029,174 A | * | 2/2000 | Sprenger et al. | 707/103 R |
| 6,167,564 A | * | 12/2000 | Fontana et al. | 717/104 |
| 6,314,555 B1 | * | 11/2001 | Ndumu et al. | 717/101 |
| 6,513,152 B1 | * | 1/2003 | Branson et al. | 717/100 |
| 6,542,899 B1 | * | 4/2003 | Saulpaugh et al. | 707/100 |
| 6,684,369 B1 | * | 1/2004 | Bernardo et al. | 715/513 |
| 6,854,086 B2 | * | 2/2005 | Umen et al. | 707/1 |

FOREIGN PATENT DOCUMENTS

EP 371941 A2 * 6/1990

* cited by examiner

*Primary Examiner*—Jack M. Choules
(74) *Attorney, Agent, or Firm*—Michael P. Fortkort

(57) ABSTRACT

An Adaptive Software Application consists of several types of modules, called Adaptive Units, which are highly parameterized such that they can adapt to varying business requirements by virtue of externally provided parameters. An Adaptive Application is assembled through repeated use of various combinations of different types of Adaptive Units. Large and complex business systems can be rapidly implemented through this approach. An Adaptive Unit includes an interface component that can present information to and accept information from the outside world (such as a web page or a system interface), a processing logic component that can manipulate and evaluate information based on received parameters received (such as comparisons and decisions as in the case of data dependency decisions), and a data persistence logic component that retrieves, adds, updates, and deletes data targeting one or more Occurrence Databases. All three components of an Adaptive Unit are parameter driven. These parameters are not specific to any particular business. One embodiment for providing parameters to these components includes a Definition Database. There may be one or more Occurrence Databases depending on the number of business processes supported by the business application for which the Adaptive Application is being adapted. The Occurrence Database includes generic (also referred to as meta model driven) tables that are not specific to any particular business.

2 Claims, 54 Drawing Sheets

Events & Properties By Adaptive Unit

Adaptive Unit: LIST
Events: Load, View/Edit, Add, Delete
Properties: ViewName, DetailTarget, OccurenceId, ProductId

Adaptive Unit: DETAIL
Events: Load, New, Continue, Submit
Properties: ViewName, OccurrenceId, ProductId, SegmentNo

Adaptive Unit: UPDATEABLE LIST
Events: Load, Add Row, Delete Row, Submit
Properties: ListViewName, DetailViewname, OccurrenceId, ProductId

Adaptive Unit: DUAL LIST
Events: Load, View/Edit, Add >>, <<Remove
Properties: LeftViewName, RightViewName, DetailTarget, LinkedEntity, LinkedQuestion, OccurrenceId, ProductId

FIG 5

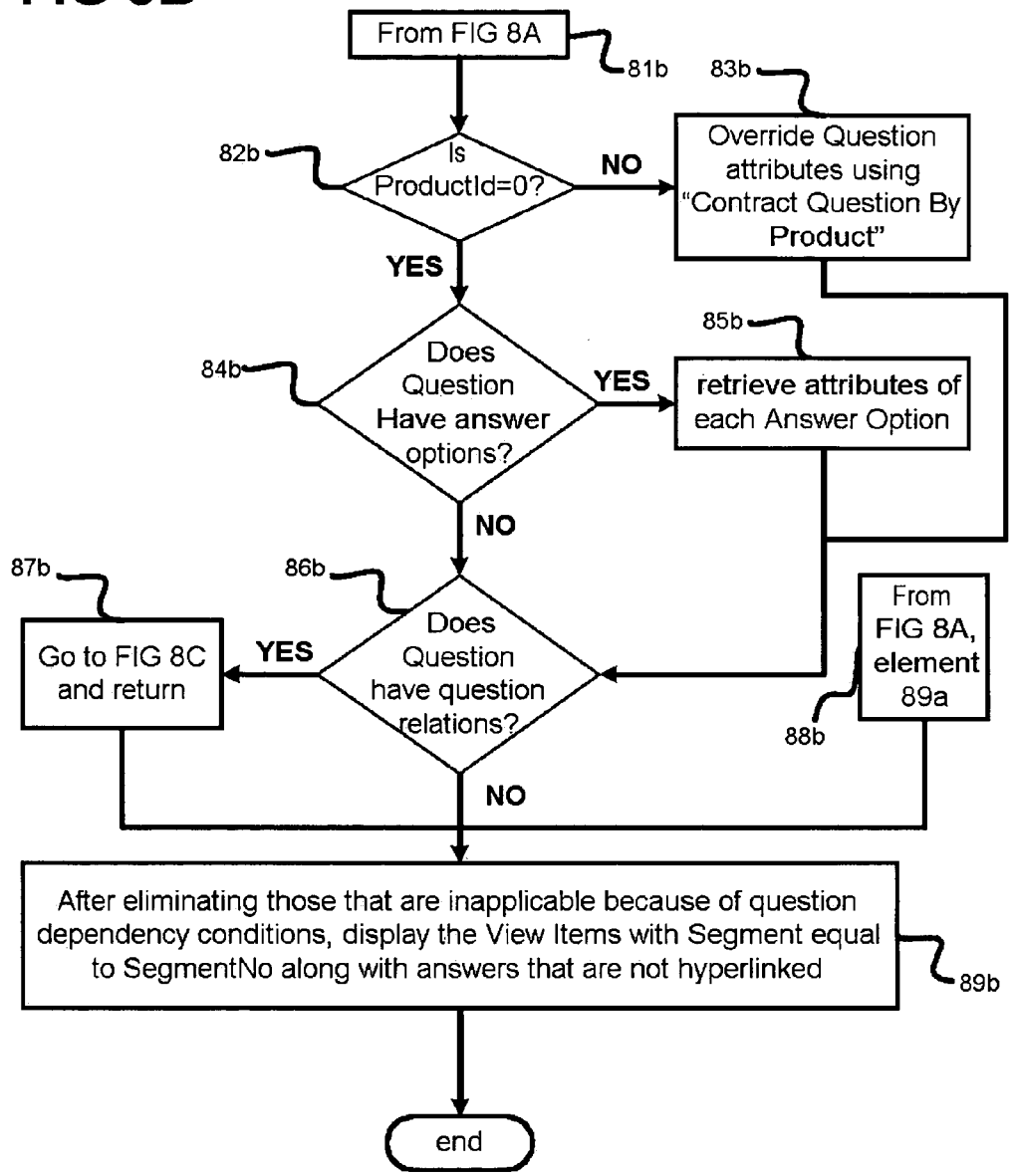

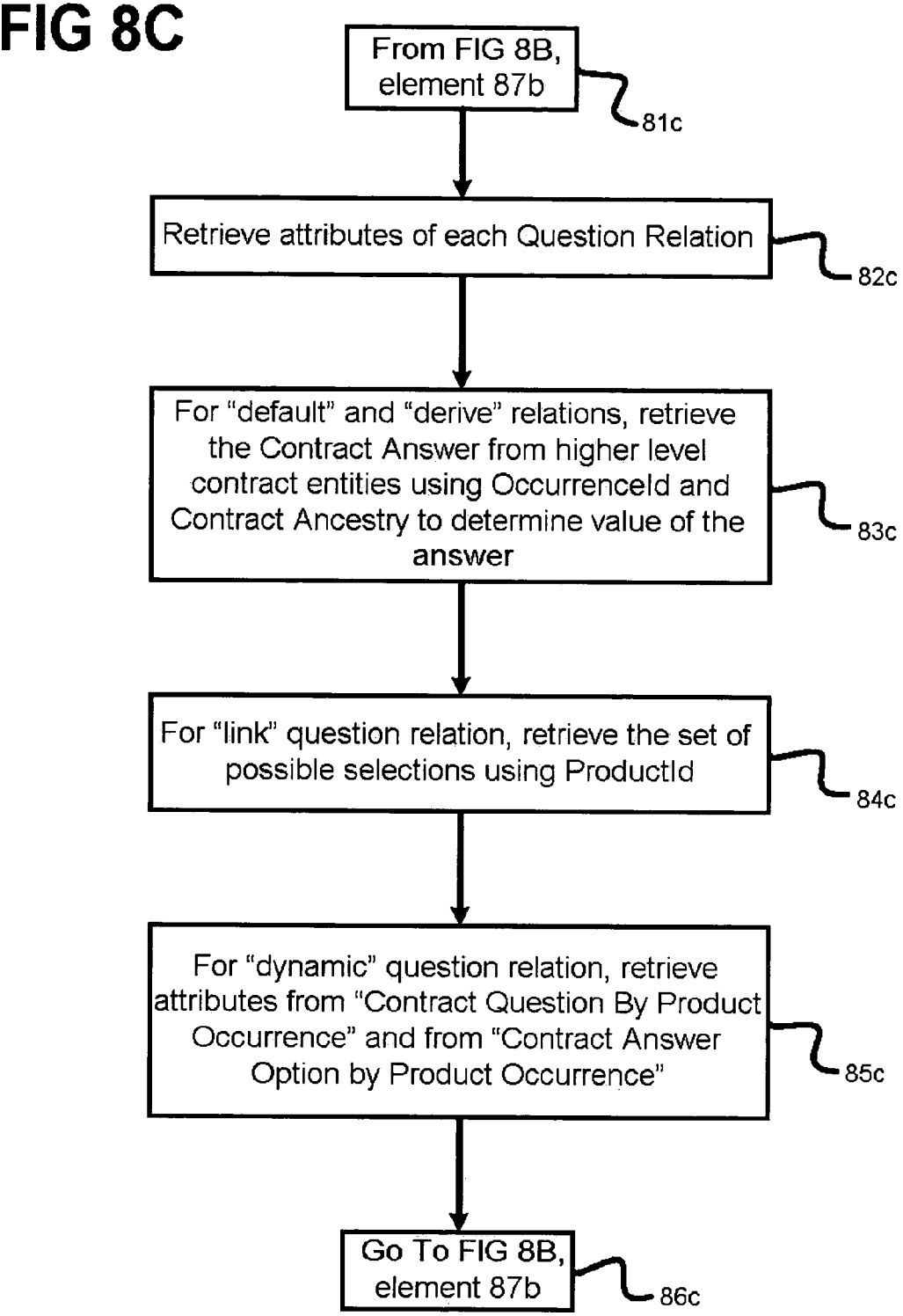

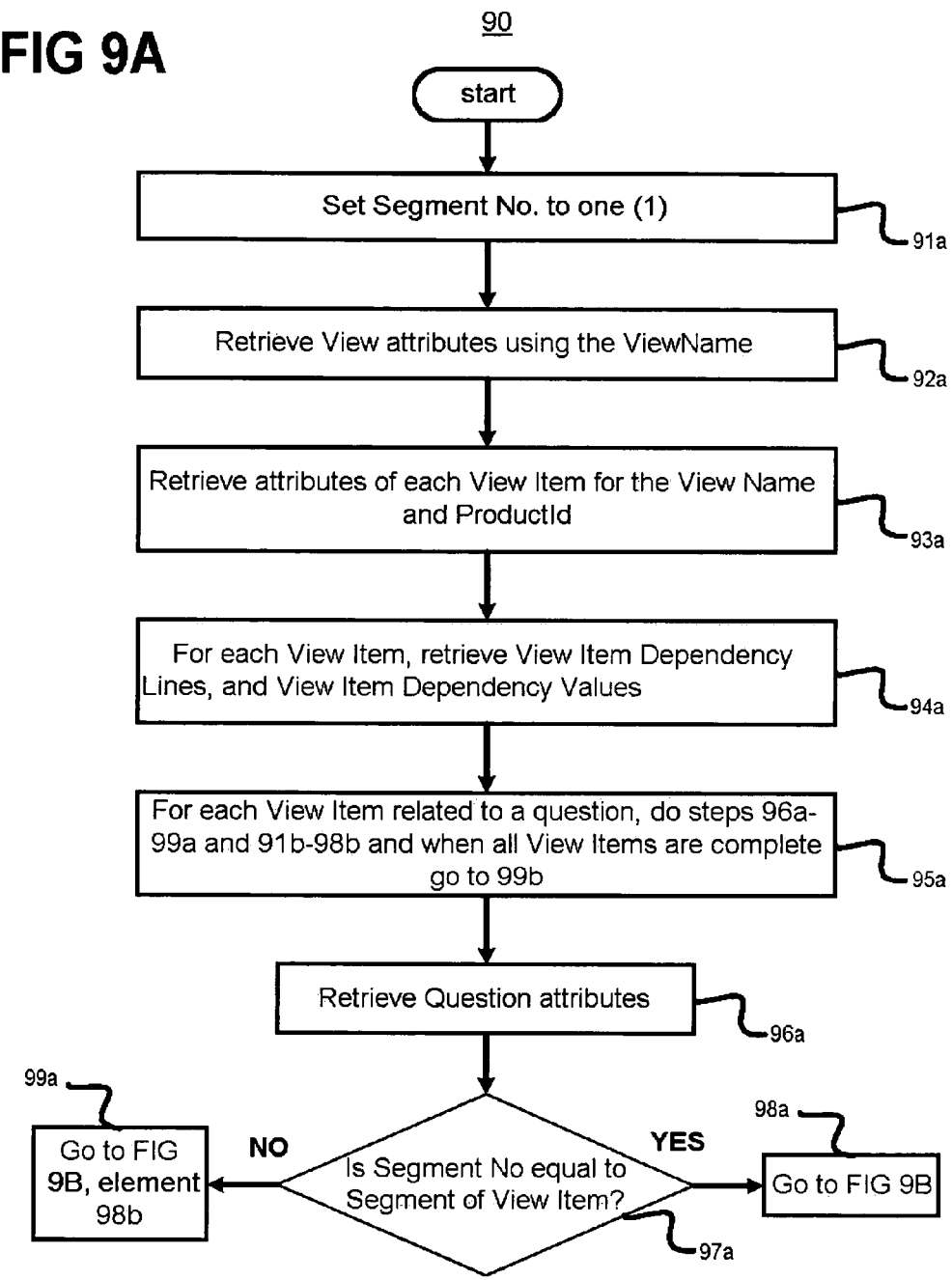

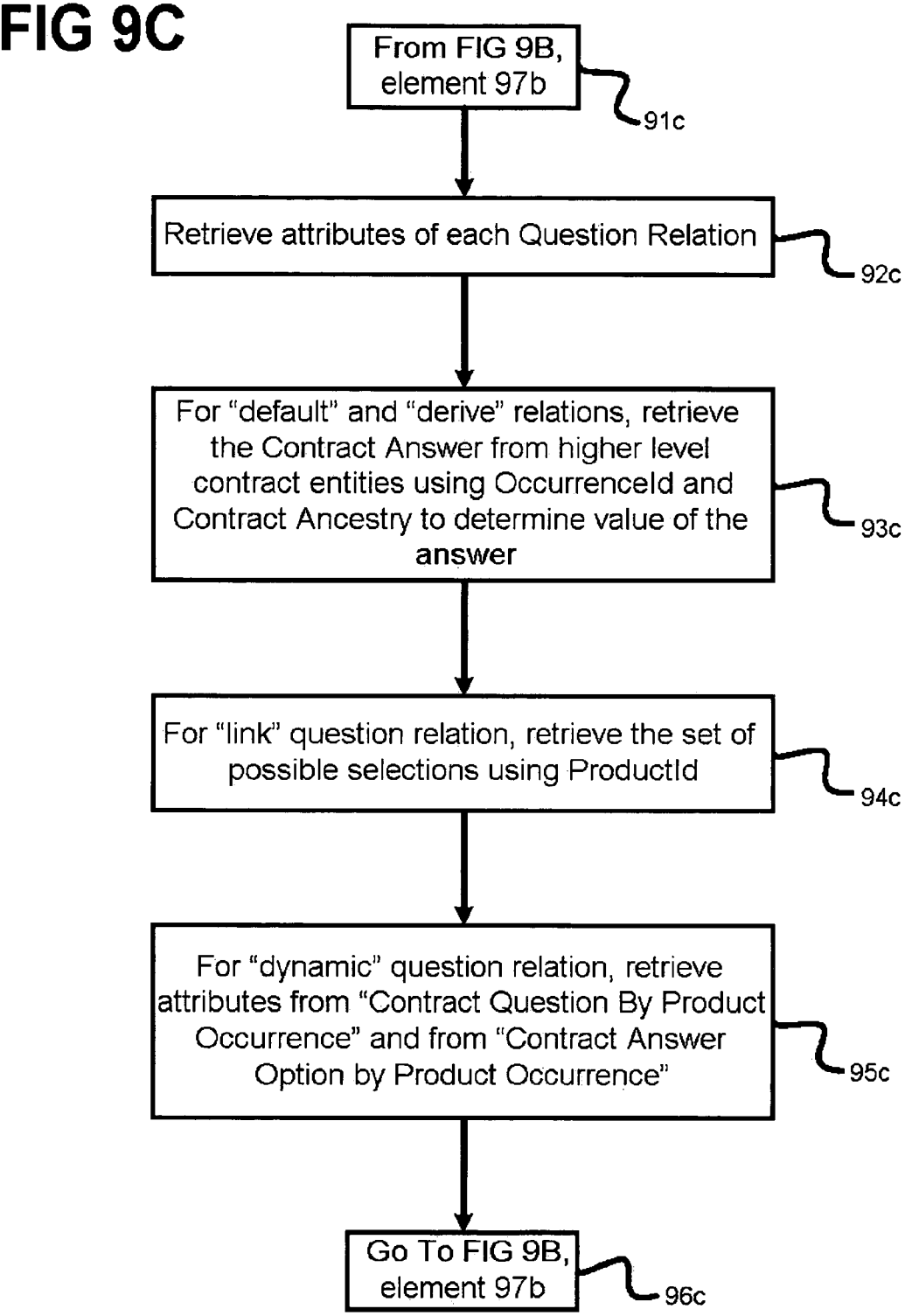

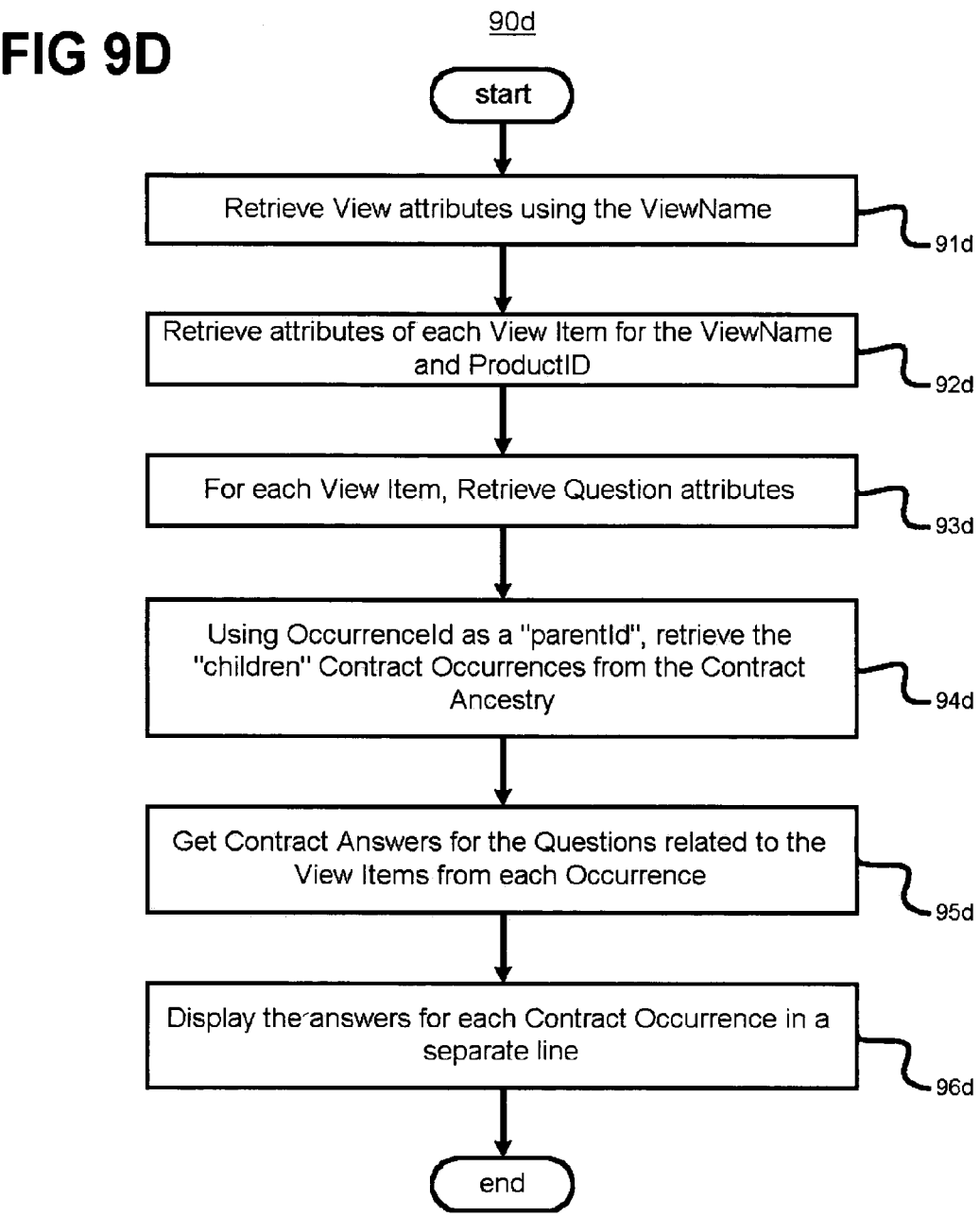

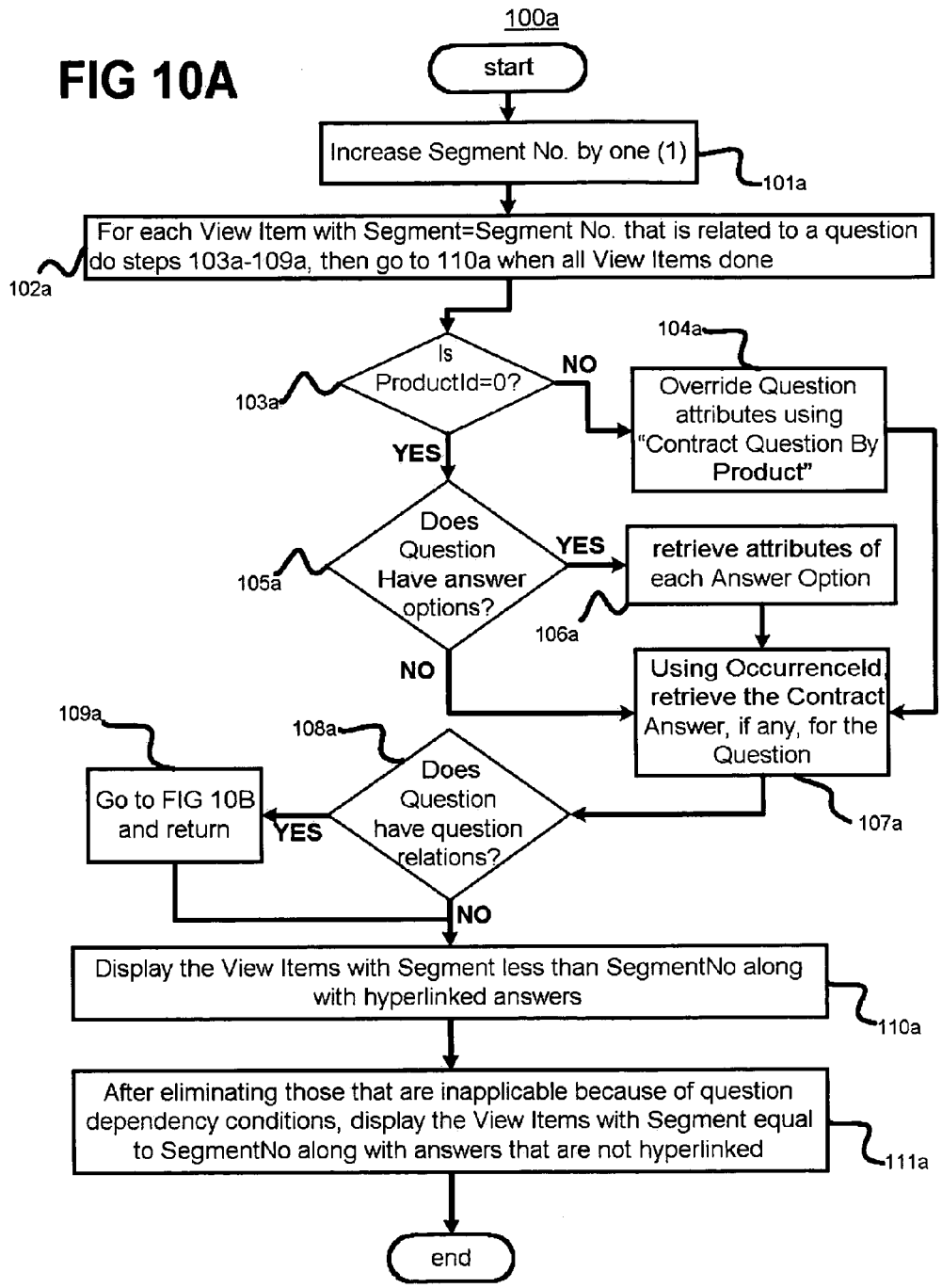

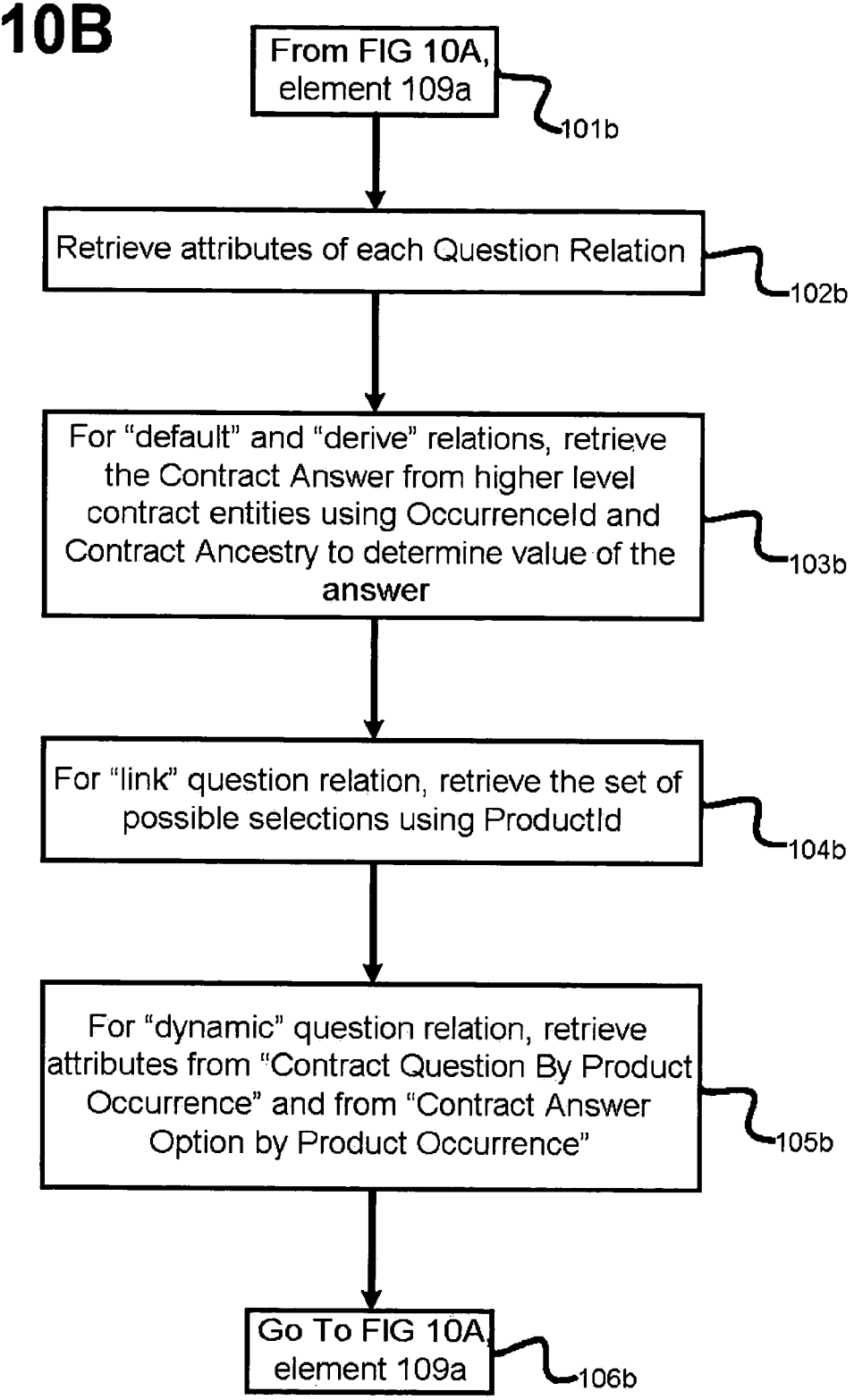

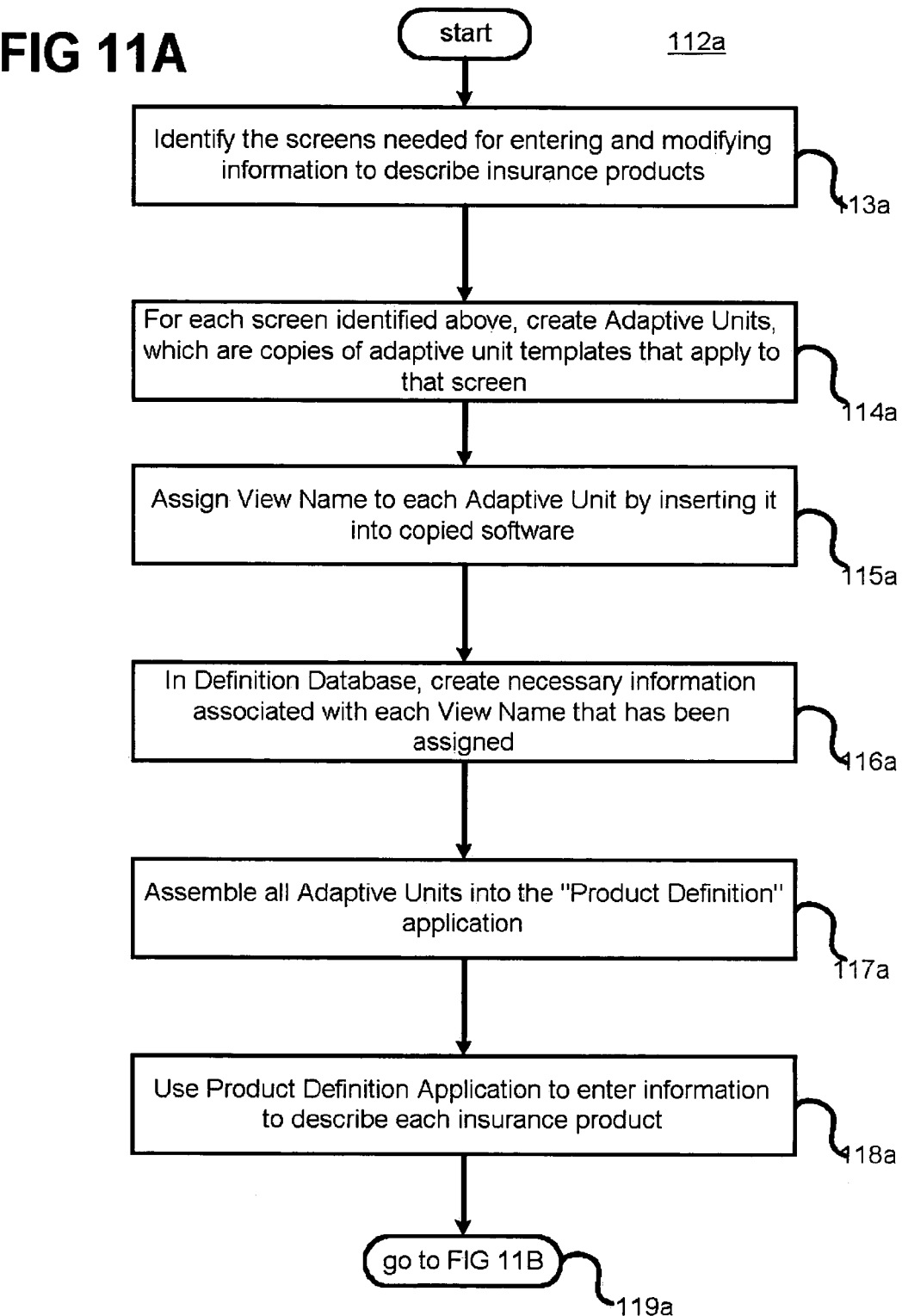

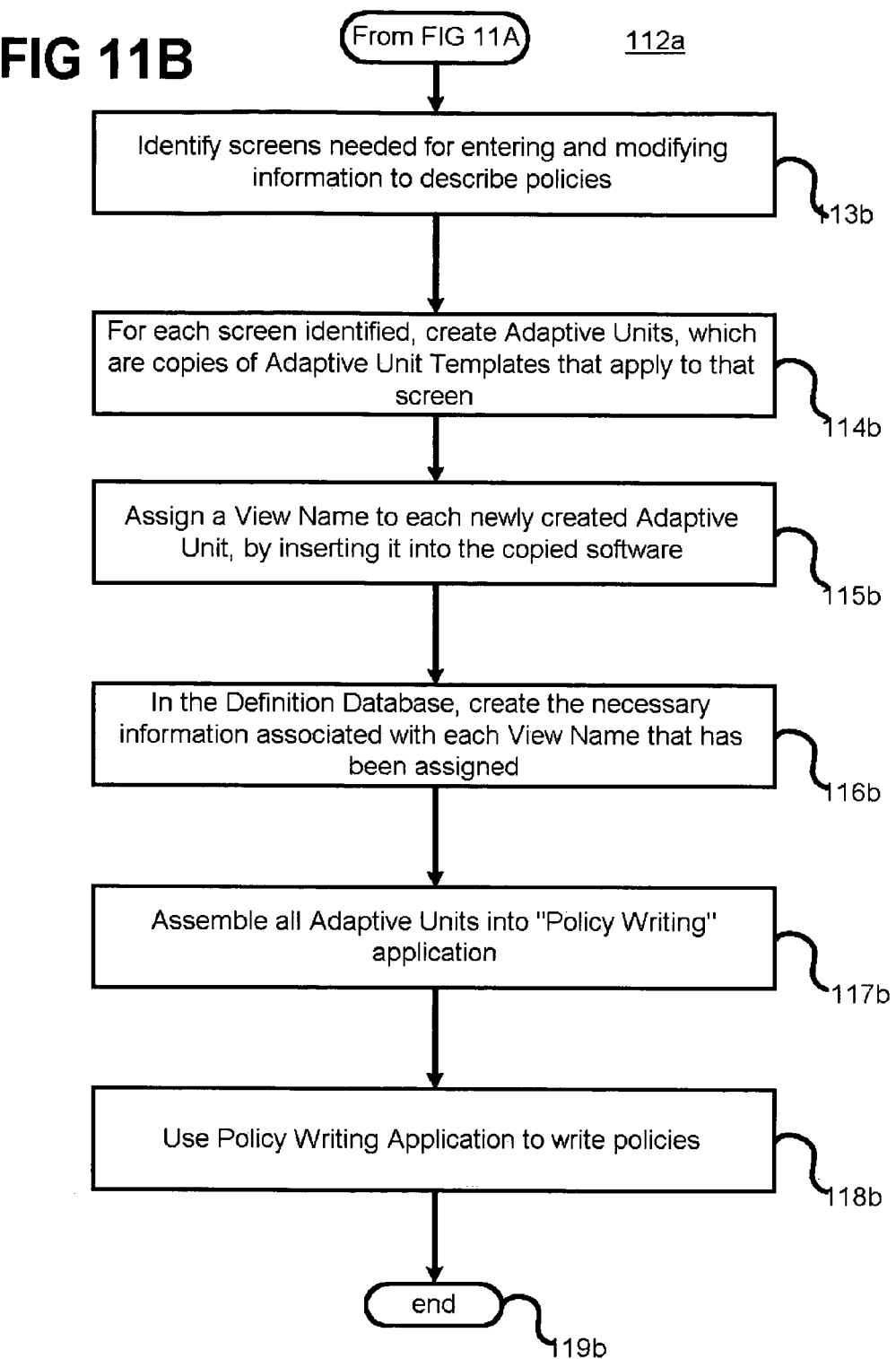

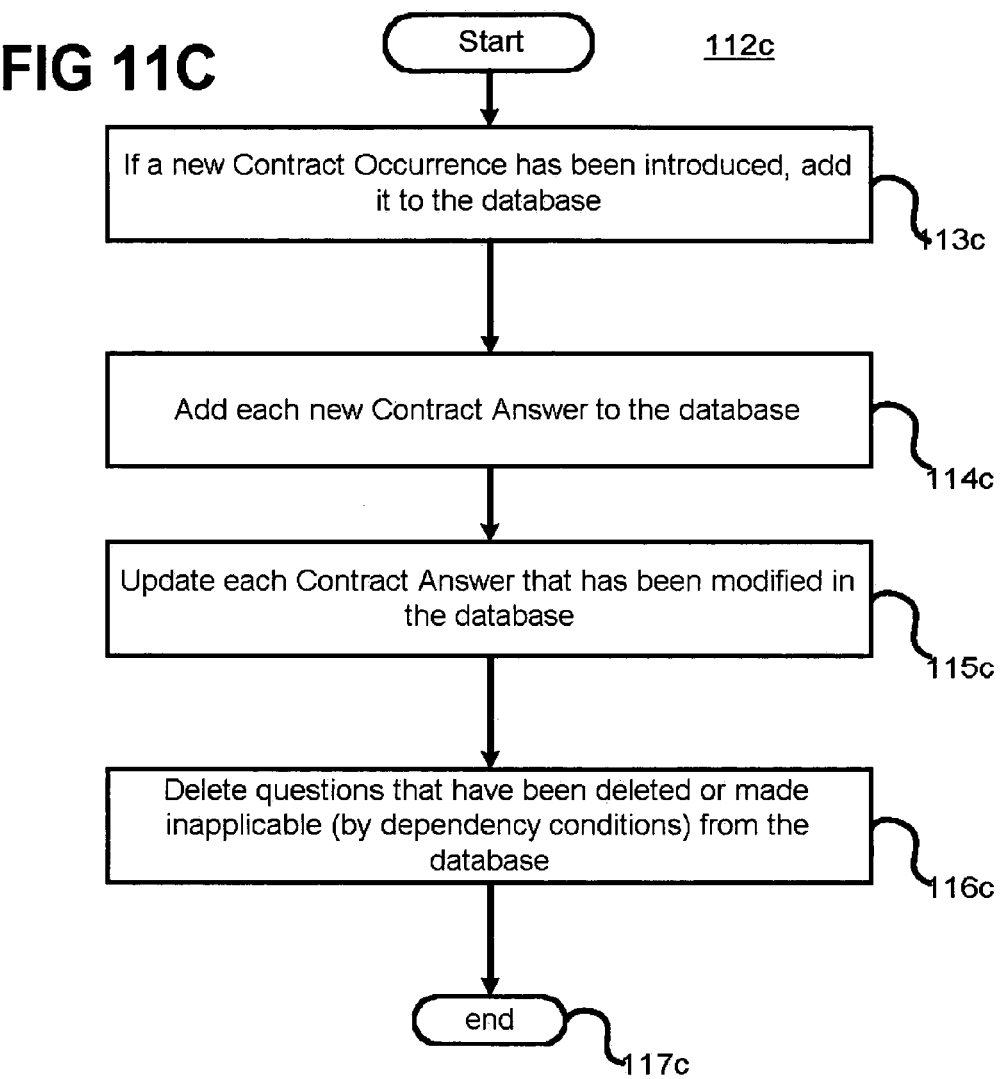

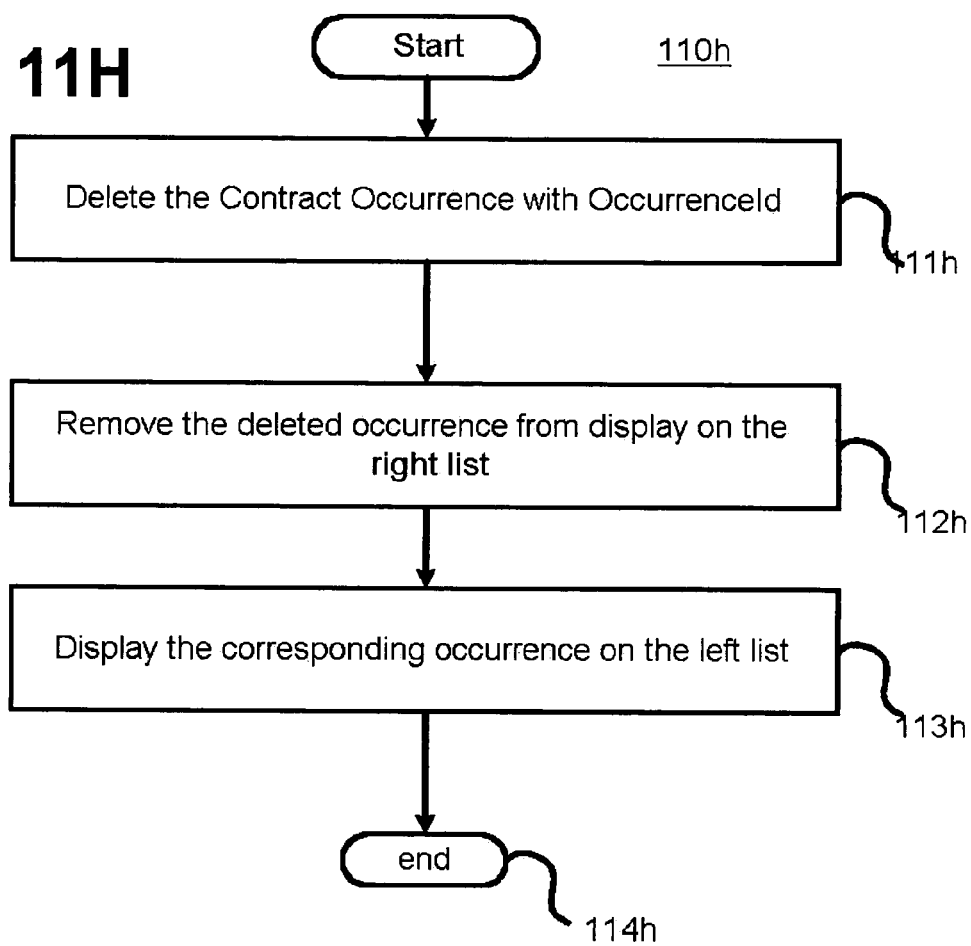

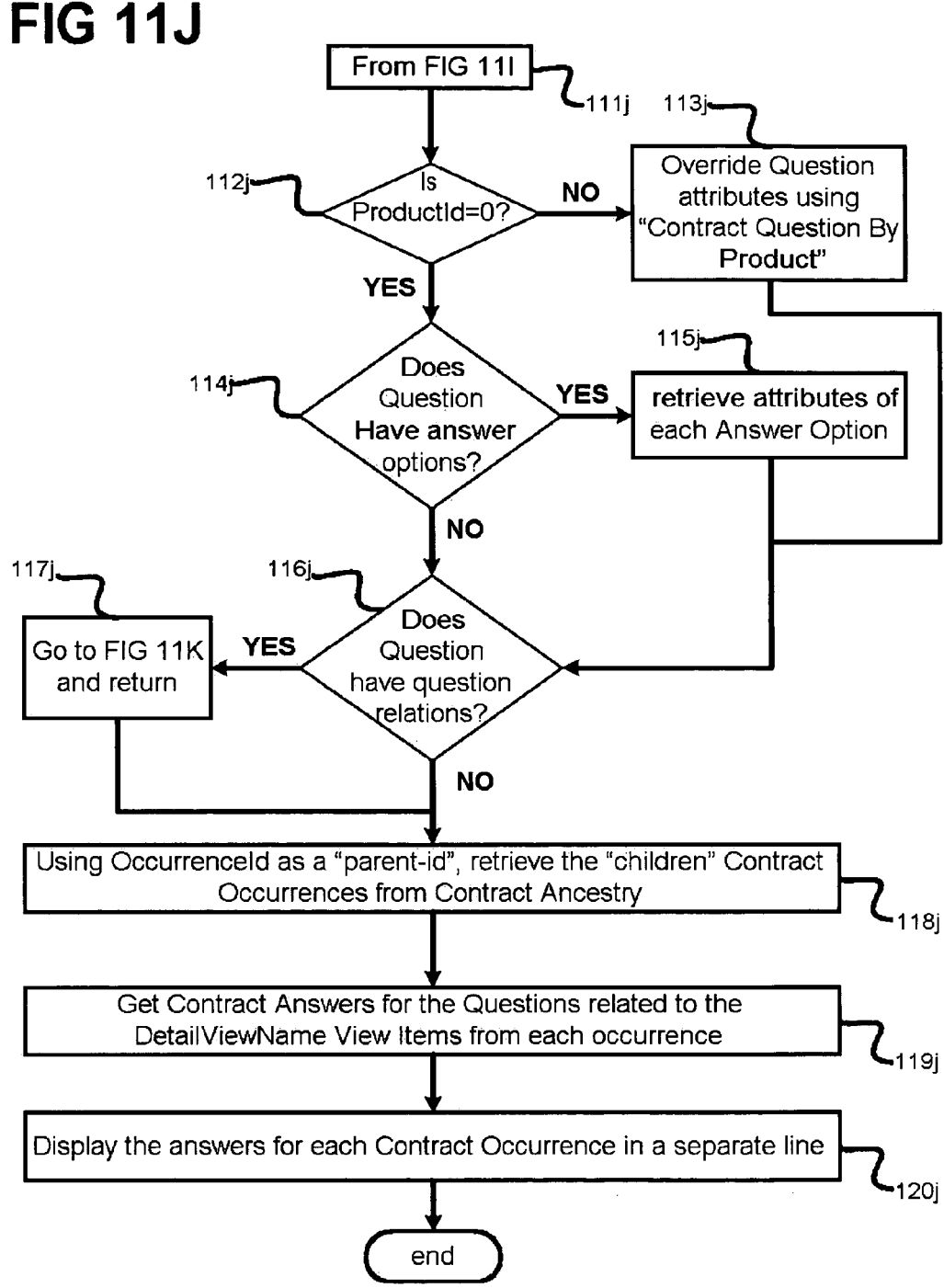

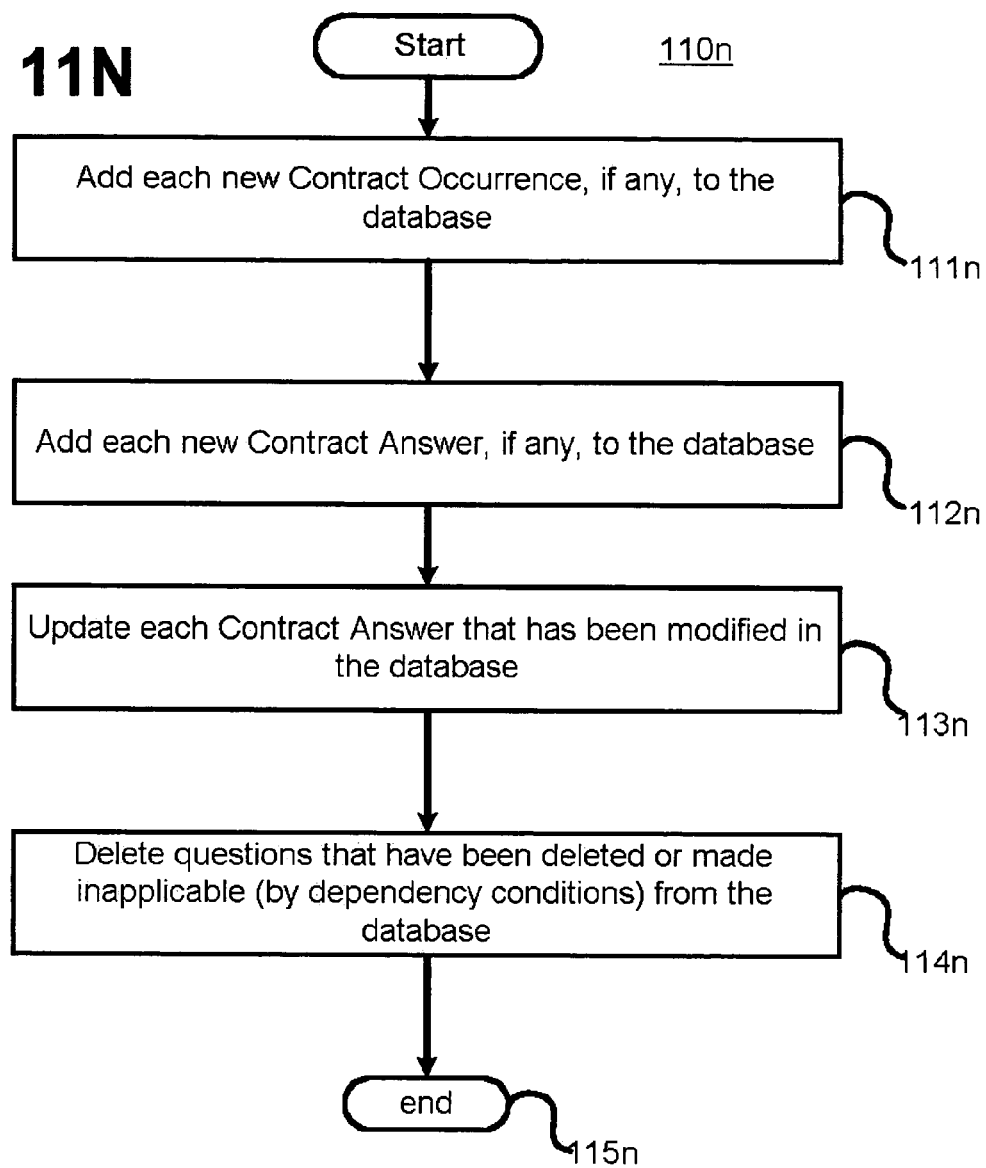

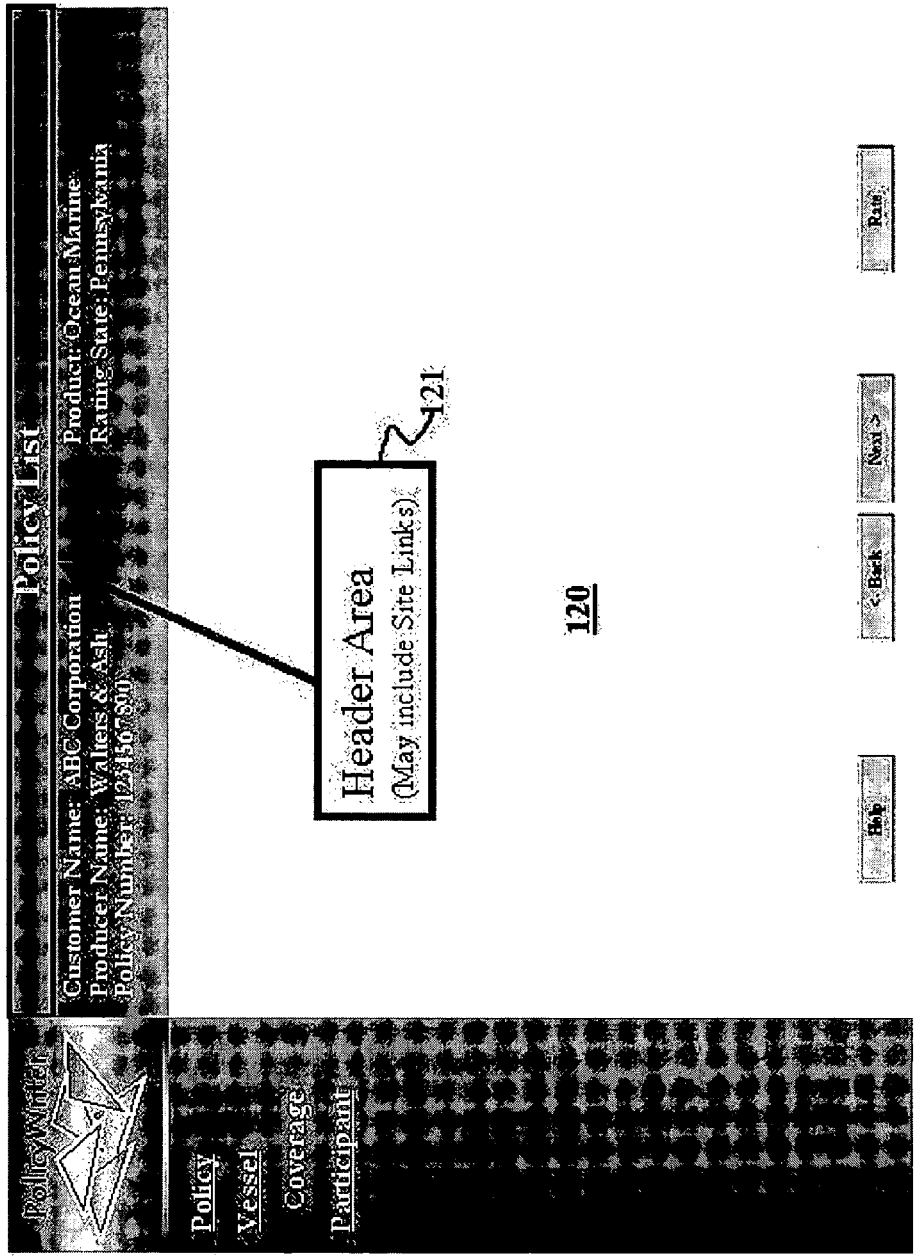

List Illustration

Detail Illustration

Updateable List Illustration

FIG 22
Dual List Illustration

FIG 23
List - Detail Illustration

FIG 24
Dual List – Detail Illustration

FIG 25

Detail – List Illustration

Question Source: Linked (L)

Question Source: Linked (cont.)
Example

Question Source: Derived (D)

Question Source: Derived (cont.)
Example 1

Question Source: Derived (cont.)
Example 2

Question Source: Defaulted (F)

Question Source: Defaulted (cont.)
Example 1

Question Source: Defaulted (cont.)
Example 2

Question Relation of Type A Example

METHOD AND APPARATUS FOR CREATING AN ADAPTIVE APPLICATION

STATEMENT OF RELATED APPLICATIONS

This application is a divisional application and claims the benefit of priority of U.S. patent application Ser. No. 10/173,145, filed Jun. 17, 2002 now U.S. Pat. No. 6,895,409, entitled "Method and Apparatus For Creating An Adaptive Application," which is incorporated herein by reference. This application is also related to co-pending U.S. patent application Ser. No. 10/837,394, also entitled "Method and Apparatus For Creating An Adaptive Application," which is filed on even date herewith and incorporated by reference herein.

FIELD OF THE INVENTION

The present invention relates generally to methods and apparatuses for developing software, and more particularly to a method and apparatus for developing software for business solutions in a rapid manner.

COPYRIGHT NOTICE

A portion of the disclosure of this patent document contains material that may be subject to copyright protection. The copyright owner has no objection to the facsimile reproduction of the patent document or the patent disclosure, as it appears in the U.S. Patent & Trademark Office patent file or records, but otherwise reserves all copyright rights whatsoever.

BACKGROUND

To date, software applications for businesses have required significant development time and once built cannot be easily modified to adapt to changes in business needs. Given the length of the development cycle vis-à-vis the length of the business cycle, this almost always leads to software systems that are outdated the moment they are completed.

For example, in the insurance industry computer systems exist to administer insurance policies for large insurers. These large software systems took years to implement and are not flexible enough to evolve with the business. As a result, most insurance companies today have out-of-date and inflexible systems and are confronted with excessive costs and delays in introducing new technologies and maintaining legacy systems. For example, the cost of handling year 2000 issues in the insurance industry was exorbitant. Consequently, many insurance companies seek to free themselves of their legacy system overhead and replace them with web-based solutions that are easy to use, support multiple insurance products, and keep up with changes in the business.

An insurance executive who decides to address these issues and surveys similar projects recently undertaken by other insurance companies will find an inadequate value proposition. The planned cost for such a project ranges from $10,000,000 to $50,000,000 just for software, consulting, and personnel expenses. The planned time to complete the entire system is 2 to 4 years without any tangible result for about 18 months. The project requires input from a number of knowledgeable business staff that will typically need to be dedicated to the project for months or years. In addition, the project has a very high risk of failure. Most projects far exceed the planned cost and time. Some projects are terminated with no result. Those that are implemented often lack the functionality and flexibility initially envisioned, resulting in yet another "legacy" system.

In an attempt to deal with their past inability to address the issues of speed, cost, and flexibility, software vendors have recently been emphasizing the "componentized" nature of their software. In theory, component-based software architectures enable customers to develop systems quickly by reusing components, ultimately reducing system maintenance costs.

While the advantages of this component rationale have been highly touted, the expected benefits have yet to manifest themselves. Current projects utilizing even the newest software products marketed in this manner are still facing implementation schedules of two to four years or more. In reality, considerable programming effort is required to implement component-based systems to coordinate the functionality of all the components. Components may be reused but the custom logic that binds them into an operational system must still be specified and coded requiring additional consulting and personnel expenses. Therefore, by itself componentized software is not a solution to the above problem.

One attempted solution to the problem has been described in U.S. Pat. No. 6,016,394, which discloses a method and system for database application software creation with minimal programming. This type of system consists of a surrogate environment, which is used to capture the requirements for the target application; a code generator, which synthesizes the code and creates the database for the target application based on the information from the surrogate environment, and the target application itself.

However, the use of this approach introduces a large overhead and imposes certain restrictions that are idiosyncratic to each code synthesizer. Most insurance companies prefer a system that does not use a code synthesizer.

The present invention is therefore directed to the problem of developing a method and apparatus for building software based systems for business solutions, which method and apparatus enable these software-based systems to be developed and fielded rapidly while providing the ability to accept modifications and new requirements in short order, yet reduce the associated costs of development and maintenance while avoiding the use of a code synthesizer.

SUMMARY OF THE INVENTION

The present invention solves these and other problems by providing an adaptive software application that consists of several types of modules, called Adaptive Units, which are highly parameterized such that they can adapt to varying business requirements by virtue of externally provided parameters. An Adaptive Application is assembled through repeated use of various combinations of different types of Adaptive Units. Large and complex business systems can be rapidly implemented through this approach.

According to one aspect of the present invention, an Adaptive Unit includes an interface component that can present information to and accept information from the outside world (such as a web page or a system interface), a processing logic component that can manipulate and evaluate information based on parameters received (such as comparisons and decisions as in the case of data dependency decisions), and a data persistence logic component that retrieves, adds, updates, and deletes data targeting one or more Occurrence Databases.

According to another aspect of the present invention, all three components of an Adaptive Unit are parameter driven. These parameters are not specific to any particular business. One embodiment for providing parameters to these components includes a Definition Database, which is detailed below.

According to still another aspect of the present invention unit there may be one or more Occurrence Databases depending on the number of business processes supported by the business application for which the Adaptive Application is being adapted. Typically, there is one Occurrence Database per business process.

According to yet another aspect of the present invention, the Occurrence Database includes generic (also referred to as meta model driven) tables that are not specific to any particular business.

The Adaptive Application disclosed herein accelerates business software implementation, reduces the cost of system development and system evolution, improves overall system quality and usability, enables a business to take advantage of previously unapproachable niche product opportunities, and mitigates project risks associated with large systems initiatives.

While the Adaptive Application invention can be employed for many types of business applications, an exemplary embodiment of an apparatus can be used for creating, managing and administering insurance policies, which is referred to as PolicyWriter. This embodiment can be programmed in Java and HTML code. The system is highly portable and can utilize any JDBC compliant data base management system (e.g., DB2, Oracle, Sybase, MS SQL Server). The embodiment includes an XML oriented database architecture making it readily able to provide enterprise application integration with other systems and communicate externally with other business partners.

According to one aspect of the present invention, embodiments herein utilize software templates that make it possible to reuse all of the business logic without limiting the ability to customize these templates as needed. This represents a major leap to what is currently available in the marketplace.

The embodiment is a comprehensive policy administration system that offers unprecedented speed, flexibility, and functionality at an attractive price. It enables a significant reduction in planned costs, time, and resources.

Other aspects of the present invention will become apparent based upon a reading of the following detailed description in light of the attached drawings.

BRIEF DESCRIPTION OF THE DRAWINGS

FIG. 5 depicts a table of the properties by Adaptive Unit according to another aspect of the present invention.

FIGS. 8A–C depict the process outline for the Load event of the Detail Adaptive Unit according to another aspect of the present invention.

FIGS. 9A–C depict the process outline for the New event of the Detail Adaptive Unit according to another aspect of the present invention.

FIG. 9D depicts the process outline for the Load event of the List Adaptive Unit according to another aspect of the present invention.

FIGS. 10A–B depict the process outline for the Continue event of the Detail Adaptive Unit according to another aspect of the present invention.

FIGS. 11A–B depict an exemplary embodiment of a process for rapidly converting an existing application into a company specific insurance policy management application according to still another aspect of the present invention.

FIG. 11C depicts the process outline for the Submit event of the Detail Adaptive Unit according to another aspect of the present invention.

FIG. 11H depicts the process outline for the <<Remove event of the Dual List Adaptive Unit according to another aspect of the present invention.

FIGS. 11I–K depict the process outline for the Load event of the Updateable List Adaptive Unit according to another aspect of the present invention.

FIG. 11N depicts the process outline for the Submit event of the Updateable List Adaptive Unit according to another aspect of the present invention.

FIG. 12 depicts an exemplary embodiment of a header area of a web page employed as a user interface.

FIG. 22 depicts an exemplary embodiment of a Dual List Adaptive Unit according to another aspect of the present invention.

FIG. 23 depicts an exemplary embodiment of a List-Detail combination Adaptive Unit, which is a combination of a List Adaptive Unit and a Detail Adaptive Unit, according to another aspect of the present invention.

FIG. 24 depicts an exemplary embodiment of a Dual List-Detail combination Adaptive Unit, which is a combination of a Dual List Adaptive Unit and a Detail Adaptive Unit, according to another aspect of the present invention.

FIG. 25 depicts an exemplary embodiment of a Detail-List combination Adaptive Unit, which is a combination of a Detail Adaptive Unit and a List Adaptive Unit, according to another aspect of the present invention.

DETAILED DESCRIPTION

Figure 1:
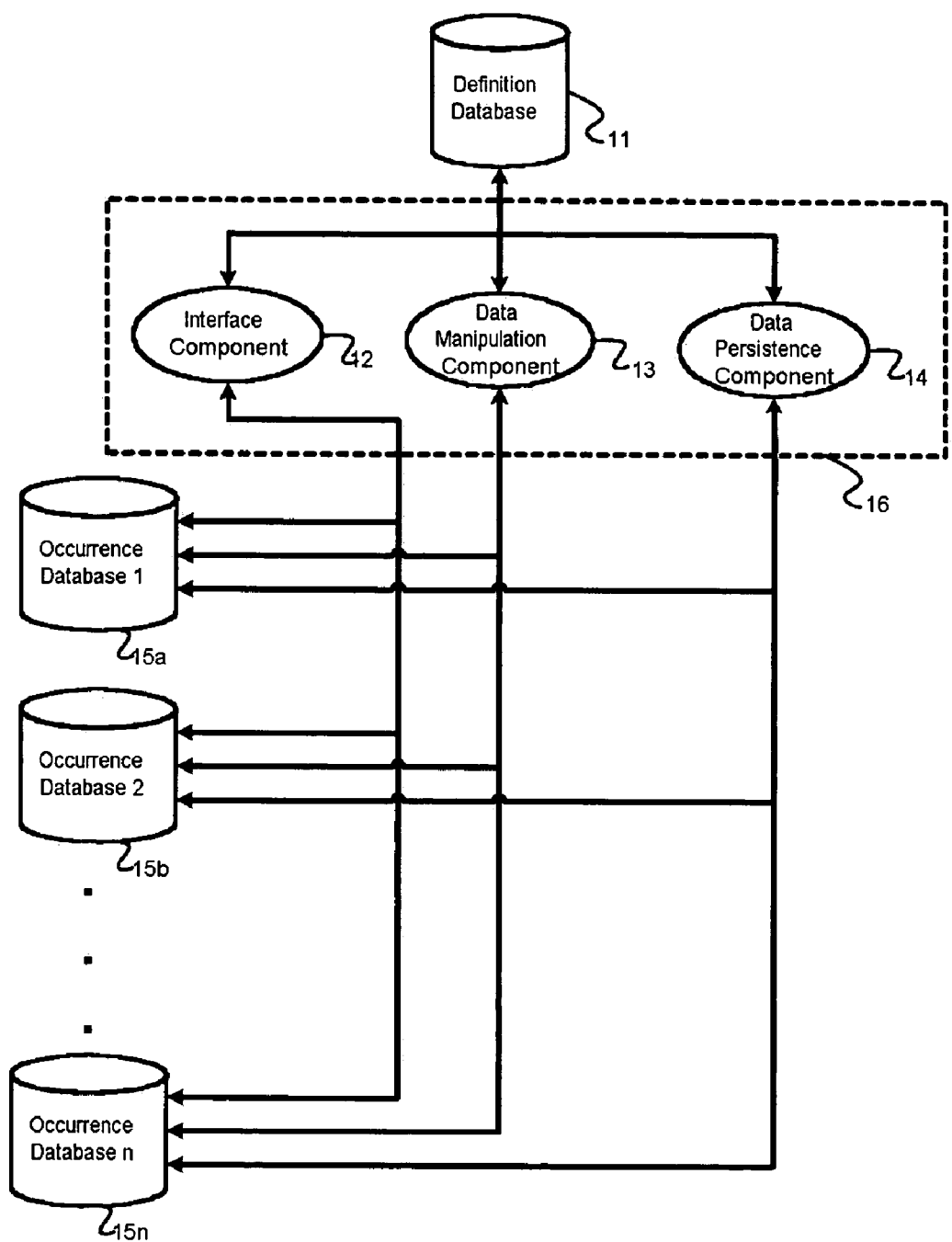
FIG. 1 depicts a block diagram of an exemplary embodiment of an Adaptive Unit according to one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As stated above, the inventions herein are applicable to many types of business applications, including but not limited to insurance policy management, financial services and product design, management and implementation, legal services, industrial processes, architectural design, etc. to name only a few. Other applications will become apparent based on the description herein.

To facilitate an understanding of the various inventions herein, an embodiment relating to management of insurance policies will now be described. Many of the steps in creating the necessary application require interaction with the customer to determine the requirements of the particular application. These requirements are embodied in the navigational design of the web pages and the layout of the various web pages. Once the navigational design and layouts are complete, the inventions herein enable rapid development of the necessary web screens. This will become apparent in the following exemplary embodiment.

Overall Process for Creating Insurance Policy Management Application

The present invention includes inter alia an adaptive application that can be adapted to a wide variety of business applications, including insurance and financial services, to name only a few. The adaptive application includes the core modules needed to perform the main functionality of any business application.

Turning to FIGS. 11–12, a process for adapting the software application to manage policies for an insurance company is shown therein. In this exemplary embodiment, the resulting application must create, manage and administer a variety of insurance products, some of which may be developed after the creation of this software application.

The first step 101 of adapting the adaptive application for an insurance company to manage its policies consists of identifying the screens needed for entering and modifying the information to describe the insurance products (e.g., what coverages, limits, deductibles are offered) to be managed by the application. Typically, this step is part of an interview process with the various employees and managers of the insurance company. In conventional software developments, this step is often employed later in the process, but the inventors have determined that by identifying these screens first, the application can be built more rapidly than heretofore possible.

Once the screens are identified, the web pages can be created. According to one aspect of the present invention, the inventors have identified that any web page needed in these business applications can be created from various combinations of Adaptive Units, which will be described in more detail below. By reusing the Adaptive Units in necessary and/or desired combinations, any web page or screen can be created in a fraction of the time heretofore possible. This significantly speeds up the process of developing these types of large software applications. Moreover, while the Adaptive Units are described herein with respect to web pages, Adaptive Units can be configured to interact with other interfaces.

The Adaptive Units set forth herein provide three levels of functionality—interfacing with a user, performing data manipulation and performing data persistence functions with the Occurrence Database. These functions will be described more completely later. There are several different types of Adaptive Units, which are discussed below. By combining each type of Adaptive Unit with other types, as necessary, any interface screen or device can be created, thereby removing the requirement for developing these separately.

For each screen identified in Step 1 (element 101), next the Adaptive Units are created (element 102), which are copies of Adaptive Unit Templates that apply to that screen. In this case, the user identifies the necessary functionality and uses the various Adaptive Unit types to create the necessary functionality of the interface.

A View Name is assigned to each Adaptive Unit by inserting it into the copied software (element 103). Each Adaptive Unit uses this View Name to obtain all of its parameters. Some Adaptive Units may require two View Names. The View Name links externally supplied parameters to the particular Adaptive Unit, thereby enabling the Adaptive Unit to be adapted to a specific function desired by the user.

In the Definition Database, the necessary information associated with each View Name that has been assigned is created (element 104). This information includes VIEW, ENTITY, ENTITY ANCESTRY, QUESTIONS, QUES- TION RELATIONS, ANSWER OPTIONS, VIEW ITEMS, VIEW ITEM DEPENDENCY LINES, and VIEW ITEM DEPENDENCY VALUES (see FIG. 2). All of these information elements are not specific to any given business process, and therefore can be filled with information necessary to any given business process. Thus, the Adaptive Units can receive parameters that are unique to each business process to which the application is being adapted through these information fields from, for example the Definition Database. This information could be provided by another method, such as via an application programming interface to name only one possibility.

Next, all the Adaptive Units are assembled into a "Product Definition" application (element 105). In other words, this Product Definition application is the first application for which the Adaptive Application was adapted. This Product Definition application creates the web pages or screens and functionality that were identified in step 101.

The Product Definition Application is then used to enter the information to describe each insurance product (106).

Now the process moves to FIG. 11 (element 107), which depicts the process for adapting the Adaptive Application into an application for creating insurance policies 110.

At this point it becomes necessary to identify the screens needed for entering and modifying the information to describe policies (e.g., insured's name, address, selected coverages, limits and deductibles) (element 111).

For each screen identified in the immediately preceding paragraph, the Adaptive Units are created (element 112), which Adaptive units are copies of the Adaptive Unit Templates that apply to that screen.

A View Name is then assigned to each newly created Adaptive Unit, by inserting it into the copied software (element 113). The Adaptive Unit will use this View Name to obtain all of its parameters. As before, some Adaptive Units may require two View Names.

In the Definition Database, the necessary information associated with each View Name that has been assigned is created (element 114). This information consists of two types. The cross-product information includes VIEW, ENTITY, ENTITY ANCESTRY, QUESTIONS, QUESTION RELATIONS, ANSWER OPTIONS, VIEW ITEMS, VIEW ITEM DEPENDENCY LINES, and VIEW ITEM DEPENDENCY VALUES. All of these information elements are not specific to any given business process, and therefore can be filled with information necessary to a given business process. Thus, the Adaptive Units for this business process can receive parameters that are unique to each business process to which the application is being adapted through these information fields from, for example the Definition Database. This information could be provided by another method, such as via an application programming interface to name only one possibility. The product specific information includes CONTRACT QUESTION BY PRODUCT, CONTRACT QUESTION BY PRODUCT OCCURRENCE, and CONTRACT ANSWER OPTION BY PRODUCT OCCURRENCE. These information elements make it possible to vary the definition parameters for one business process (in this case, Contract Sales) with respect to the elements of another business process (in this case, Product Development). As a result, in this embodiment, the parameters that govern the behavior of the Adaptive Application for selling contracts can be varied by product or a subcomponent of a product such as Coverage Type.

Next, all the Adaptive Units are assembled into the "Policy Writing" application (element 115).

Then, the Policy Writing Application is used to write policies (element 116).

Thus, this process 110 ends (element 117).

System Components

The embodiments of the present invention include several elements:

Adaptive Units, Definition parameters, and one or more Occurrence Databases.

According to one aspect of the present invention, the business is reduced to a linear flow of business processes. An occurrence database is assigned to each process of the flow. Links between subsequent processes in the linear flow of the business are established to provide details in subsequent processes that are determined by earlier processes of the overall business.

For example, in the insurance policy management business, a process for creating the insurance products is identified and an occurrence database is defined and associated with this process. A second process is identified as the insurance policy writing process that can only occur based on insurance products defined in the earlier process of product definition. This business process identification can then continue through the entire operation of the business.

Database

Figure 2:
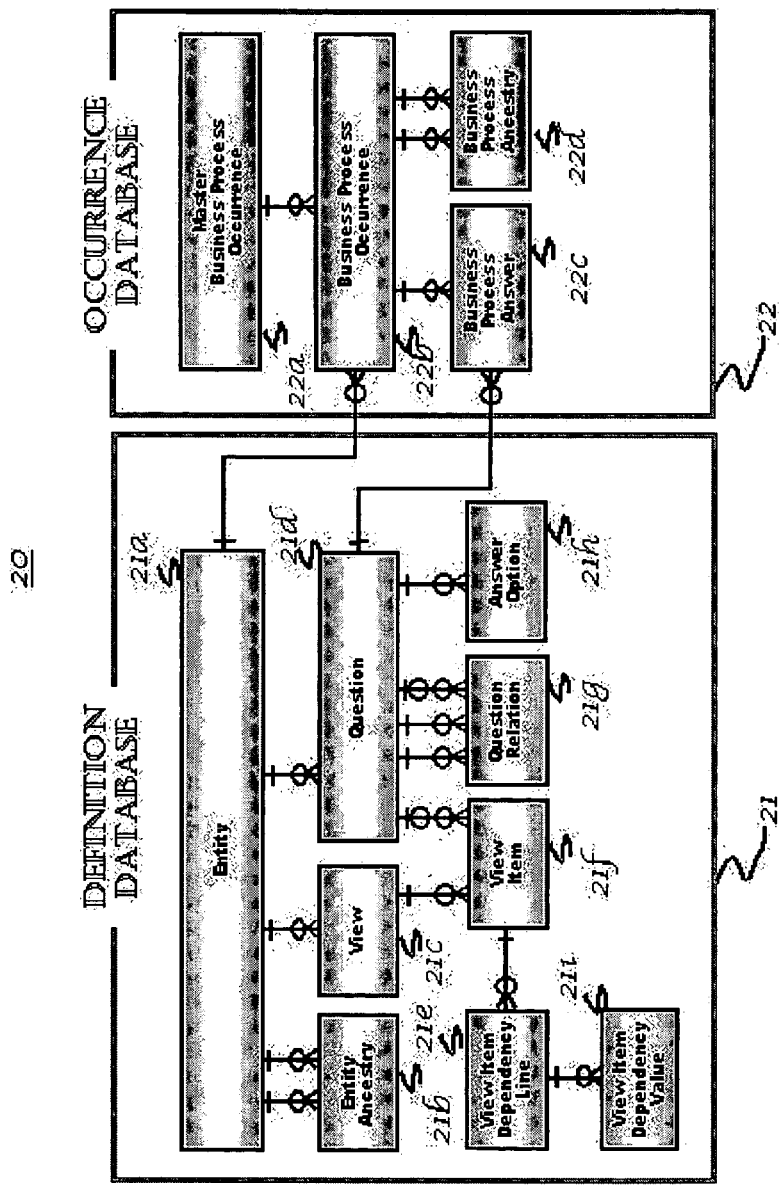
FIG. 2 depicts a data structure of an exemplary embodiment of a flexible database used in various embodiments for single business processes according to one aspect of the present invention.

FIG. 2 shows an exemplary embodiment of a data structure 20 for the database used in the various embodiments herein. The database is composed of at least two parts—a definition database 21 and one or more occurrence databases 22. A data dictionary is included herein as Appendix A. The terms used below are defined more completely therein. The relationship and interlinks between these databases are shown in FIG. 1. The Occurrence Database 22 consists of generic (also referred to as meta model driven) tables that are not specific to any business process.

The notation linking the various blocks is in standard form, which indicates the relationship between various blocks. For example, each entity may have zero (indicated by the zero in the line linking the two blocks), one (indicated by the one written across the line linking the two blocks) or more contract occurrences (indicated by the "crows feet" symbol at the end of the link between the two blocks). Moreover, each contract occurrence has one and must have one entity. Thus, this notation depicts the relationship between the two blocks. Each block represents a table in the database. Each table may have one or more entries. The links between boxes are links between the tables in the database.

The Definition Database 21 includes an Entity table 21a, to which there may be linked tables for Entity Ancestry 21b, View 21c, and Question 21d. In turn, the View table 21c may be linked to multiple tables of View Items 21f, which may be linked to one or more tables of View Item Dependency Lines 21e and which in turn may be linked to one or more tables of View Item Dependency Values 21i. There may be links between the table of Questions 21d and the View Item table 21f, as well as to the Question Relation table 21g and the Answer Option table 21h.

Thus, in FIG. 2, the Occurrence Database 22 has a Master Business Process (BP) Occurrence Table 22a, to which may be linked multiple tables of Business Process Occurrences 22b, which in turn may have multiple tables of Business Process Answers 22c and Business Process Ancestry 22d.

One or more Business Process Occurrence tables 22b may be linked to the Entity table 21a. The Business Process Answer tables 22c may be linked to the Question table 21d.

Figure 3:
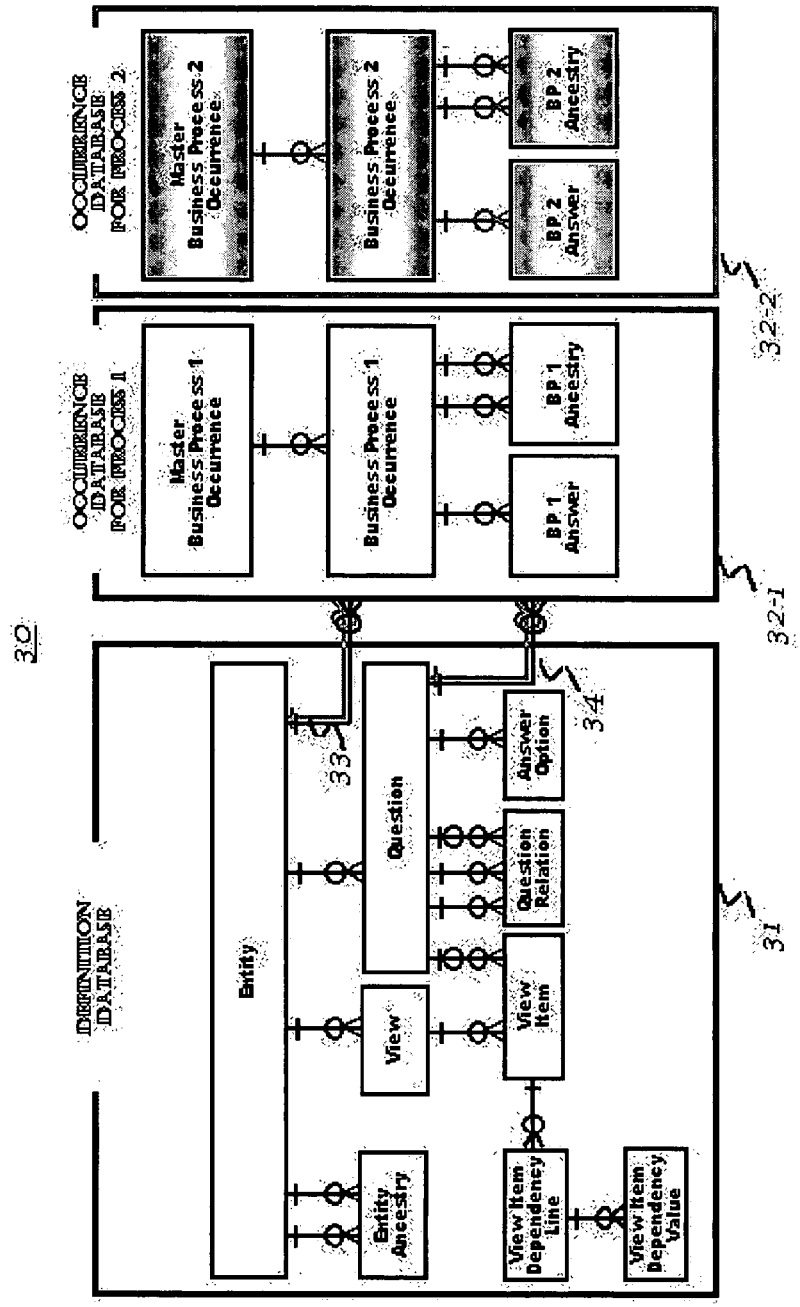
FIG. 3 depicts a data structure of an exemplary embodiment of a flexible database used in various embodiments for multiple business processes according to one aspect of the present invention.

FIG. 3 depicts the data structure 30 for the database in a situation in which there is more than one business process. In this case, there is at least one Occurrence Database for each business process. This data structure 30 includes a Definition Database 31 and two Occurrence Databases 32-1, 32-2, one for Business Process 1 and another for Business Process 2. The only difference between this data structure 30 and that shown in FIG. 2, other than the second Occurrence Database 32-2, is additional links 33, 34 between the Definition Database and the two Occurrence Databases 32-1, 32-2.

Figure 4:
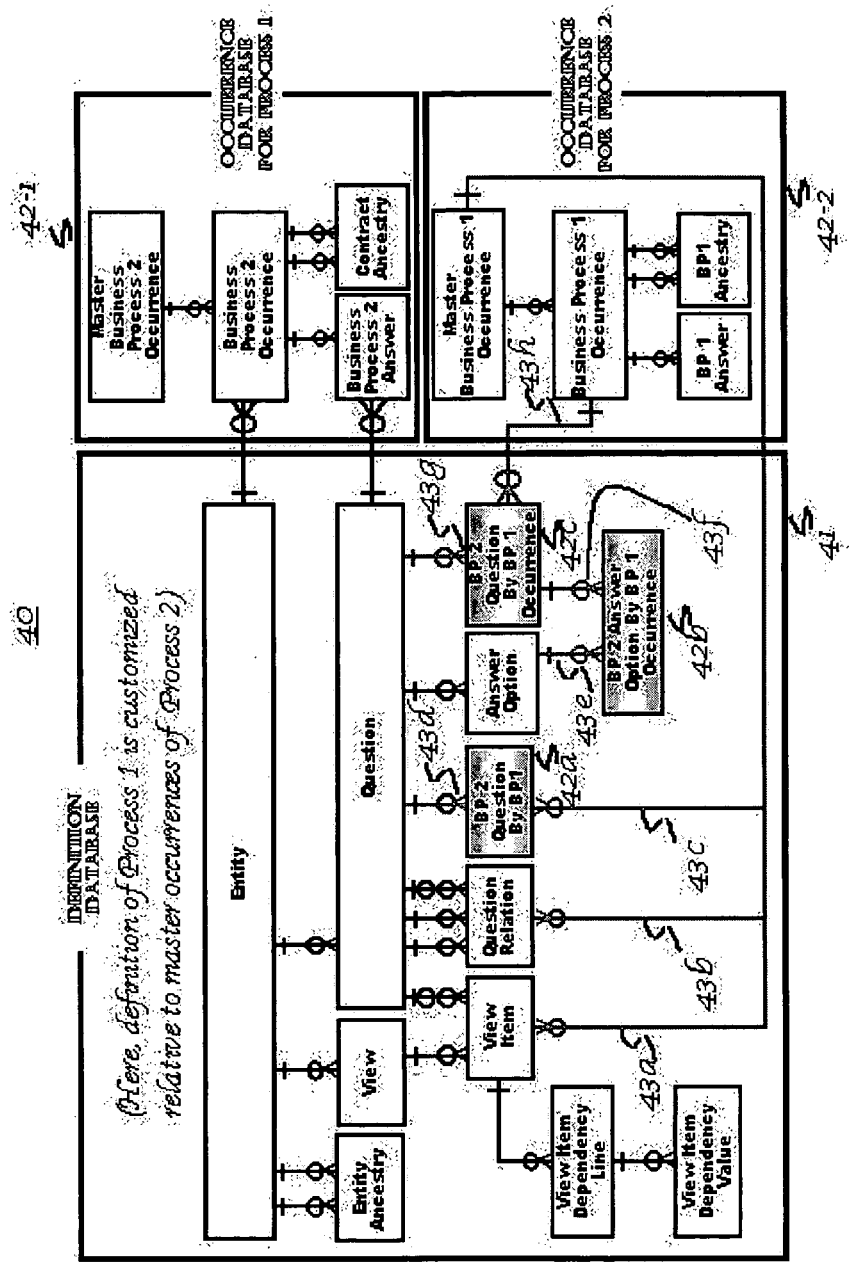
FIG. 4 depicts a data structure of another exemplary embodiment of a flexible database used in various embodiments for multiple business processes with relative customization according to one aspect of the present invention.

FIG. 4 depicts the Adaptive Application Data Structure 40 with Multiple Business Processes and Relative Customization. The data structure 40 in this version has been modified to customize the Definition Database 41 so that an upstream business process can affect answers to downstream business processes. Thus, there are three additional tables provided in the Definition Database 41, which include Business Process 2 Question by Business Process 1 42a, Business Process 2 Question by Business Process 1 Occurrence 42c, and Business Process 2 Answer Option by Business Process 1 Occurrence 42b. In this case, the Business Process 1 Occurrence Database is for an upstream Business Process, which is upstream in the business relative to Business Process 2. Thus, the Business Process 1 to which a particular Business Process 2 is applicable can alter questions (i.e., fields) and answers in the Definition Database 41. Additional links 43a–h are necessary to supply the required functionality.

Definition Database

Throughout the description there will be reference made to Product, which is a first business process (BP1) in the insurance business, and Contract, which is a second business process (BP2) in the insurance business relative to Product. The names are used in certain instances to provide more meaning to the reader than the generic names, however, these tables are not specific to any business and can be employed to adapt the Adaptive Application to any desired business.

The Entity Table specifies details of each entity defined in the logical model.

For example, PRODUCT, PRODUCT COVERAGE, POLICY, POLICY OVERAGE are defined therein for a business process of PRUDUCT in the insurance business.

The Entity Ancestry Table specifies the parent-child relationship between two entities in the conceptual model. For example, there is a parent-child relationship between POLICY & POLICY LOCATION in the insurance business.

The Question Table specifies each "Question" associated with an Entity.

The View Table normally corresponds to one Adaptive Unit. Sometimes ore than one Adaptive Unit utilizes the same view. An Interface (a web page or an external interface) consists of one or more Views. Each View consists of a selection of elements from one "Entity."

This Contract (BP2) Question of a Product (BP1) Table specifies the properties for a Contract (BP2) Question of a Product (BP1).

The Question Relation Table specifies the relationship between two Questions.

The View Item Table defines each item in a View. The View Item can be an Image, a Literal (i.e., text) or a Question with a number of properties that specify its label and control the capture and display of its answer. The View Item specifies the presentation characteristics for each displayed element.

The View Item Dependency Line Table defines the dependencies or the condition under which the View Item (e.g., display element) is presented. This provides a way by which a display element can be presented only under certain conditions. Dependency Line along with Dependency Value enables specification of any complex expression. The Dependency Expression is a complex Boolean expression with the left side operand is a Question and the right side operand can be a literal or a Question. The comparison operator can be one of $<, >, <=, >=, <>, =$. The operations can be grouped by appropriate parentheses. For example a valid expression is ((Coverage=C1 or C2 or C3) AND (Vehicle Type=T1 or T2 or T3)).

This Dependency Value Table defines the set of values that need to be satisfied with Dependency Line Primary Q. Each instance specifies one value of the OR expression (in the example C1, C2 and C3). Each value may be a constant or another Question (specified here as the Secondary Question).

The Master Product (BP1) Occurrence Table contains one record for every instance of a Product (BP1).

The Product (BP1) Occurrence Table contains one record for each occurrence of each entity in the Product (BP1) hierarchy.

The Product (BP1) Ancestry Table identifies the parent-child relationships between Product (BP1) Occurrences.

The Product (BP1) Answer Table contains the values for the individual attributes of a Product (BP1) Occurrence.

The Long Product (BP1) Answer Table contains the Product (BP1) Answer value if the Product (BP1) Answer's size exceeds 20 characters.

The Contract (BP2) Question by Product (BP2) Occurrence Table specifies the overriding values for presentation characteristics of a Question based on Product (BP1) Occurrence.

The Product (BP1) Answer Option Table specifies the possible values for the Answer of a Question relative to a particular Product (BP1) Occurrence Question. If the Product (BP1) Occurrence Question Answer Option Category is 1 (specific list), each possible value is specified in this table, one record per value. If it is 2 (ranges of values), then each range must be specified in one record using From, To and Increment.

The Answer Option Table specifies the possible values for all Questions including variations by Product. If the Question Answer Option Category is 1 (specific list), each possible value is specified in this table, one record per value. If it is 2 (ranges of values), then each range must be specified in one record using From, To and Increment.

The Master Contract (BP2) Occurrence Table contains one record for every instance of a Contract (BP2). This record ties together all the details for the Contract (BP2).

The Contract (BP2) Occurrence Table contains one record for each occurrence of each entity in the Contract (BP2) hierarchy.

The Contract (BP2) Ancestry Table identifies the parent-child relationships between Contract (BP2) Occurrences.

The Contract (BP2) Answer Table contains the values for the individual attributes of a Contract (BP2) Occurrence.

The Long Contract (BP2) Answer Table contains the Contract (BP2) Answer value if the Contract (BP2) Answer's size exceeds 20 characters.

User Interface

Turning to FIG. 12, every user interface that is manifest as a web page 120 typically includes the following elements—a header area 121 (see FIG. 12), a context area 131

Figure 13:
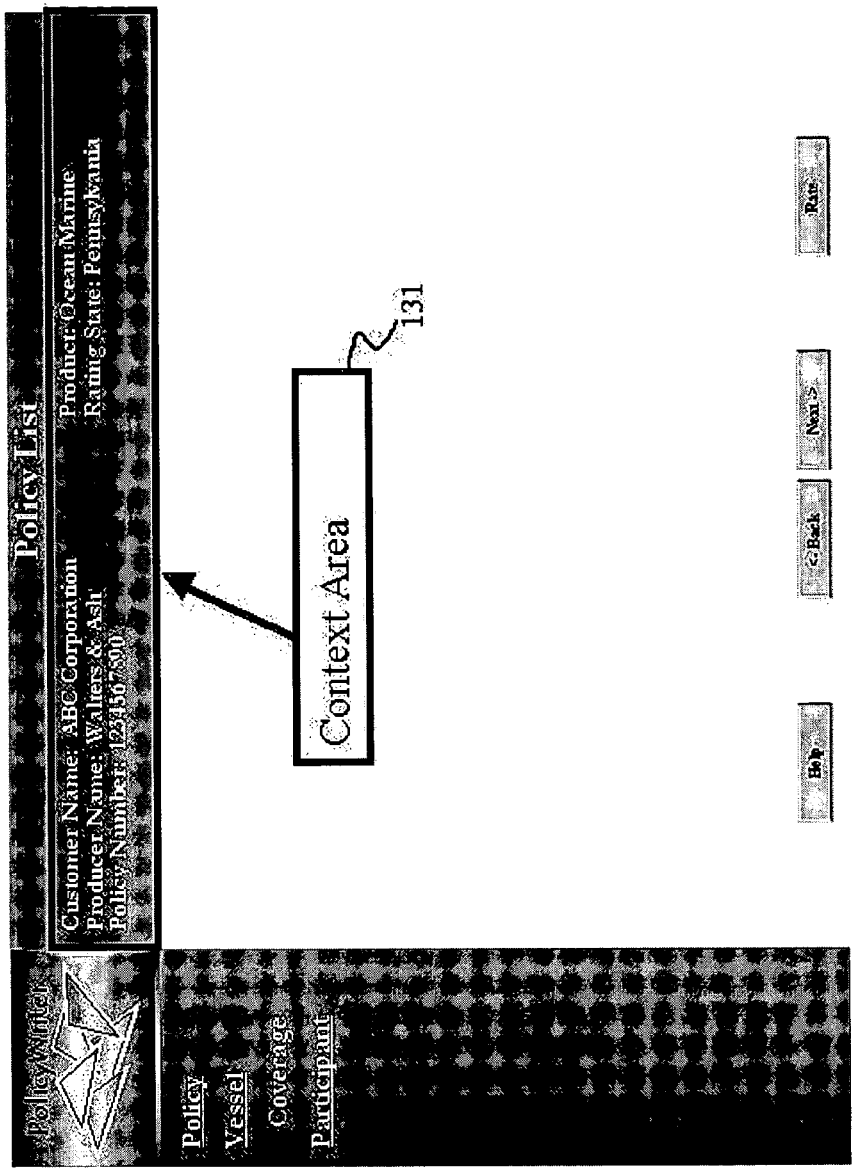
FIG. 13 depicts an exemplary embodiment of a context area of a web page employed as a user interface.
Figure 14:
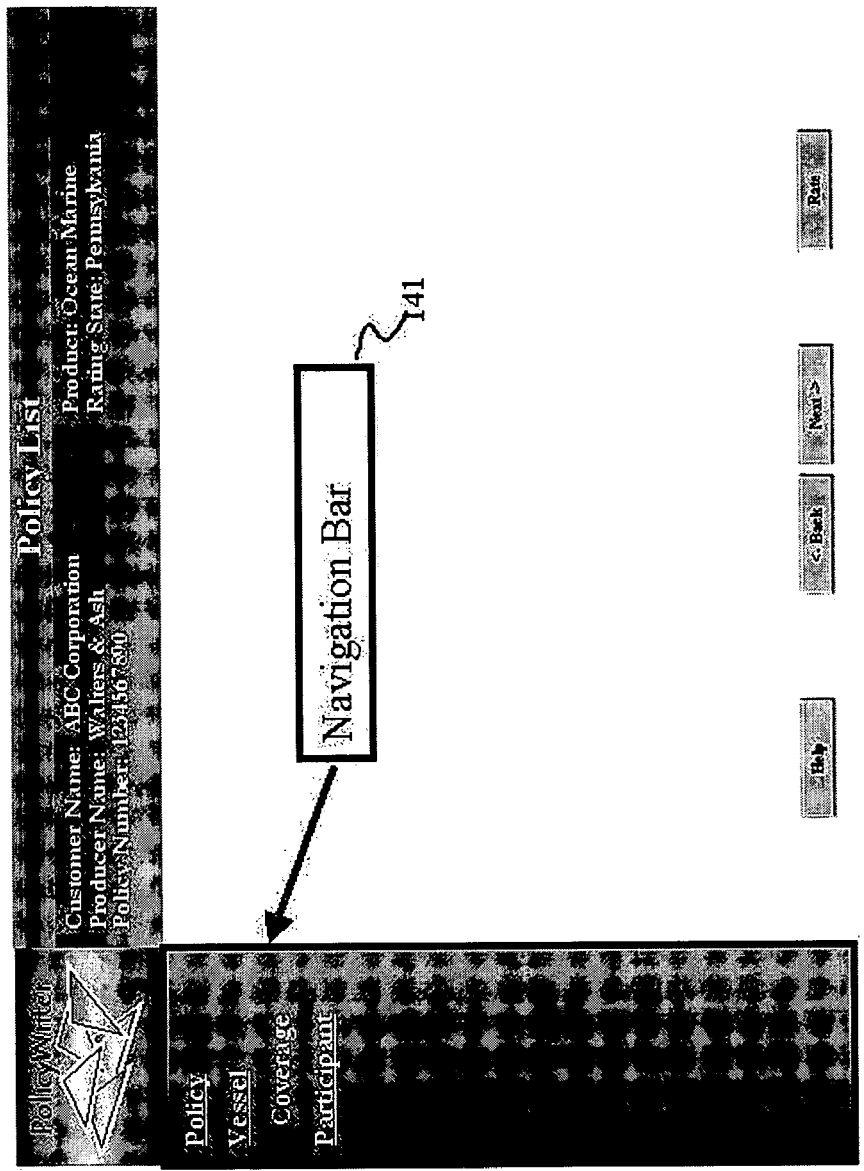
FIG. 14 depicts an exemplary embodiment of a navigation bar of a web page employed as a user interface.
Figure 15:
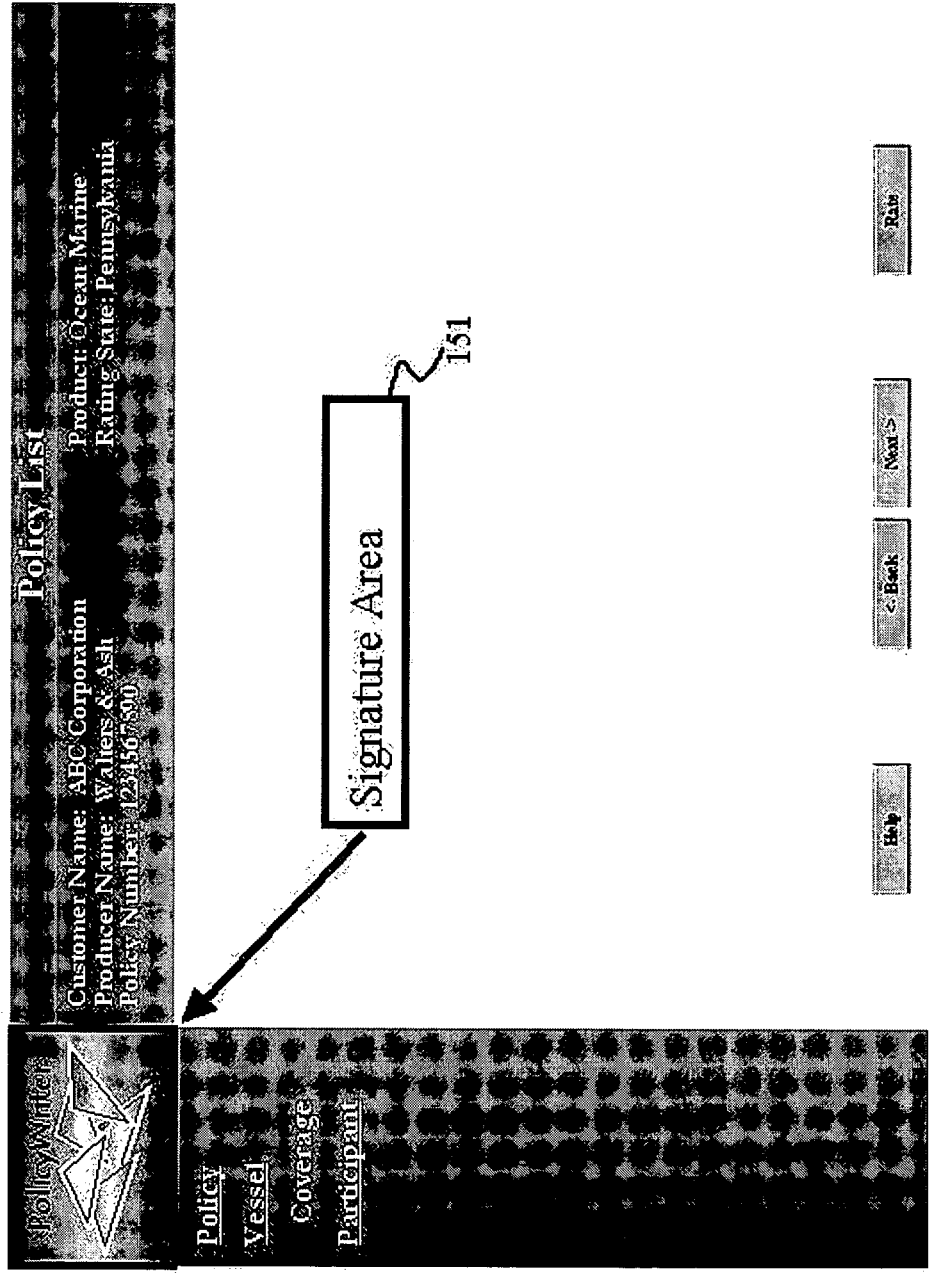
FIG. 15 depicts an exemplary embodiment of a signature area of a web page employed as a user interface.
Figure 16:
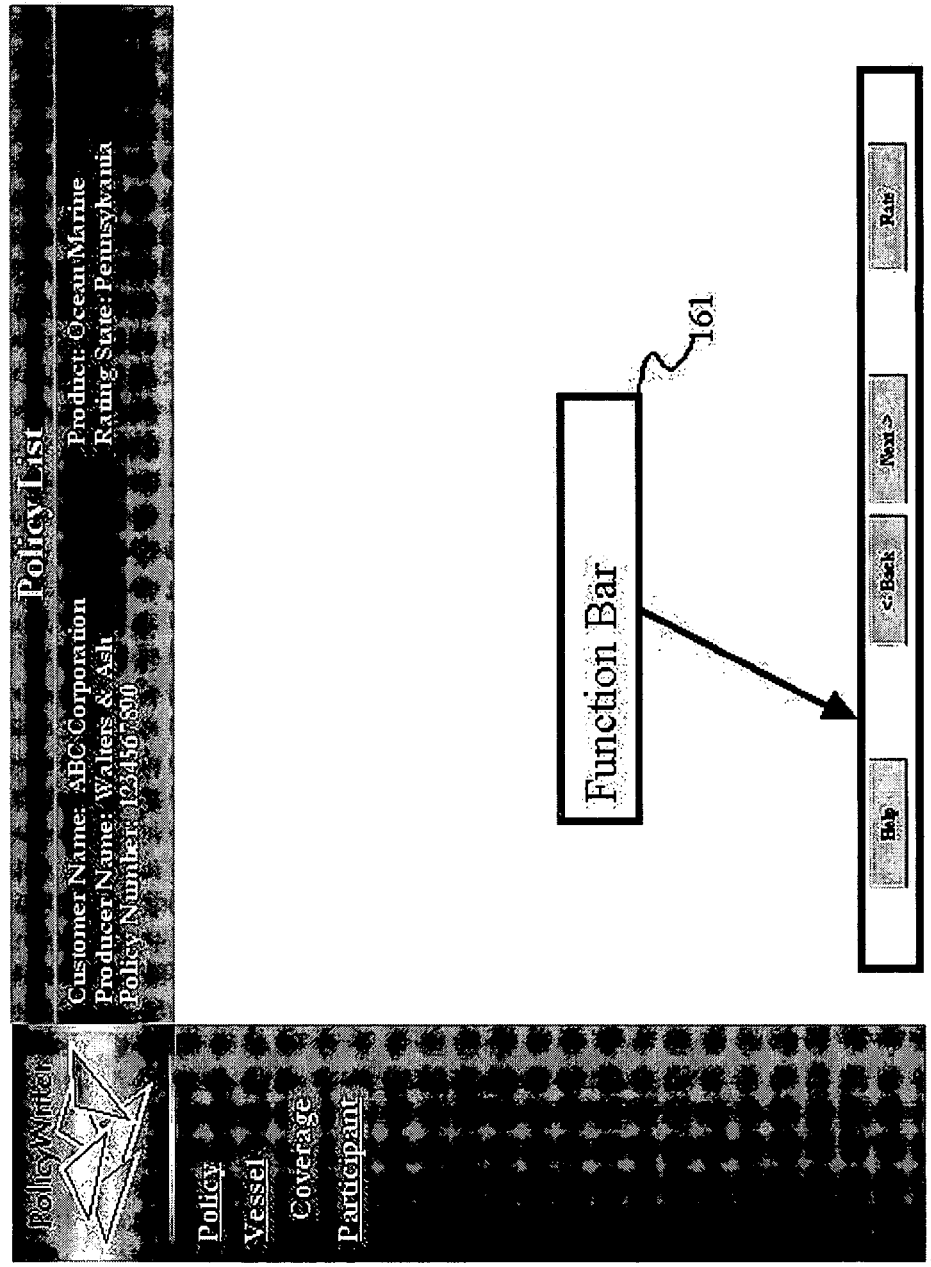
FIG. 16 depicts an exemplary embodiment of a function bar of a web page employed as a user interface.
Figure 17:
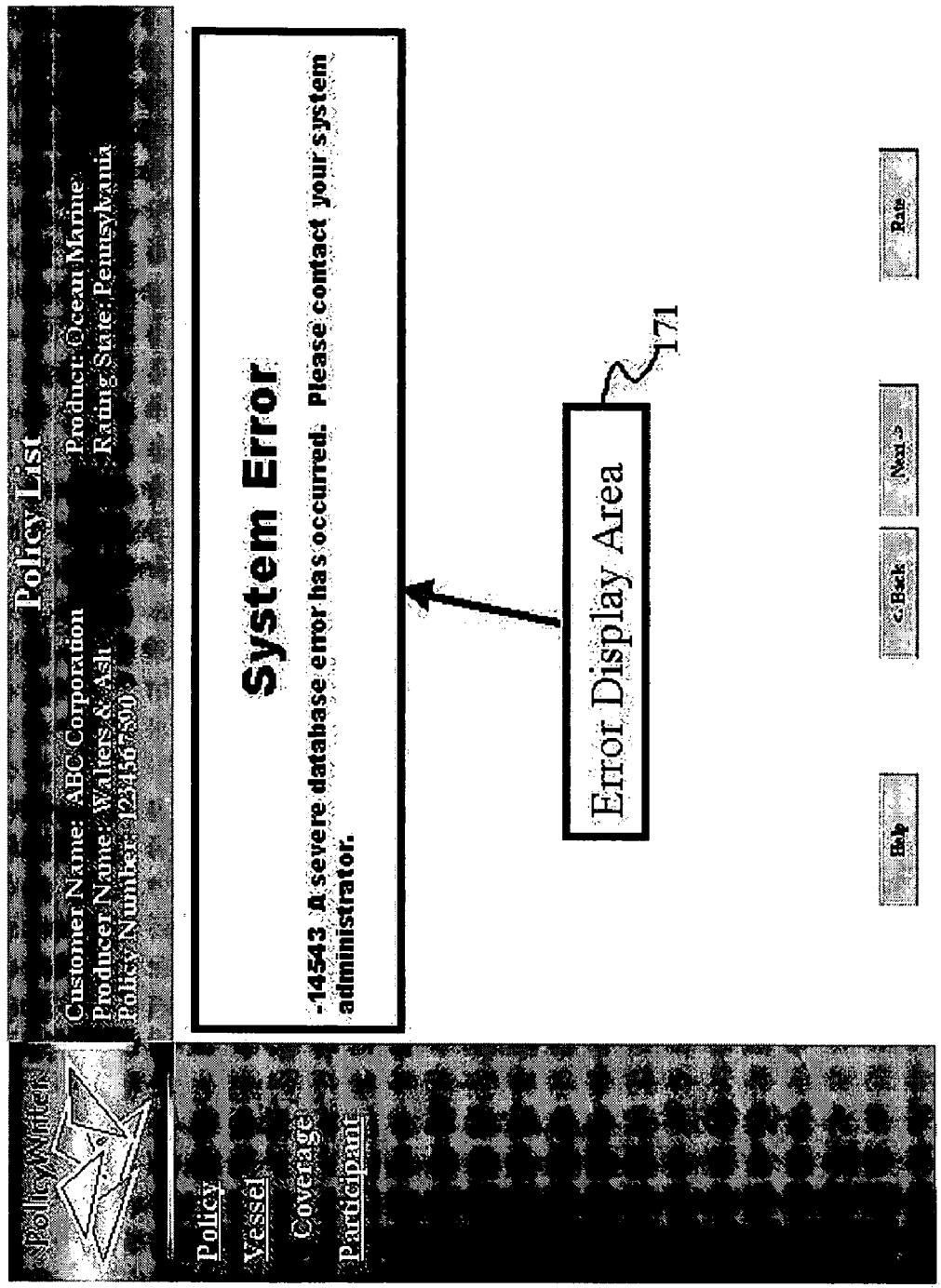
FIG. 17 depicts an exemplary embodiment of an error display area of a web page employed as a user interface.
Figure 18:
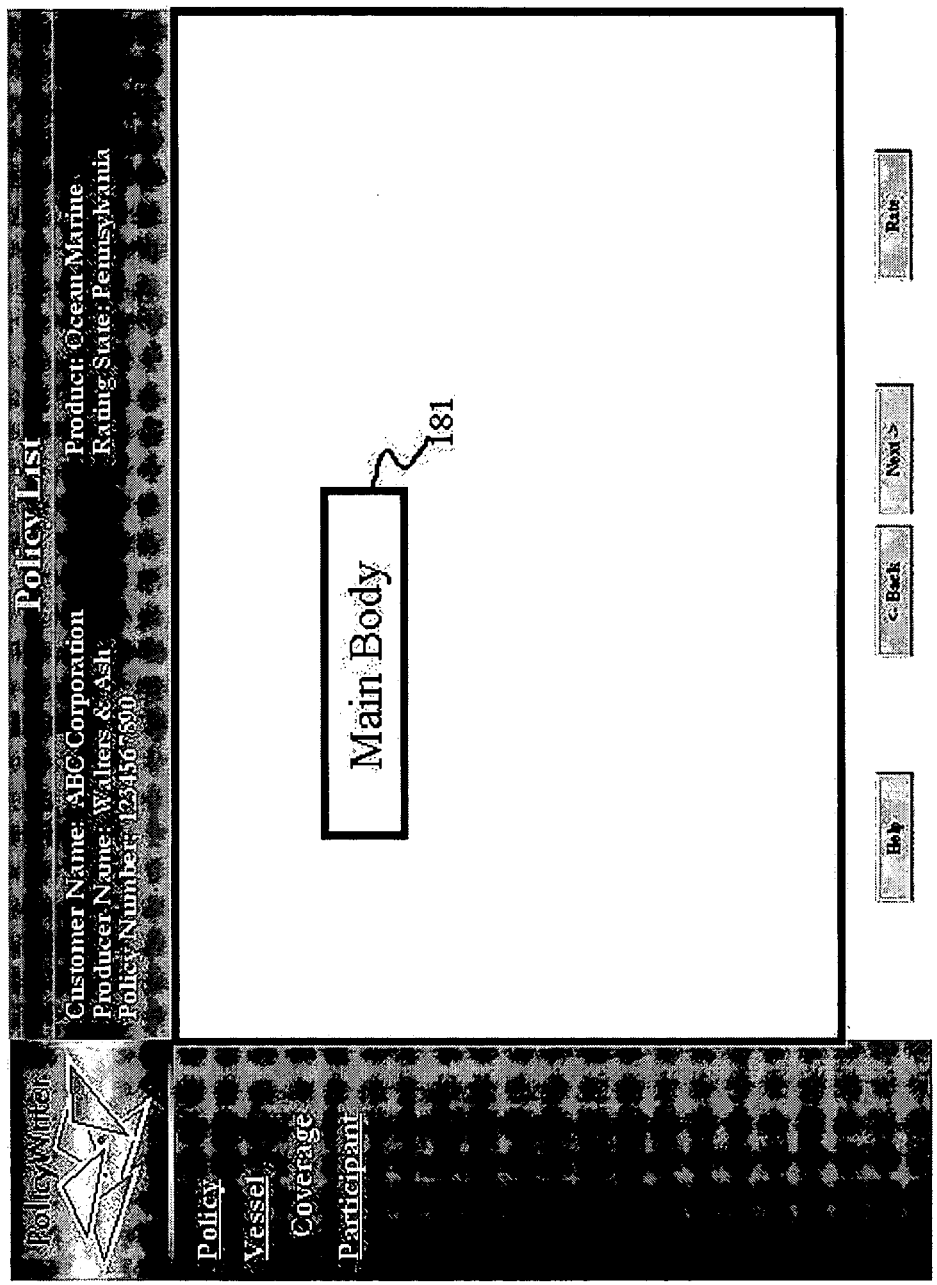
FIG. 18 depicts an exemplary embodiment of a main body of a web page employed as a user interface.

(see FIG. 13), a navigation bar 141 (see FIG. 14), a signature area 151 (see FIG. 15), a function bar 161 (see FIG. 16), an error display area 171 (see FIG. 17), and a main body 181 (see FIG. 18). The focus herein relates to the main body 181.

According to one aspect of the present invention, the main body 181 of a web page 120 employed as a user interface can be composed of several reusable elements in various combinations. We term these "Adaptive Units." An exemplary embodiment 16 of an Adaptive Unit is shown in FIG 1A. These Adaptive Units include three components—an interface component 12, a data persistence component 13 and a data processing component 14.

The interface component 12 presents information to and accepts information from the outside world (such as a web page or a system interface).

The processing logic component 13 can manipulate and evaluate information based on received parameters. This component can perform complex manipulations such as comparisons and decisions as in the case of data dependency decisions.

The data persistence logic component 14 retrieves, adds, updates, and deletes data targeting one or more Occurrence Databases 15a–15n. This component manages the data in the one or more Occurrence Databases.

All three components of an Adaptive Unit are parameter driven. In other words, each of these components receives parameters from somewhere else that drive the activities of the component. These parameters are embedded throughout these components so that the components can be adapted to any application. As a result, these components are highly flexible forming the core of the Adaptive Application.

One embodiment for providing parameters to these components includes a Definition Database 11. The Definition Database can be populated with data specific to the given application for which the Adaptive Application is being adapted to completely control the three components of each Adaptive Unit. By using these Adaptive Units as building blocks the Adaptive Application can be developed in short order.

Adaptive Units

There are multiple types of Adaptive Units (AU's) that can be combined in various manners to create any combination of web page necessary for interacting with a user. Some embodiments of these Adaptive Units include—a List AU (an example of which is shown in FIG. 19), a Detail AU (an example of which is shown in FIG. 20), an Updateable List AU (see FIG. 21 for an example) and a Dual List AU (see FIG. 22 for an example), which only becomes necessary when there are multiple occurrence databases.

Figure 19:
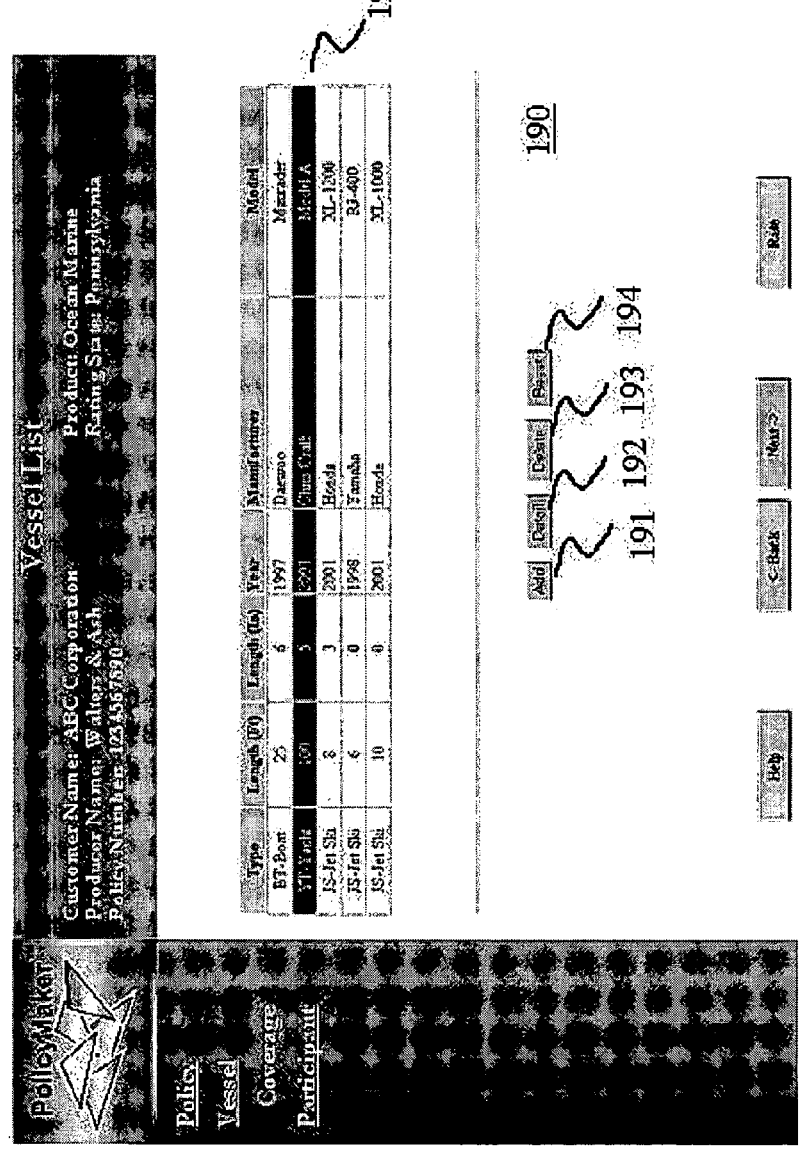
FIG. 19 depicts an exemplary embodiment of a List Adaptive Unit according to another aspect of the present invention.

Referring to FIG. 19, shown therein is a List Adaptive Unit 190, which includes a list 195 and several events (Add, Delete, Detail, Reset) that can be initiated by clicking on the buttons 191–194, respectively.

Figure 20:
FIG. 20 depicts an exemplary embodiment of a Detail Adaptive Unit according to another aspect of the present invention.

Referring to FIG. 20, shown therein is a Detail Adaptive Unit that includes a detail area 201 and a function button 202 (submit).

Figure 21:
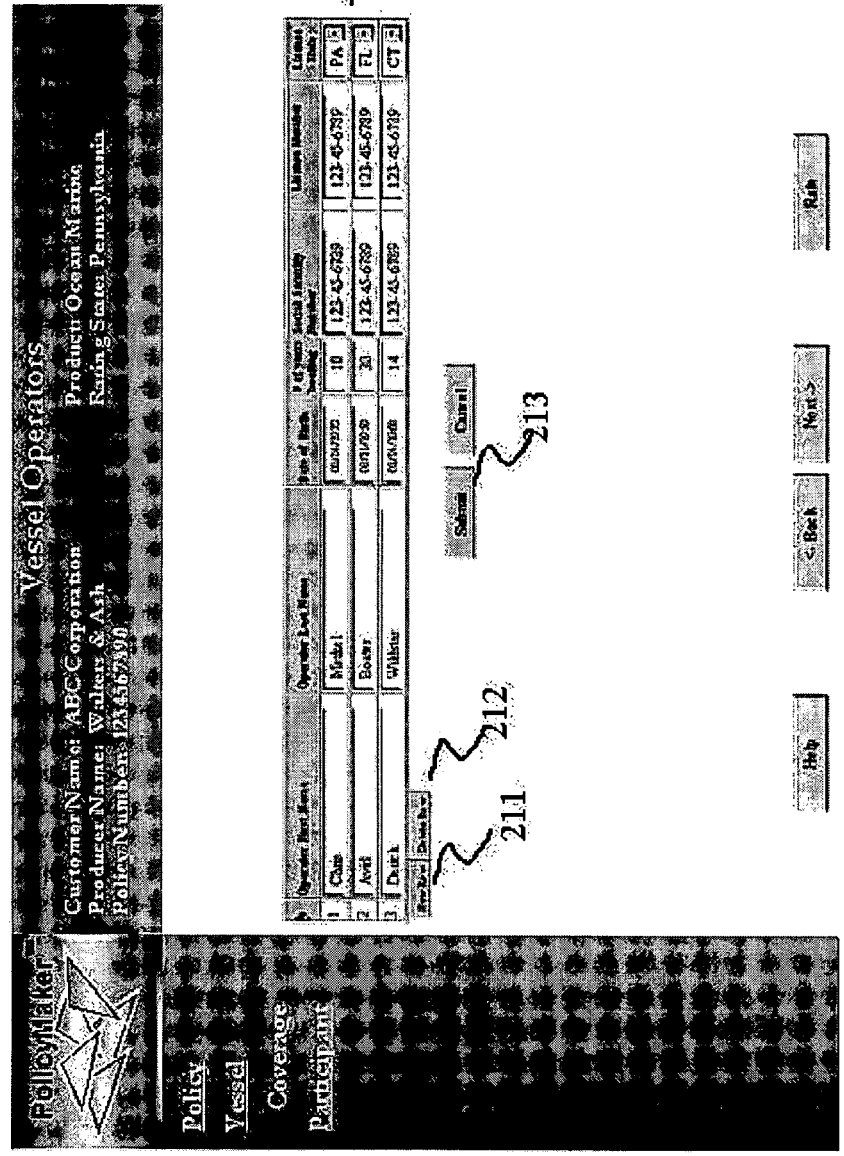
FIG. 21 depicts an exemplary embodiment of an Updateable List Adaptive Unit according to another aspect of the present invention.

Referring to FIG. 21, shown therein is an Updateable List Adaptive Unit that includes a list 214 and several function buttons (Add Row, Delete Row, Submit) 211-213, respectively.

Figure 22:
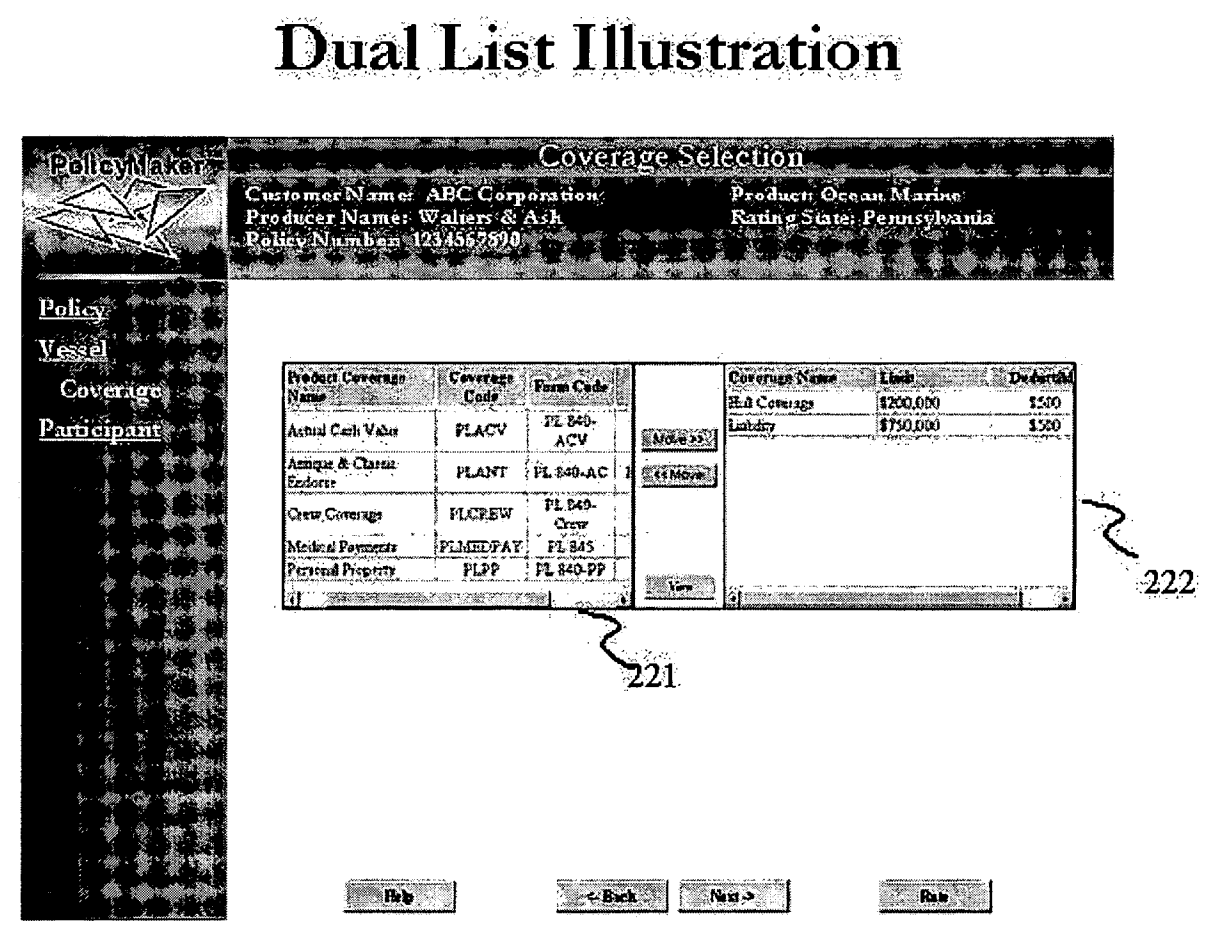

Referring to FIG. 22, shown therein is a Dual List Adaptive Unit that includes a left side list 221 and a right side list 222.

Figure 23:
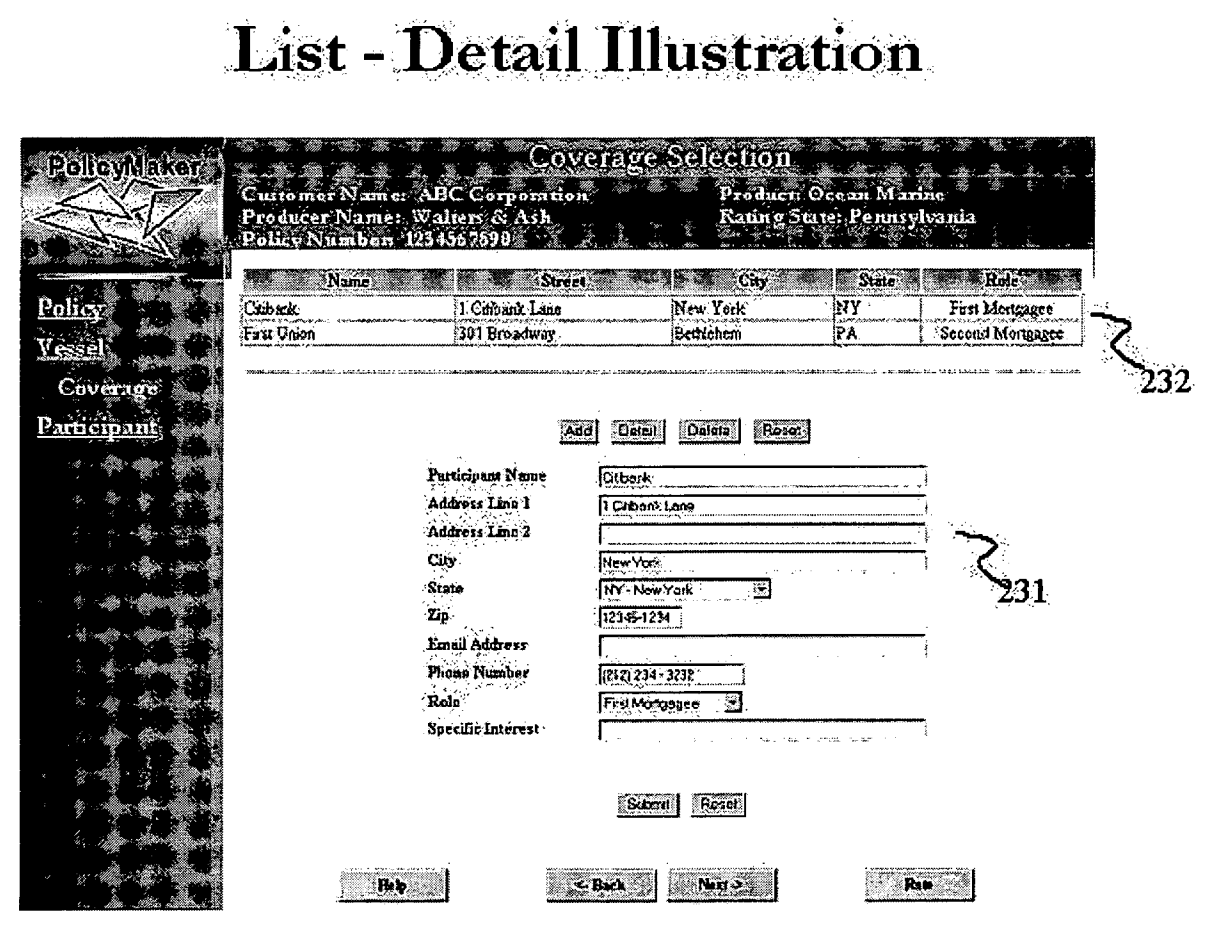

Referring to FIG. 23, shown therein is a List Detail Unit that includes a list 232 and a detail area 231 for the selected item on the list.

Figure 24:
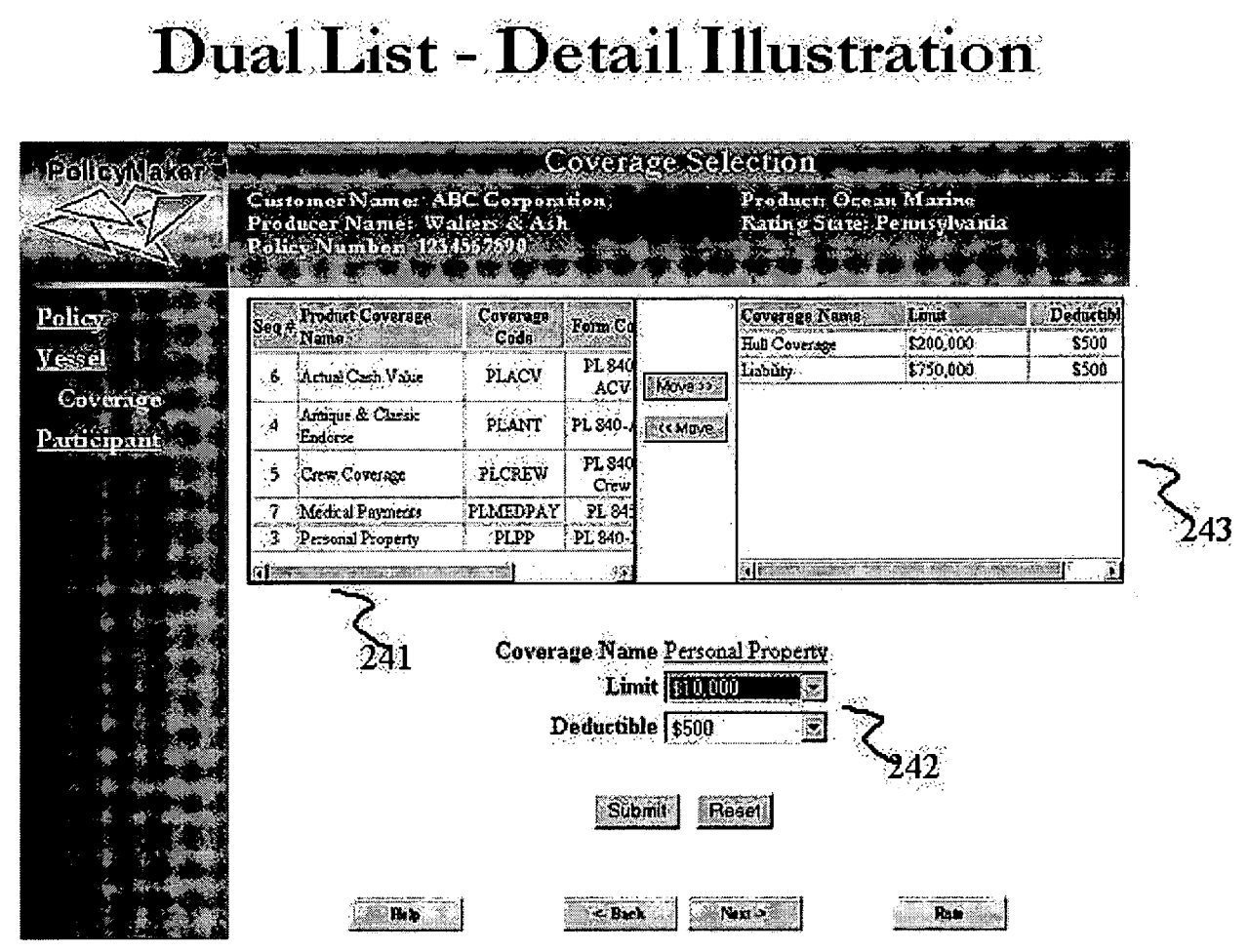

Referring to FIG. 24, shown therein is a Dual-List Detail Adaptive Unit that includes a left side list 241 and a right side list 243 and a detail area 242 for the selected item.

Figure 25:
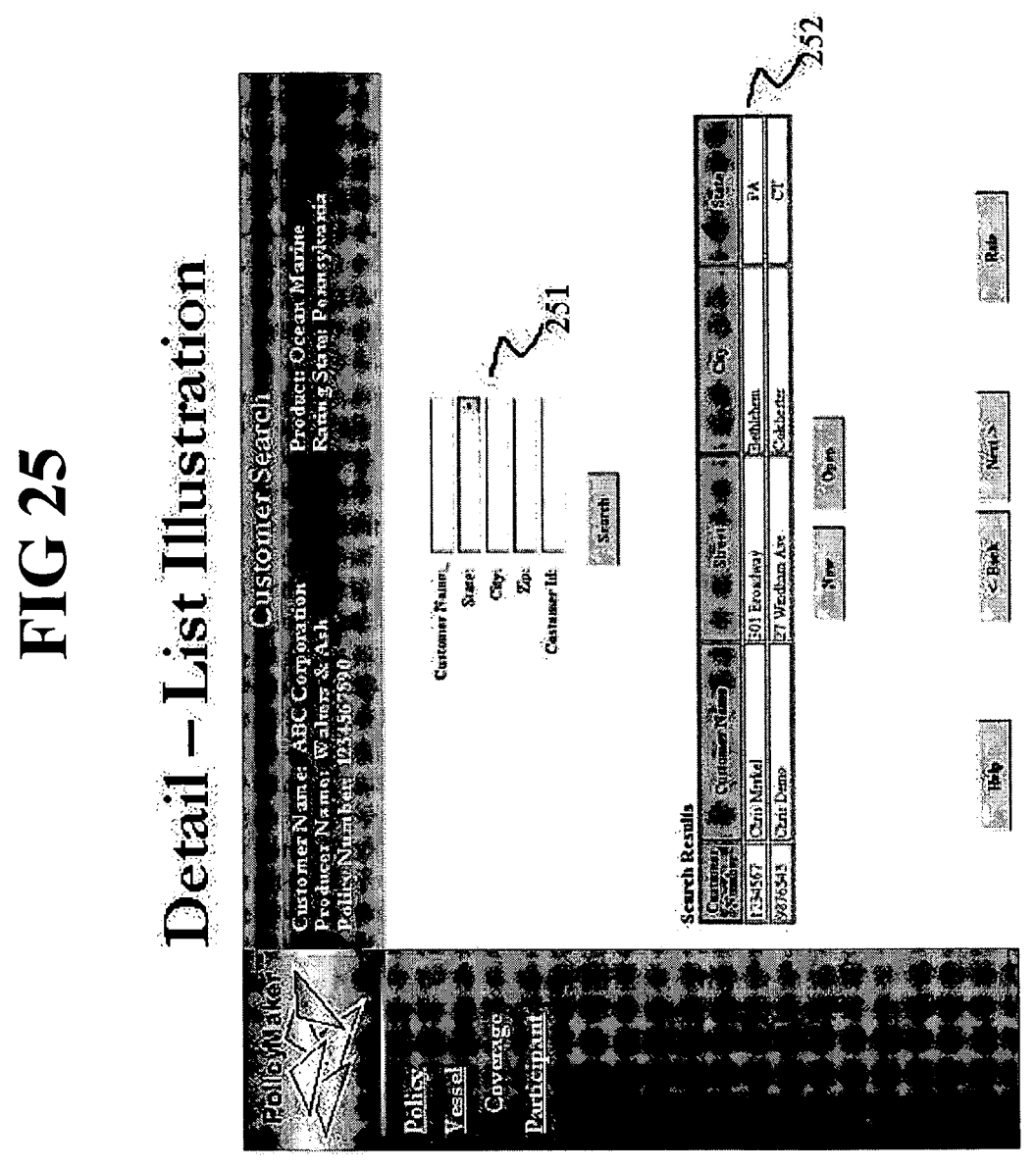

Referring to FIG. 25, shown therein is a Detail—List Adaptive Unit that includes a detail area 251 and a list 252 for the selected item on the detail area 251.

Sometimes the main body of the web page is composed of a combination of two or more Adaptive Units. The following are some examples of frequently encountered combinations—List-Detail AU (see FIG. 23 for an example), Dual-List Detail AU (see FIG. 24 for an example), Detail-List AU (see FIG. 25 for an example). Other combinations are also possible depending upon the precise requirements of a given application. Essentially, any desired web page can be created from a combination of these four Adaptive Units, which makes it rather simple to create any desired web page rapidly.

List Adaptive Unit

Figure 6A:
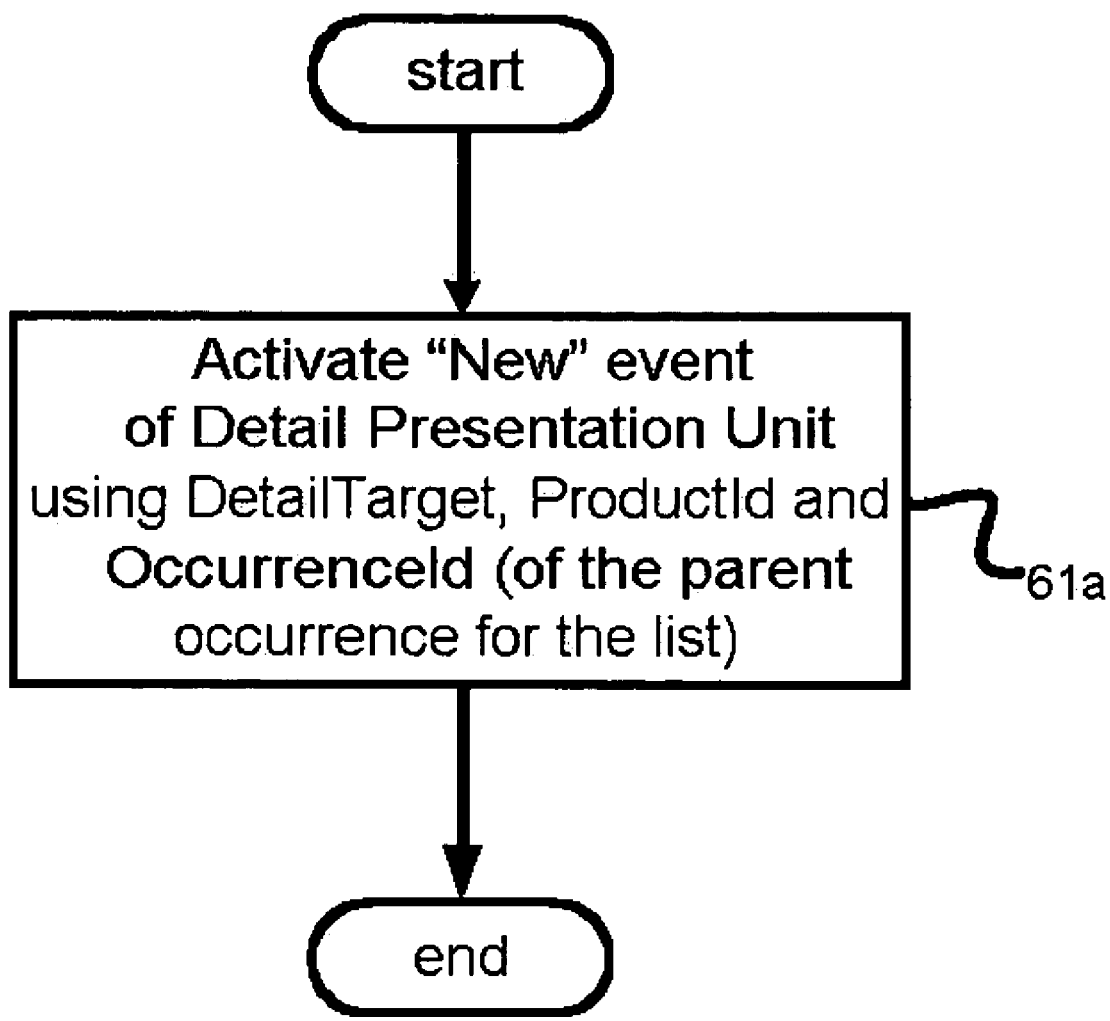
FIG. 6A depicts the process outline for the Add event of the List Adaptive Unit according to another aspect of the present invention.
Figure 6B:
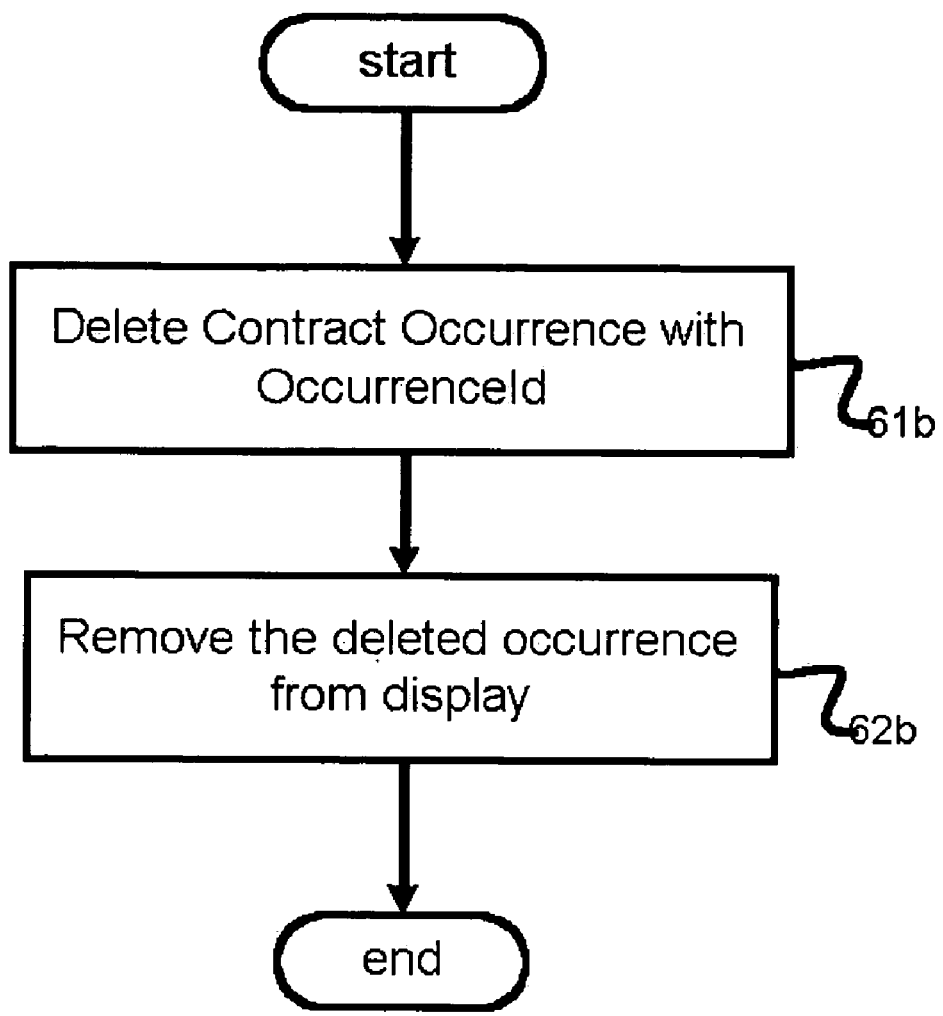
FIG. 6B depicts the process outline for the Delete event of the List Adaptive Unit according to another aspect of the present invention.

In the List Adaptive Unit, there are several possible events that can be initiated—Load (see FIG. 9D), View/Edit (see FIG. 7), Add (see FIG. 6A) and Delete (see FIG. 6B). Each event is activated when a user clicks on the link associated with the given event. The List Adaptive unit has the following properties—ViewName, DetailTarget, ProductId and Occurrence ID. These properties are the information elements via which the List Adaptive Unit receives and transfers parameters.

Turning to FIG. 6A, shown therein is the process 60a that is initiated upon clicking on the Add link in the List Adaptive Unit. This process 60a in turn activates the "New" event of the Detail Adaptive Unit (see FIGS. 9A–C) using DetailTarget, ProductId, and OccurrenceId of the parent occurrence for the list (step 61a). The remaining steps are explained in the New event of the Detail Adaptive Unit below.

Turning to FIG. 6B, shown therein is the process 60b that is initiated upon clicking on the Delete link in the List Adaptive Unit. First, the Contract Occurrence with the OccurrenceId is deleted (step 61b). Then, the deleted occurrence is removed from the display (step 62b).

Figure 7:
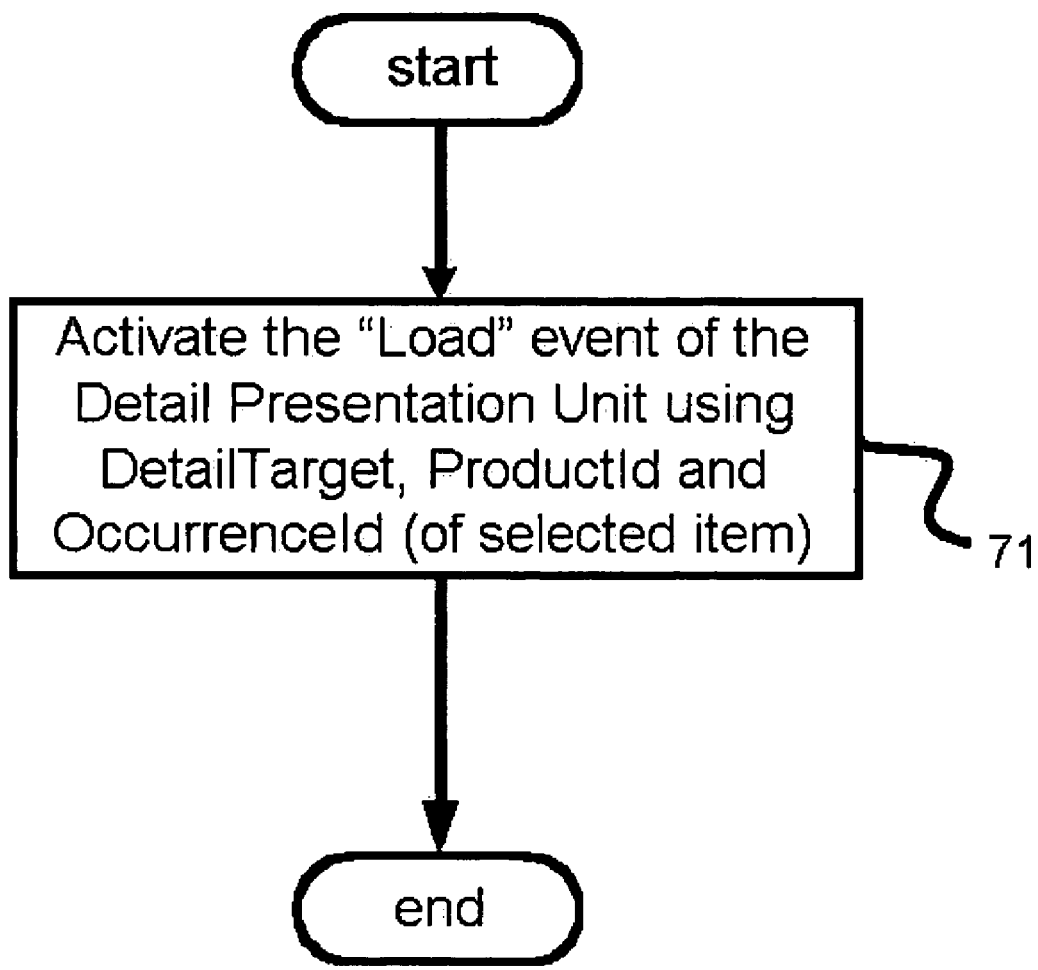
FIG. 7 depicts the process outline for the View/Edit event of the List Adaptive Unit according to another aspect of the present invention.

Turning to FIG. 7, shown therein is the process 70 that is initiated upon clicking on the View/Edit link in the List Adaptive Unit. This process 70 in turn activates the "Load" event of the Detail Adaptive Unit (see FIGS. 8A–C) using DetailTarget, ProductId, and OccurrenceId of a selected item (step 71). The remaining steps are explained in the Load event of the Detail Adaptive Unit below.

Turning to FIG. 9D, the process 90d initiated by clicking on the Load link in the List Adaptive Unit is shown therein. Once initiated, the process 90d retrieves the View attributes using the ViewName (step 91d). Next, the attributes of each View Item are retrieved for the ViewName and ProductId (step 92d). For each View Item, the Question attributes are retrieved (step 93d). Using the OccurrenceId as a "parent-id", the "children" Contract Occurrences are retrieved from the Contract Ancestry (step 94d). Next, the Contract Answers are retrieved for the Questions related to the View Items from each occurrence (step 95d). Finally, the answers are displayed for each Contract Occurrence in a separate line (step 96d) and the process ends.

Detail Adaptive Unit

In this Adaptive Unit, there are several possible events that can be initiated—Load, New, Continue and Submit. The Detail Adaptive Unit has the following properties—ViewName, Occurrence ID, ProductId and SegmentNo.

Figure 8A:
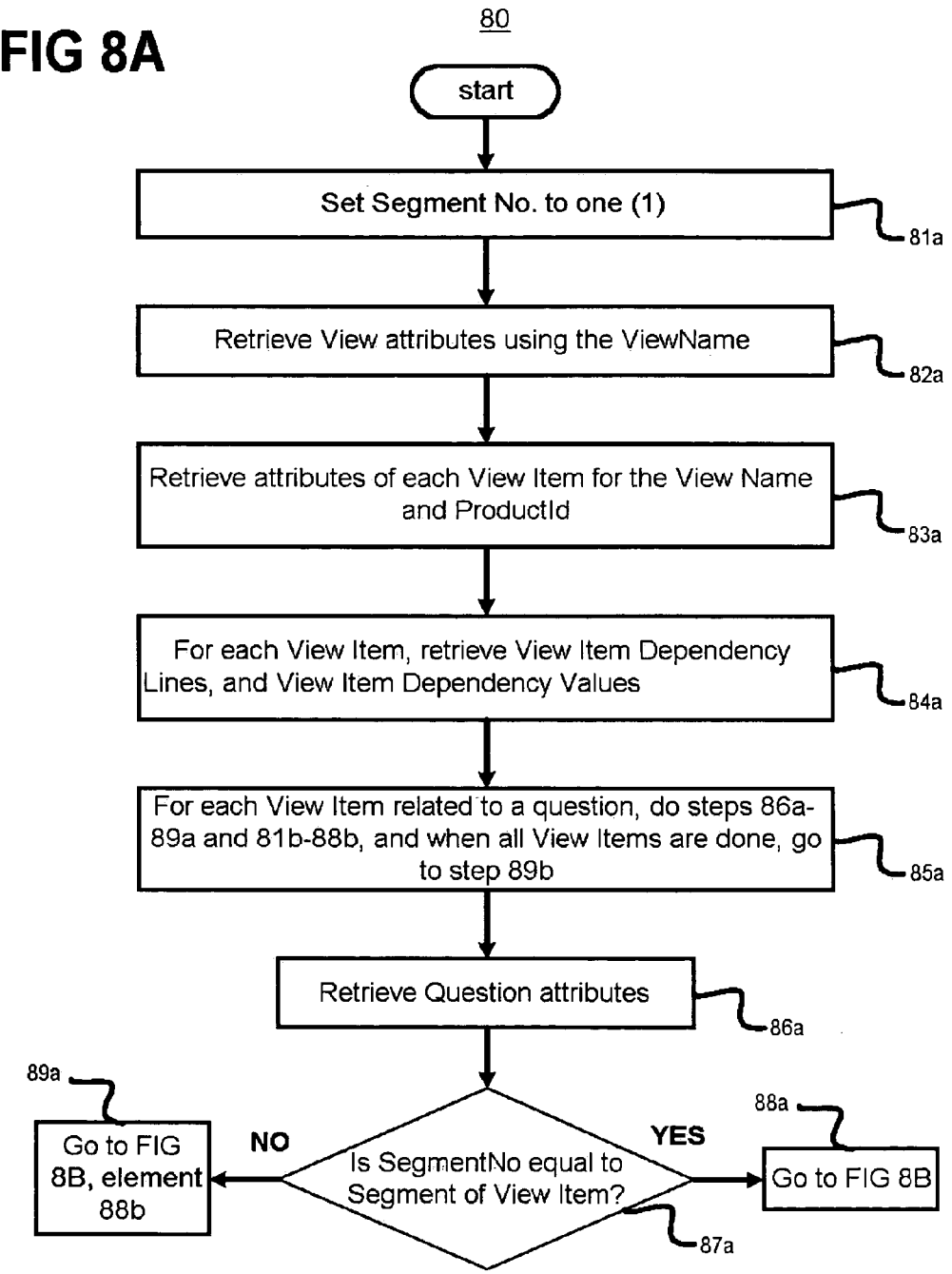

Referring to FIGS. 8A–C, shown therein is the process 80 that is initiated upon clicking on the Load link of the Detail Adaptive Unit. The SegmentNo is initialized to one (1) 81a. The View Attributes are retrieved using the ViewName 82a. The attributes for each View Item for the View Name and ProductId are then retrieved 83a. Next, for each View Item, the View Item Dependency Lines and the View Item Dependency Values are retrieved 84a. For each View Item related to a Question, steps 86a–89a and 81b–88b are performed, after which the process moves to step 89b. In step 86a, the question attributes are retrieved. In step 87a, the SegmentNo is compared to the Segment of the View Item, and if equal, the process moves to step 88a (FIG. 8B). If the SegmentNo is not equal to the Segment of the View Item the process moves to step 88b of FIG. 8B (step 89a).

Turning to FIG. 8B, the process continues in step 81b from FIG. 8A. Next, the ProductId is evaluated and if the ProductId is not zero, the process moves to step 83b, in which the Question attributes are overridden using the Contract Question by Product and the process moves to step 86b. If the ProductId is zero, the process moves to step 84b, in which the determination is made as to whether the question has answer options, and if so, the process moves to step 85b, in which the attributes of each answer option are retrieved, and then the process moves to step 86b. If the Question does not have answer options, the process moves to step 86b directly, thereby skipping step 85b. Next, the determination is made as to whether the question has question relations 86b. If the question has question relations, then the process moves to step 87b, which takes us to FIG. 8C, step 81c. If the question does not have question relations, then the process moves to step 89b, in which after eliminating those View Items that are inapplicable because of question dependency conditions, the remaining View Items are displayed with Segment equal to SegmentNo along with answers that are not hyperlinked, and the process ends.

Turning to FIG. 8C, this subprocess is initiated by an affirmative response to the determination of step 86b. First, the attributes of each Question Relation are retrieved 82c. For "default" and "derive" relations, the Contract Answer is retrieved from higher-level contract entities using OccurrenceId and Contract Ancestry to determine value of the answer 83c. For a "link" question relation, the set of possible selections is retrieved using the ProductId 84c. For a "dynamic" question relation, attributes from "Contract Question By Product Occurrence" and from "Contract Answer Option by Product Occurrence" are retrieved 85c, and the process returns to FIG. 8B, step 87b (step 86c).

Figure 9B:
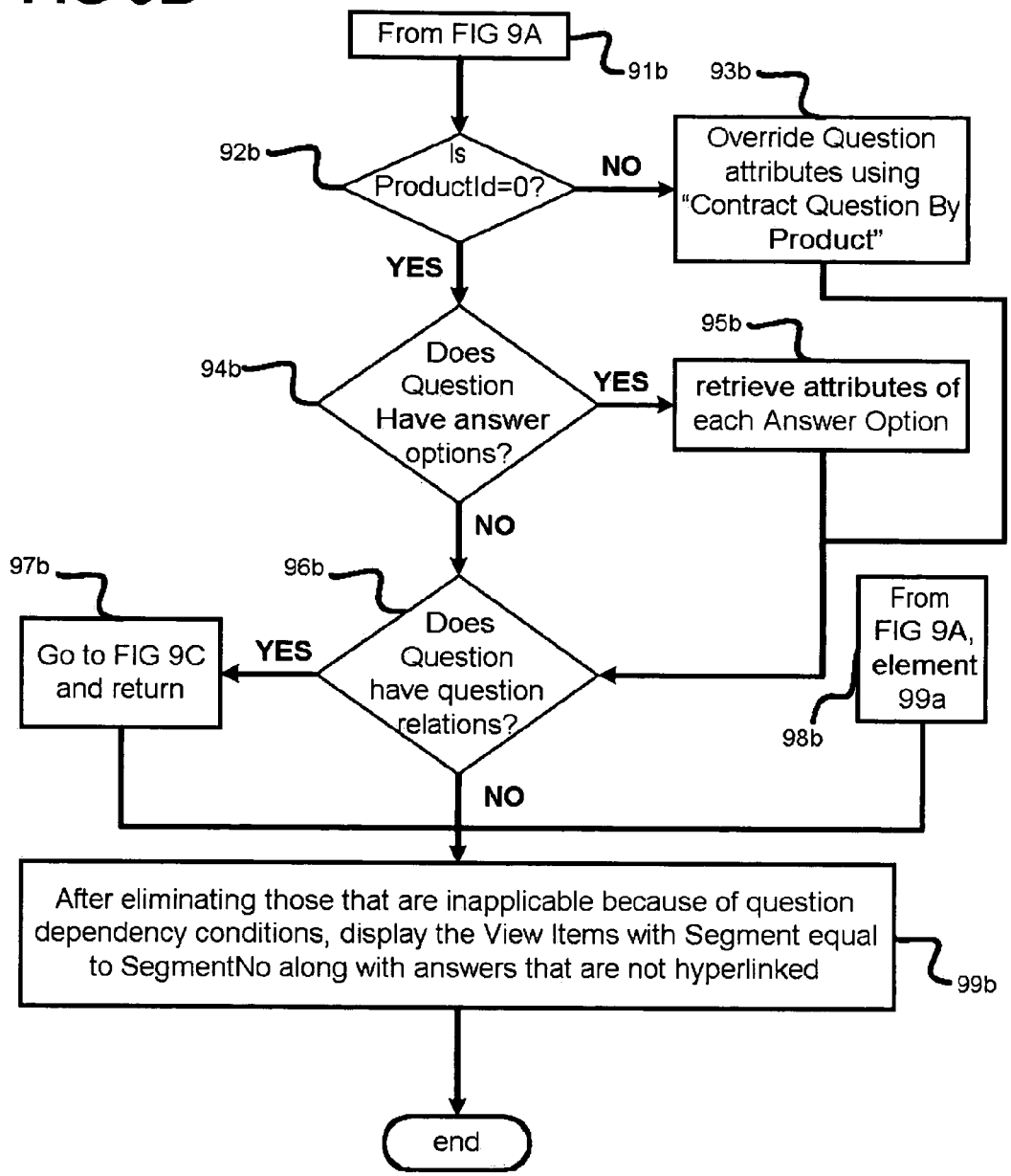

Referring to FIGS. 9A–C, shown therein is the process 90 that is initiated upon clicking on the New link of the Detail Adaptive Unit. The SegmentNo is initialized to one (1) 91a. The View Attributes are retrieved using the ViewName 92a. The attributes for each View Item for the View Name and ProductId are then retrieved 93a. Next, for each View Item, the View Item Dependency Lines and the View Item Dependency Values are retrieved 94a. For each View Item related to a Question, steps 96a–99a and 91b–98b are performed, after which the process moves to step 99b. In step 96a, the question attributes are retrieved. In step 97a, the SegmentNo is compared to the Segment of the View Item, and if equal, the process moves to step 98a (FIG. 9B). If the SegmentNo is not equal to the Segment of the View Item the process moves to step 98b of FIG. 9B (step 99a).

Turning to FIG. 9B, the process continues in step 91b from FIG. 9A. Next, the ProductId is evaluated and if the ProductId is not zero, the process moves to step 93b, in which the Question attributes are overridden using the Contract Question by Product and the process moves to step 96b. If the ProductId is zero, the process moves to step 94b, in which the determination is made as to whether the question has answer options, and if so, the process moves to step 95b, in which the attributes of each answer option are retrieved, and then the process moves to step 96b. If the Question does not have answer options, the process moves to step 96b directly, thereby skipping step 95b. Next, the determination is made as to whether the question has question relations 96b. If the question has question relations, then the process moves to step 97b, which takes us to FIG. 9C, step 91c. If the question does not have question relations, then the process moves to step 99b, in which after eliminating those View Items that are inapplicable because of question dependency conditions, the remaining View Items are displayed with Segment equal to SegmentNo along with answers that are not hyperlinked, and the process ends.

Turning to FIG. 9C, this subprocess is initiated by an affirmative response to the determination of step 96b. First, the attributes of each Question Relation are retrieved 92c. For "default" and "derive" relations, the Contract Answer is retrieved from higher-level contract entities using OccurrenceId and Contract Ancestry to determine value of the answer 93c. For a "link" question relation, the set of possible selections is retrieved using the ProductId 94c. For a "dynamic" question relation, attributes from "Contract Question By Product Occurrence" and from "Contract Answer Option by Product Occurrence" are retrieved 95c, and the process returns to FIG. 9B, step 97b (step 96c).

Referring to FIGS. 10A–B, shown therein is the process 100a that is initiated upon clicking on the Continue link of the Detail Adaptive Unit. First, the SegmentNo is increased by one (1) 101a. Next, for each View Item with Segment=SegmentNo that is related to a Question, steps 103a–109a are performed, after which the process moves to step 110a (step 102a). In step 103a, the ProductId is evaluated and if the ProductId is not zero, the process moves to step 104a, in which the Question attributes are overridden using the Contract Question by Product and the process moves to step 107a. If the ProductId is zero, the process moves to step 105a, in which the determination is made as to whether the question has answer options, and if so, the process moves to step 106a, in which the attributes of each answer option are retrieved, and then the process moves to step 107a. If the Question does not have answer options, the process moves to step 107a directly, thereby skipping step 106a. Next in step 108a, the determination is made as to whether the question has question relations. If the question has question relations, then the process moves to step 109a, which takes us to FIG. 10B, step 101b. If the question does not have question relations, then the process moves to step 110a, in which the View Items with Segment less than SegmentNo are displayed along with hyperlinked answers. In step 111a, after eliminating those View Items that are inapplicable because of question dependency conditions, the remaining View Items are displayed with Segment equal to SegmentNo along with answers that are not hyperlinked, and the process ends.

Turning to FIG 10B, this subprocess is initiated by an affirmative response to the determination of step 108a. First, the attributes of each Question Relation are retrieved 102b. For "default" and "derive" relations, the Contract Answer is retrieved from higher-level contract entities using OccurrenceId and Contract Ancestry to determine value of the answer 103b. For a "link" question relation, the set of possible selections is retrieved using the ProductId 104b. For a "dynamic" question relation, attributes from "Contract Question By Product Occurrence" and from "Contract Answer Option by Product Occurrence" are retrieved 105*b*, and the process returns to FIG. 10A, step 109*a* (step 106*b*).

Referring to FIG. 11C, shown therein is the process 112*c* that is initiated upon clicking on the Submit link of the Detail Adaptive Unit. First, in step 113*c*, if a new Contract Occurrence has been introduced, the new Contract Occurrence is added to the database. Then in step 114*c*, each new Contract Answer is added to the database. Each Contract Answer that has been modified in the database is then updated (step 115*c*). Next, questions that have been deleted or made inapplicable (by dependency conditions) from the database are deleted in step 116*c*.

Dual List Adaptive Unit

In this Adaptive Unit, there are four possible events that can be initiated—Load, View/Edit, Add>> and <<Remove. This Adaptive Unit has the following properties—LeftViewName, RightViewName, DetailTarget, LinkedEntity, LinkedQuestion, Occurrence ID and ProductId.

Figure 11D:
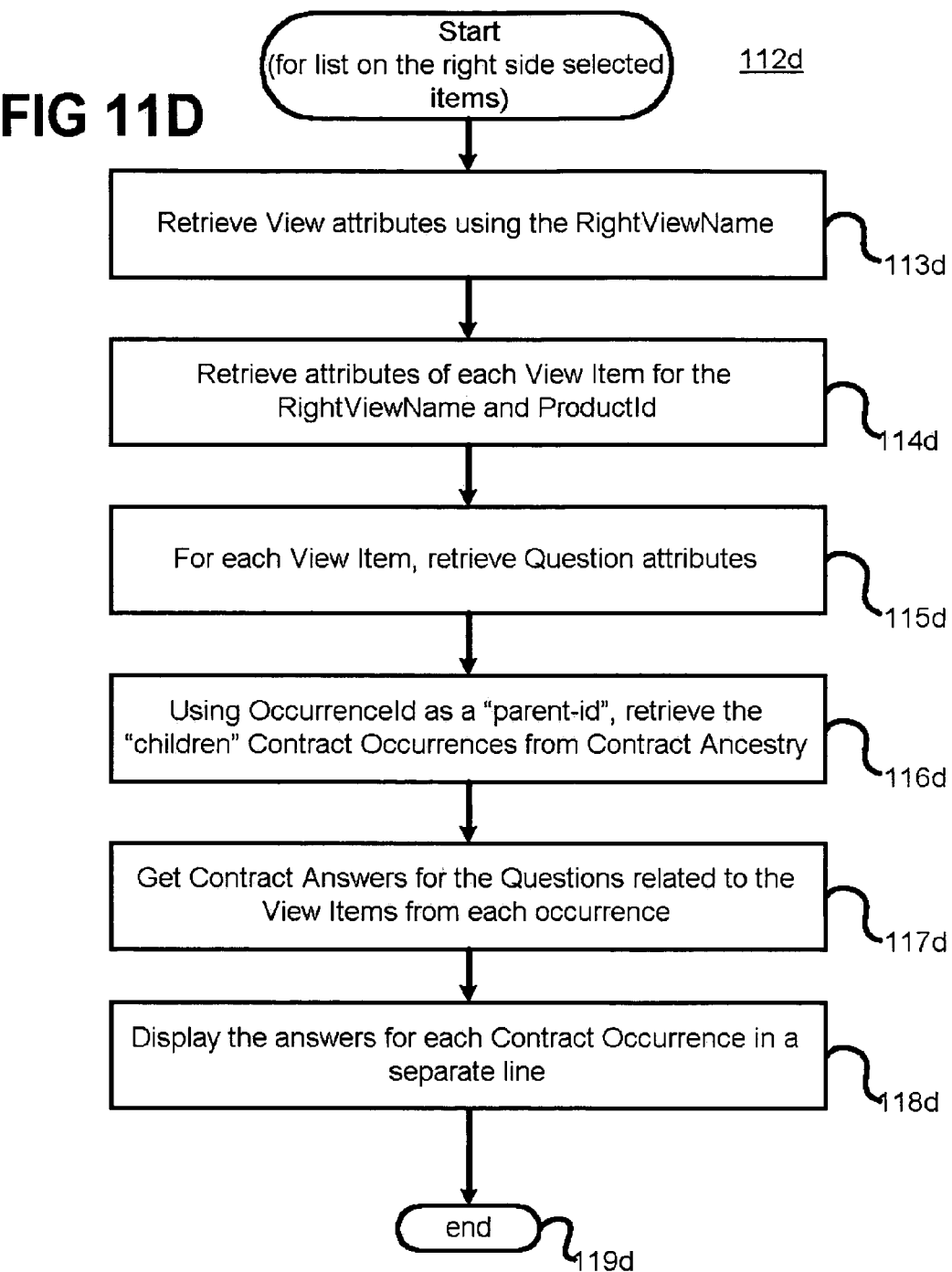
FIGS. 11D–E depict the process outline for the Load event of the Dual List Adaptive Unit according to another aspect of the present invention.
Figure 11E:
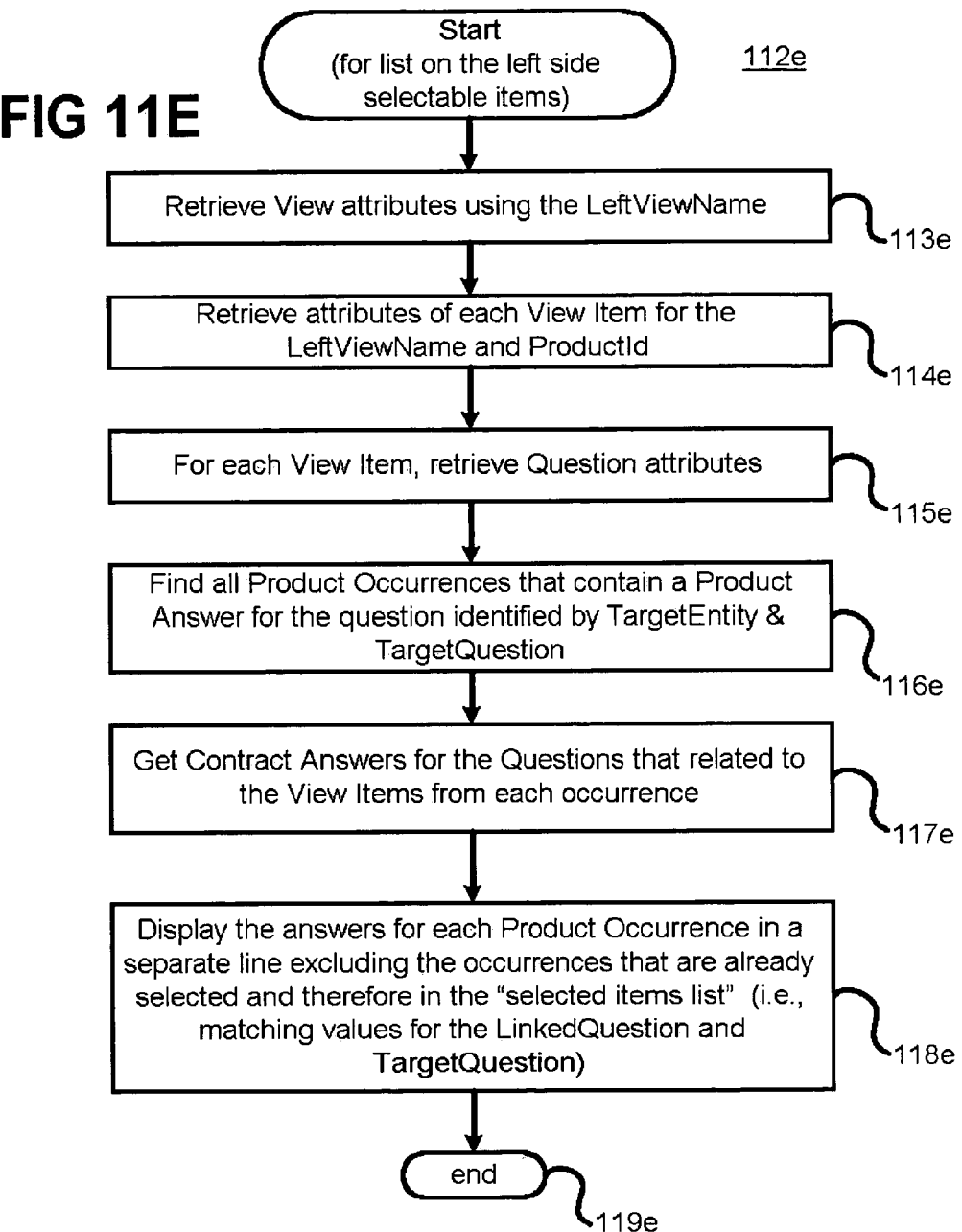

Referring to FIGS. 11D–E, shown therein is the process that is initiated upon clicking on the Load link of the Dual List Adaptive Unit. FIG. 11D shows the portion 112*d* of the process that is applicable to the list on the right side of the selected items, whereas FIG. 11E shows the portion 112*e* of the process that is applicable to the list on the left side of the selected items.

Turning to FIG. 11D, in step 113*d*, the View attributes are retrieved using the RightViewName. Next in step 114*d*, the attributes of each View Item are retrieved for the RightViewName and ProductId. Next in step 115*d*, for each View Item, the Question attributes are retrieved. In step 116*d*, using OccurrenceId as a "parent-id", the "children" Contract Occurrences are retrieved from the Contract Ancestry. Next in step 117*d*, Contract Answers are obtained for the Questions related to the View Items from each occurrence. Finally in step 118*d*, the answers for each Contract Occurrence are displayed in a separate line.

Turning to FIG. 11E (for the list on the left side of the selectable items), in step 113*e*, the View attributes are retrieved using the LeftViewName. Next in step 114*e*, the attributes of each View Item are retrieved for the LeftViewName and ProductId. Next in step 115*e*, for each View Item, the Question attributes are retrieved. In step 116*e*, all Product Occurrences are found that contain a Product Answer for the question identified by TargetEntity and TargetQuestion. Next in step 117*e*, Contract Answers are obtained for the Questions related to the View Items from each occurrence. Finally in step 118*e*, the answers for each Product Occurrence are displayed in a separate line excluding the occurrences that are already selected and therefore in the "selected items list" (i.e., matching values for the LinkedQuestion and TargetQuestion).

Figure 11F:
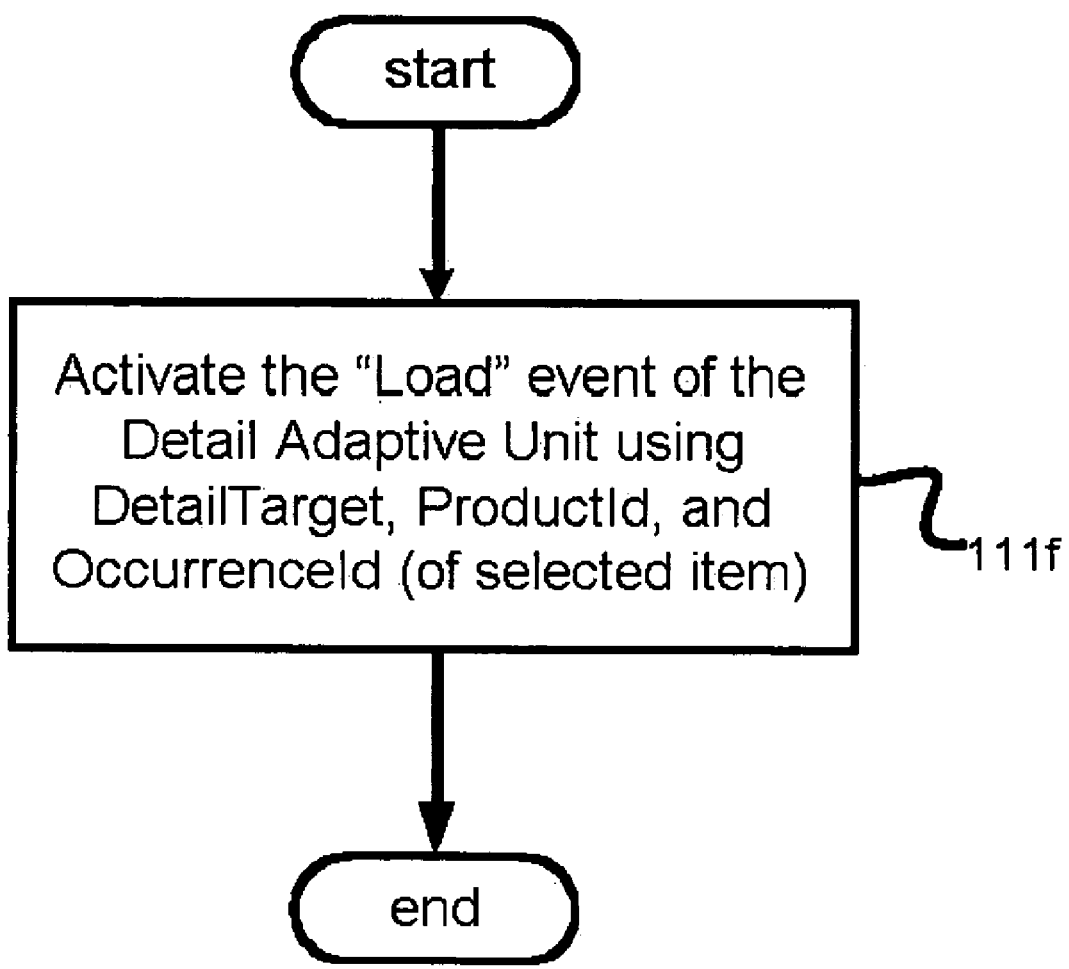
FIG. 11F depicts the process outline for the View/Edit event of the Dual List Adaptive Unit

Referring to FIG. 11F, shown therein is the process that is initiated upon clicking on the View/Edit link of the Dual List Adaptive Unit. Clicking the View/Edit link initiates process 110*f*, which in step 111*f* activates the "Load" event of the Detail Adaptive Unit using DetailTarget, ProductId, and OccurrenceId (of selected item).

Figure 11G:
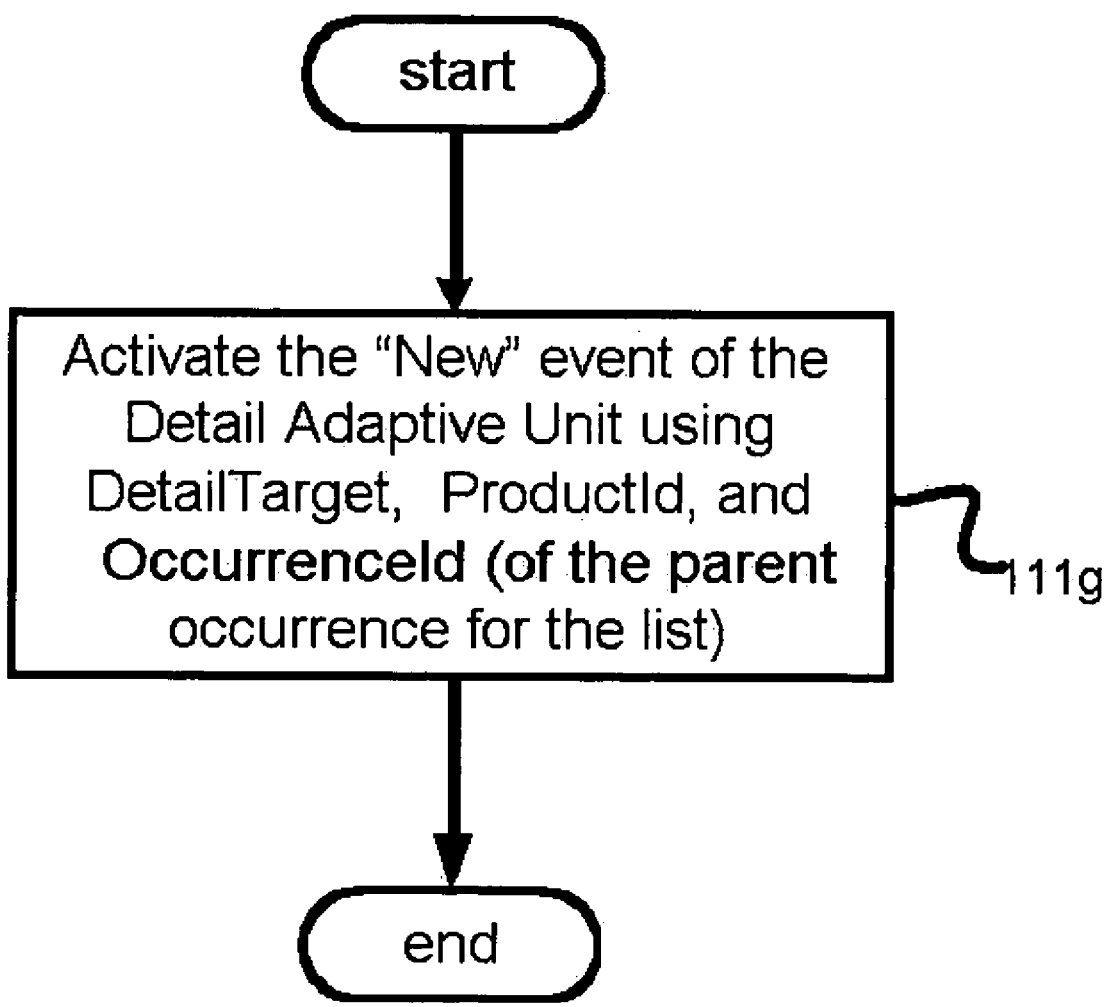
FIG. 11G depicts the process outline for the Add>> event of the Dual List Adaptive Unit according to another aspect of the present invention.

Referring to FIG. 11G, shown therein is the process that is initiated upon clicking on the "Add>>" link of the Dual List Adaptive Unit. Clicking the "Add>>" link initiates process 110*g*, which in step 111*g* activates the "New" event of the Detail Adaptive Unit using DetailTarget, ProductId, and OccurrenceId (of the parent occurrence for the list).

Referring to FIG. 11H, shown therein is the process that is initiated upon clicking on the "Remove>>" link of the Dual List Adaptive Unit. Clicking the "Remove>>" link initiates process 110*h*, which in step 111*h* deletes the Contract Occurrence with OccurrenceId. Next in step 112*h*, the deleted occurrence is removed from display on the right list. Finally, in step 113*h*, the corresponding occurrence is displayed on the left list.

Updateable List Adaptive Unit

In this Adaptive Unit, there are several possible events that can be initiated—Load, Add Row, Delete Row and Submit. This Adaptive Unit has the following properties—ListViewName, DetailViewName, Occurrence ID and ProductId.

Figure 11I:
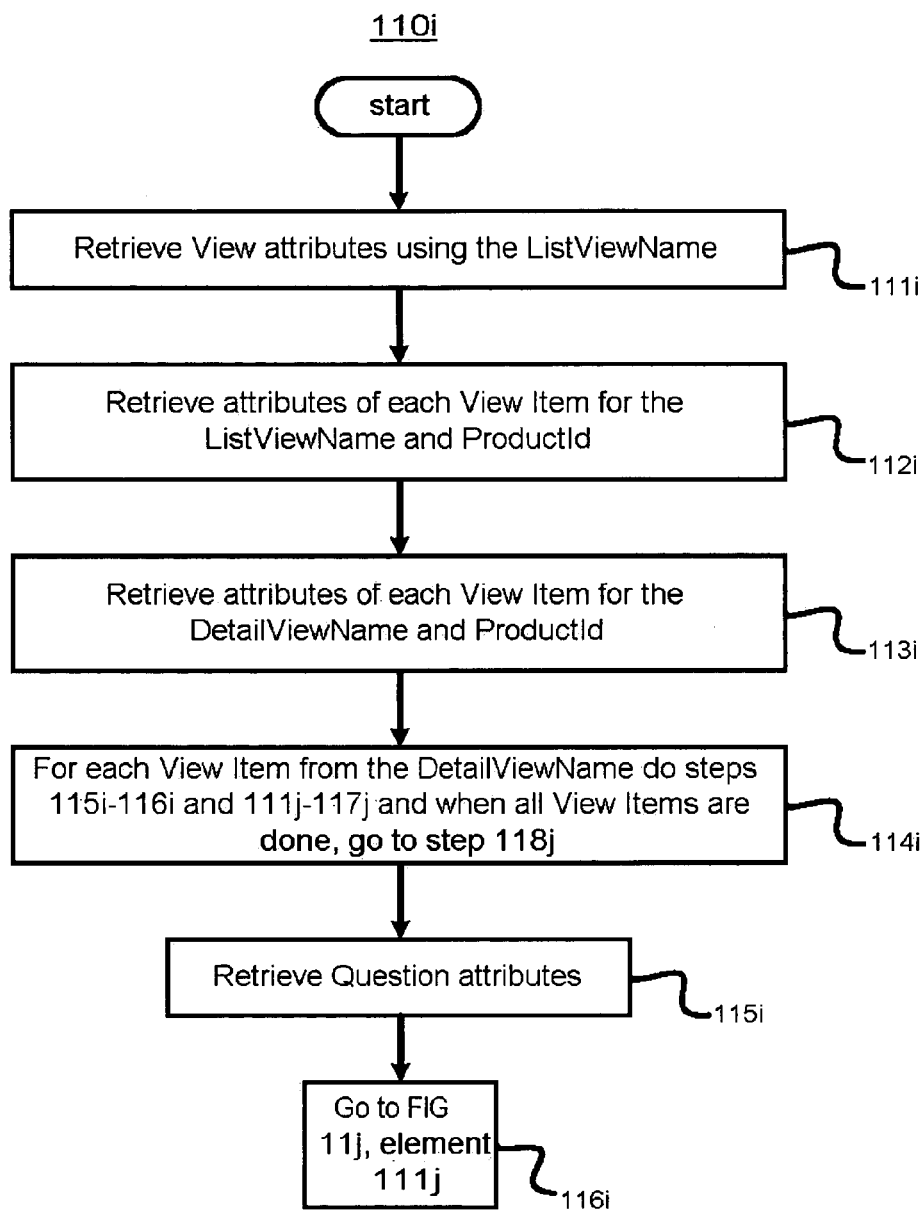
Figure 11K:
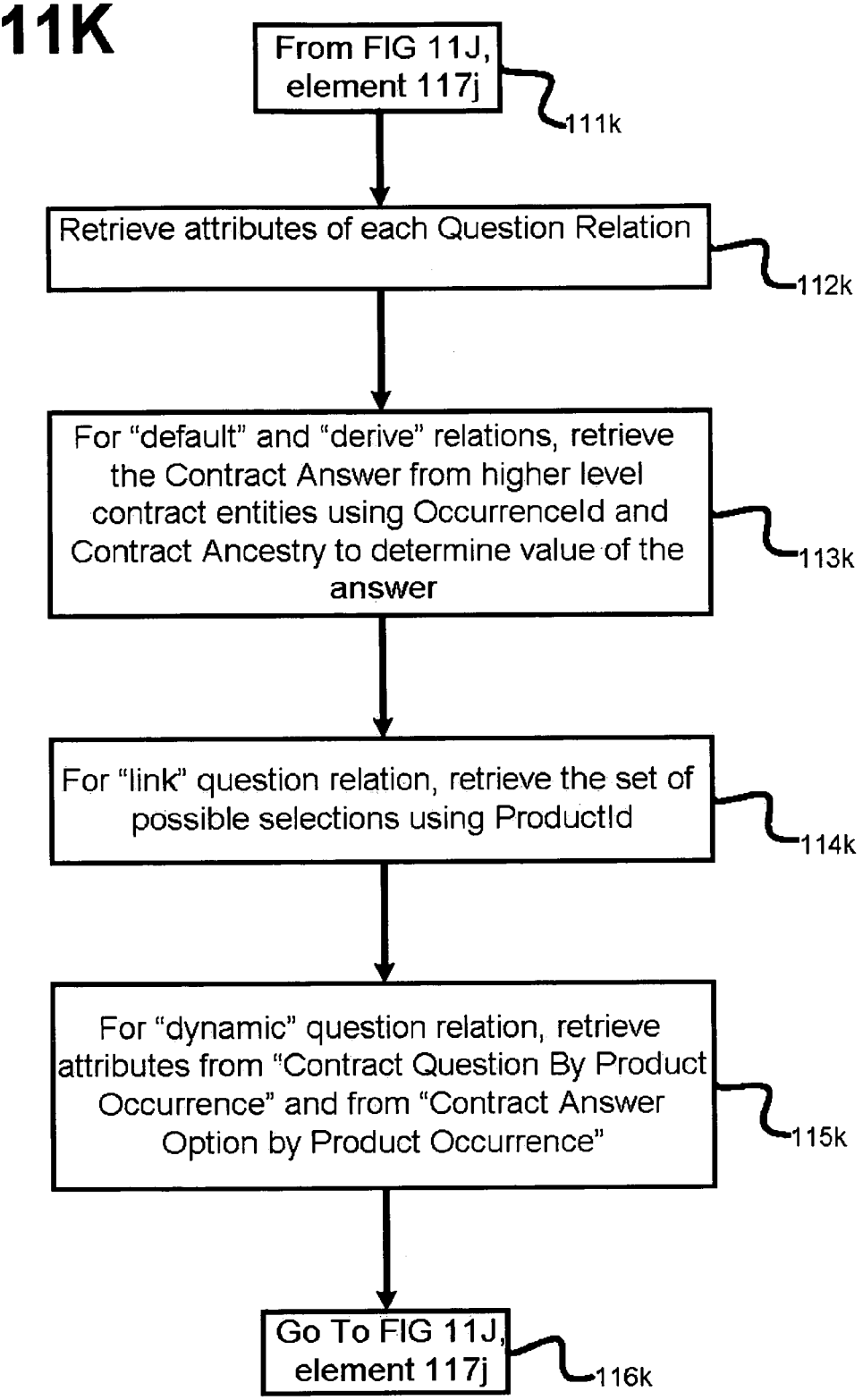

Referring to FIGS. 11I–K, shown therein is the process 110*i* that is initiated upon clicking on the Load link of the Updateable List Adaptive Unit. In step 111*i*, the View Attributes are retrieved using the ListViewName. The attributes for each View Item for the ListView Name and ProductId are then retrieved 112*i*. Next, for each View Item, the attributes are retrieved for the DetailViewName and ProductId 113*i*. For each View Item from the DetailViewName, steps 115*i*–116*i*, and 111*j*–117*j* are performed, after which the process moves to step 118*j*. In step 115*i*, the question attributes are retrieved. In step 116*i*, the process moves to FIG. 11J, element 111*j*.

Turning to FIG. 11J, the process continues in step 111*j* from FIG. 11I, step 116*i*. Next, the ProductId is evaluated and if the ProductId is not zero, the process moves to step 113*j*, in which the Question attributes are overridden using the Contract Question by Product and the process moves to step 116*j*. If the ProductId is zero, the process moves to step 114*j*, in which the determination is made as to whether the question has answer options, and if so, the process moves to step 115*j*, in which the attributes of each answer option are retrieved, and then the process moves to step 116*j*. If the Question does not have answer options, the process moves to step 116*j* directly, thereby skipping step 115*j*. Next, the determination is made as to whether the question has question relations 116*j*. If the question has question relations, then the process moves to step 117*j*, which takes us to FIG. 11K, step 111*k*. If the question does not have question relations, then the process moves directly to step 118*j*, in which the "children" Contract Occurrences from the Contract Ancestry are retrieved using OccurrenceId as a "parent-id." In step 119*j*, the Contract Answers for the Questions related to the DetailViewName View Items from each occurrence are obtained. Finally in step 120*j*, the answers for each Contract Occurrence are displayed in a separate line, and the process ends.

Turning to FIG. 11K, this subprocess is initiated by an affirmative response to the determination of step 116*j*. First, the attributes of each Question Relation are retrieved 112*k*. For "default" and "derive" relations, the Contract Answer is retrieved from higher-level contract entities using OccurrenceId and Contract Ancestry to determine value of the answer 113*k*. For a "link" question relation, the set of possible selections is retrieved using the ProductId 114*k*. For a "dynamic" question relation, attributes from "Contract Question By Product Occurrence" and from "Contract Answer Option by Product Occurrence" are retrieved 115*k*, and the process returns to FIG. 11J, step 117*j* (step 116*k*).

Figure 11L:
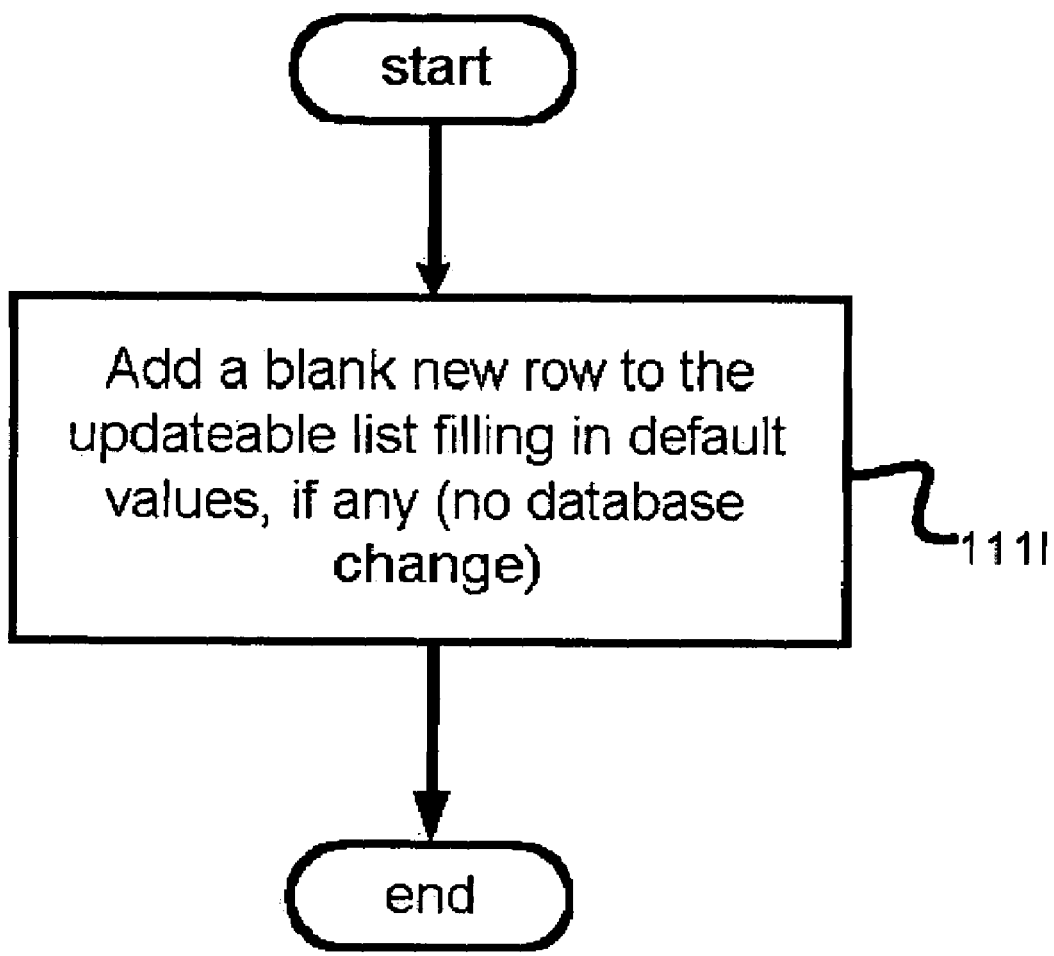
FIG. 11L depicts the process outline for the Add Row event of the Updateable List Adaptive Unit according to another aspect of the present invention.

Referring to FIG. 11L, shown therein is the process that is initiated upon clicking on the Add Row link of the Updateable List Adaptive Unit. Clicking the Add row link initiates process 110*l*, which in step 111*l* adds a blank new row to the updateable list filling in default values, if any (no database change), and the process ends.

Figure 11M:
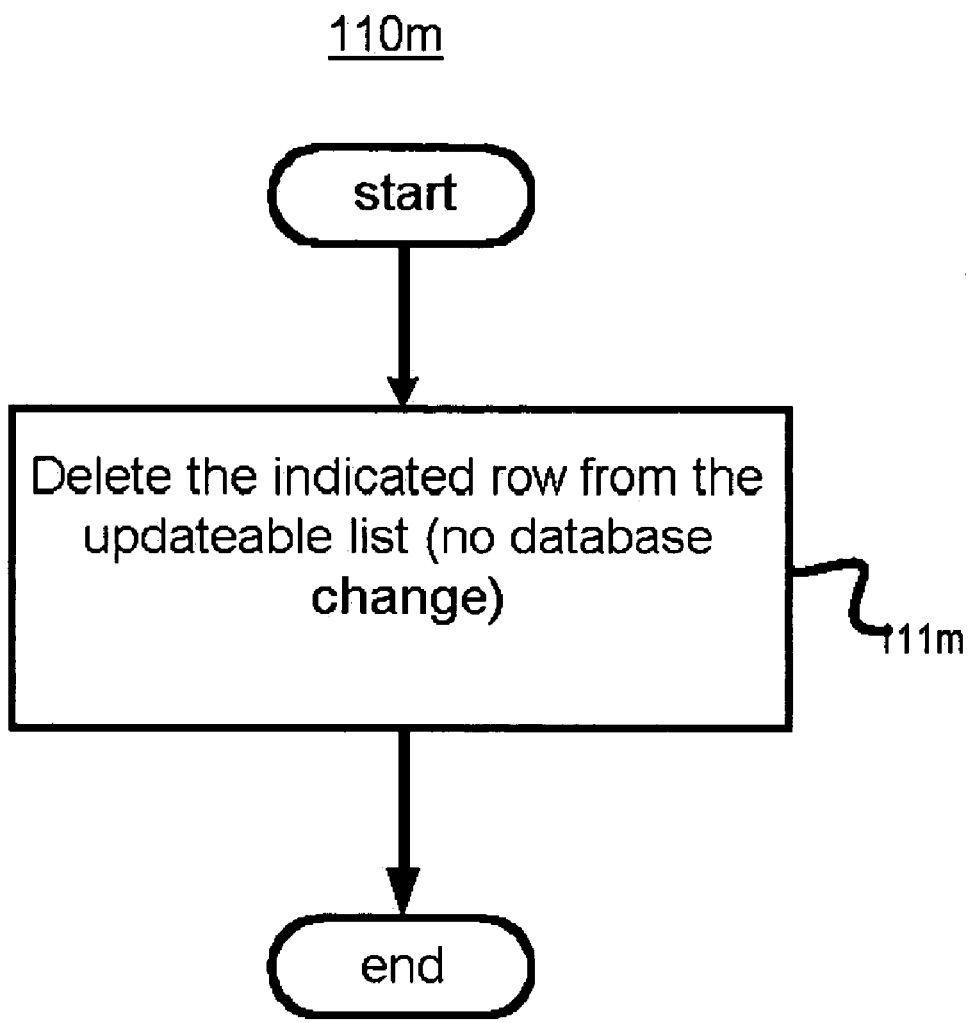
FIG. 11M depicts the process outline for the Delete Row event of the Updateable List Adaptive Unit according to another aspect of the present invention.

Referring to FIG. 11M, shown therein is the process that is initiated upon clicking on the Delete Row link of the Updateable List Adaptive Unit. Clicking the Delete row link initiates process 110*m*, which in step 111*m* deletes the indicated row from the updateable list (no database change), and the process ends.

Referring to FIG. 11N, shown therein is the process that is initiated upon clicking on the Submit link of the Updateable List Adaptive Unit. Clicking the Submit link initiates process 110*n*, which in step 111*n* adds each new Contract Occurrence, if any, to the database. Next in step 112*n*, each new Contract Answer, if any, is added to the database. Then in step 113*n*, each Contract Answer that has been modified in the database is updated. Finally in step 114*n*, questions that have been deleted or made inapplicable (by dependency conditions) are deleted from the database, and the process ends.

Question Relations

One or more of the embodiments of the present invention employ a technique known as Question Relations to provide an efficient, declarative, and non-redundant way for the Adaptive Application (e.g., PolicyWriter) to associate the answer of a Question with that (i.e., an answer) of another Question. The related question can be from the same entity or a different entity.

Depending on its type, a Question Relation may point to one or more Questions that are associated with a given question: Target-Q or Ref-Q.

The following table lists the Question Relation types.

| Code | Name | Parameters |
|------|------|------------|
| A | Variable | Target-Q |
| L | Link | Target-Q |
| S | Search | Target-Q |
| V | Value | Target-Q, Ref-Q |

The usage of all these Question Relations types, except for type A, (see variable properties below) is governed by QUESTION SOURCE, a Question property, which enables the answer of a Question to be associated with the answers to other Questions (from the same or different Entities).

The following QUESTION SOURCE values are of interest: Linked (L), Derived (D), and Defaulted (F).

Figure 26:
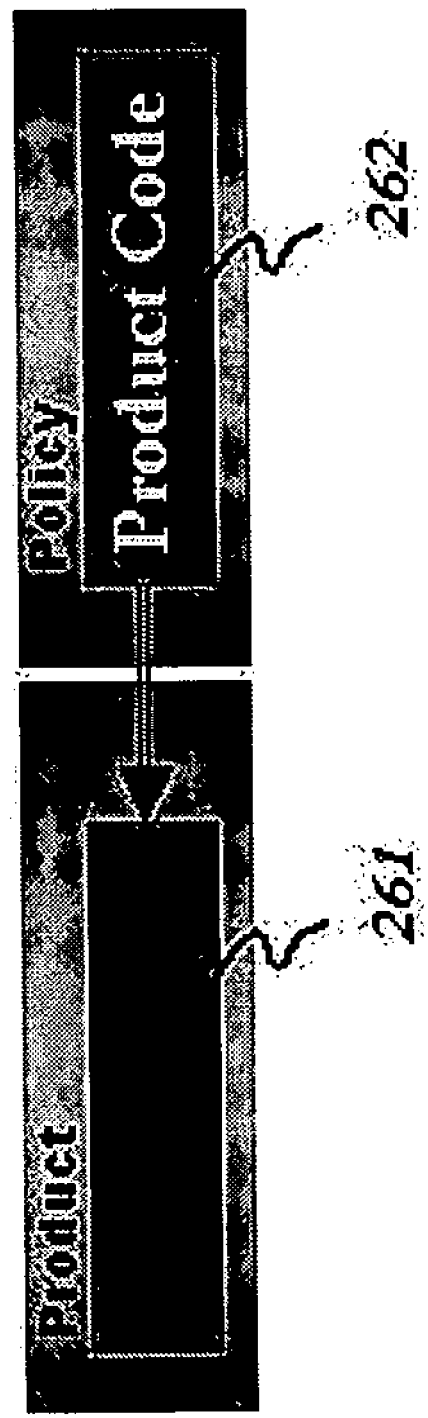
FIGS. 26–27 depict exemplary embodiments of a Linked Question Source according to another aspect of the present invention.

Referring to FIG. 26, A LINKED Question 262 duplicates a Question 261 of an "upstream" Entity, thus creating an association between two Entities. The answer of a Linked Question is always stored. Question relations that may be needed to facilitate a linked question are:

L—points to a question in the other database to link to

S—points to a question in the current database that provides the value of the particular parent occurrence under which the answer to the Question to link to is to be found in the other database V—points to a default answer for the linked question (in the current database)

Figure 27:
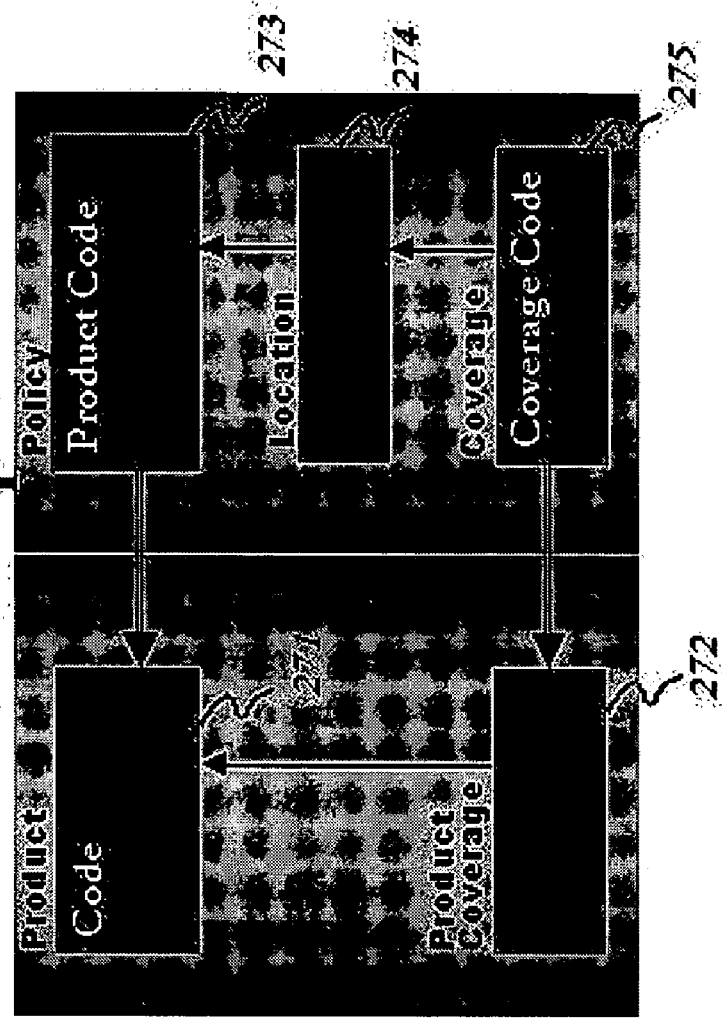

Turning to FIG. 27, the Linked Question is the Coverage Code 275. The Product Coverage Code is the question being linked to (element 272); Product Code 271 is used to determine the applicable Product Coverages. Two question relations are needed for this example. One of type L to point to the Product Coverage Code 275, and one of type S to use the Policy Product Code 273 as the parent ID for retrieving Product Coverages 272.

Figure 28:
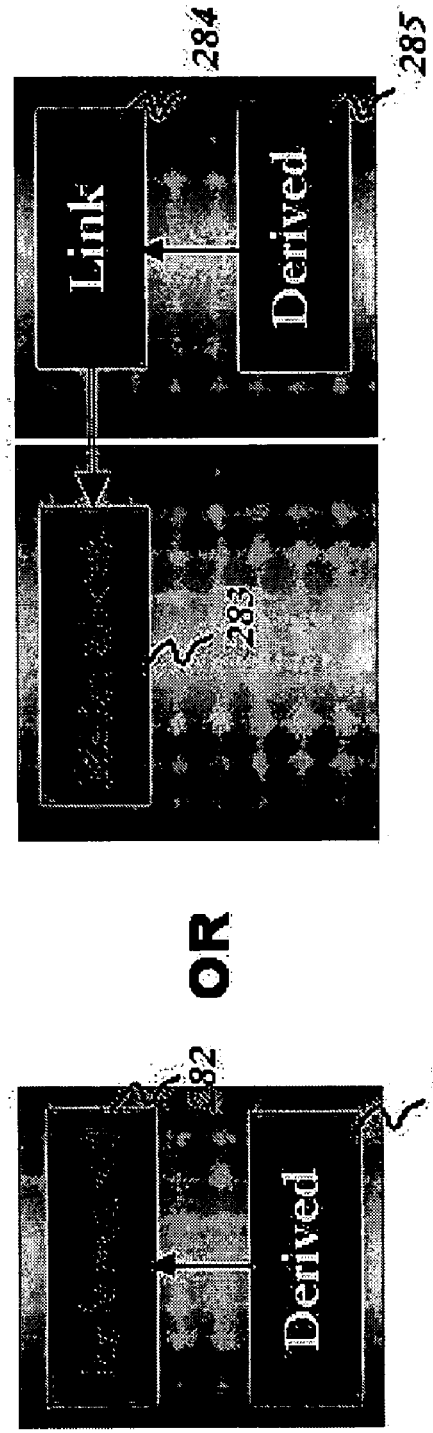
FIGS. 28–30 depict exemplary embodiments of a Derived Question Source according to another aspect of the present invention.

Turning to FIG. 28, A DERIVED Question acquires its answer by applying a formula to the answer of an Ancestor's or Extended Ancestor's Question which is called the Target Question. The answer of a Derived Question may be stored depending on the "Storage Code" property.

The Target Question is element 282, or 283. If the Target Question belongs to an Extended Ancestor, it must be specified via a Reference Question which is itself a link (element 284). The derived question is element 281, or 285. Only one Question Relation of type V needed in either case.

Figure 29:
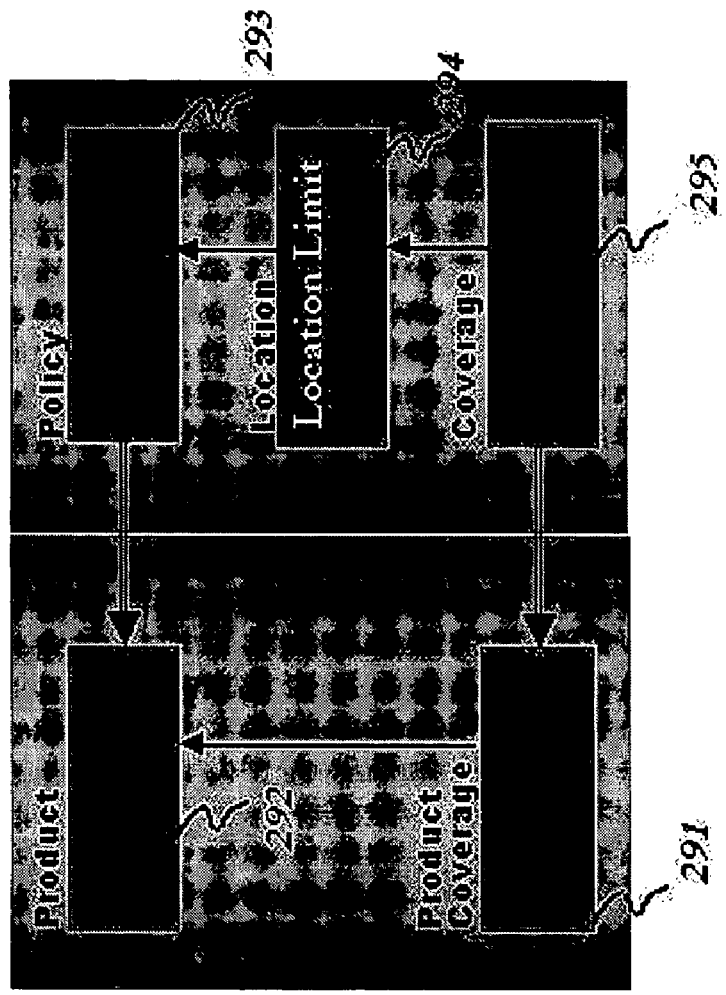

Turning to FIG. 29, the Derived Question is Location Limit (element 294).

Target Question is the Policy Limit (element 293). One Question Relation of type V is needed.

Figure 30:
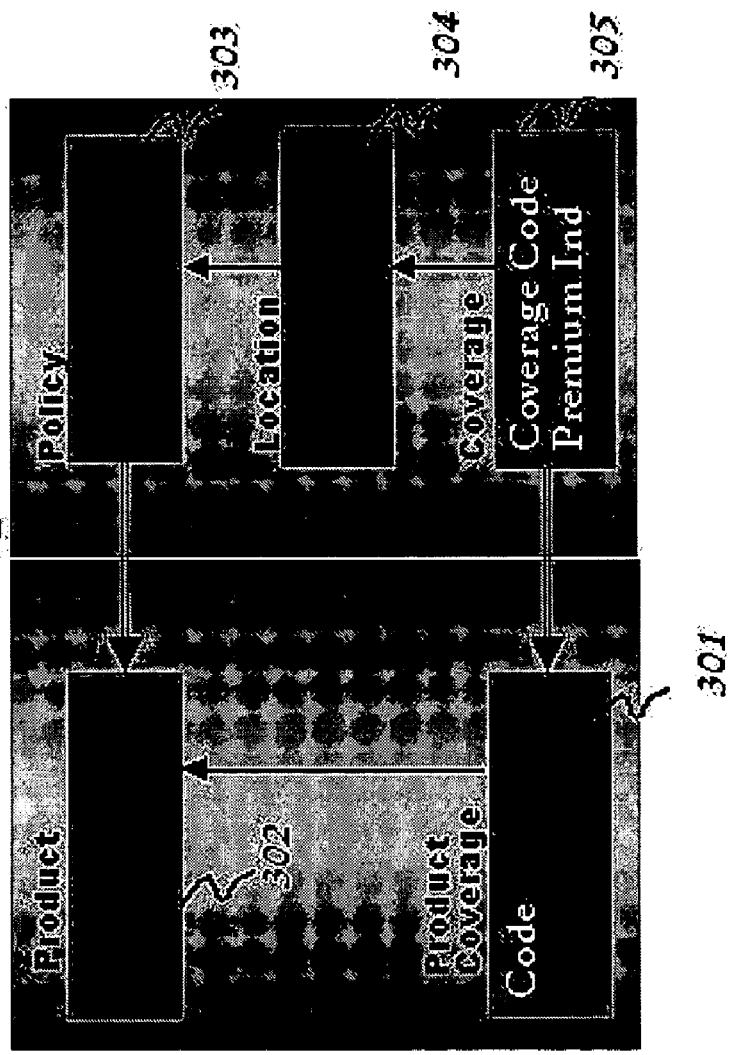

Turning to FIG. 30, the Derived Question is Coverage Premium Ind (element 305). The Target question is Product Coverage Premium Ind (element 301). The Coverage Code is the link that is used to make the connection (Coverage Ccode in element 305). One Question relation row of type V is needed (Target-Q=Product Coverage.Premium Ind; Ref-Q=Coverage.Coverage Code).

Figure 31:
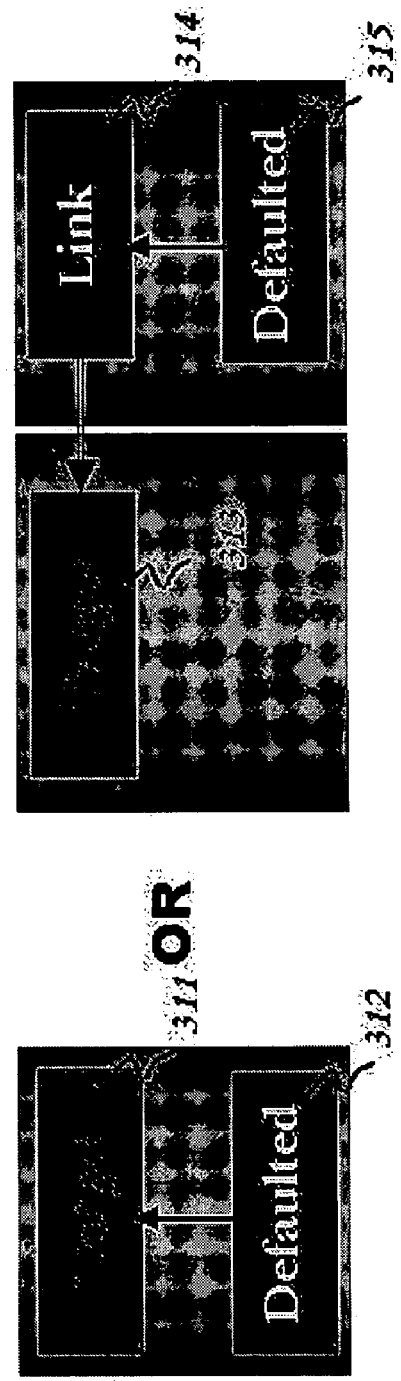
FIGS. 31–33 depict exemplary embodiments of a Defaulted Question Source according to another aspect of the present invention.

Turning to FIG. 31, A DEFAULTED Question acquires its initial answer by applying a formula to the answer of an Ancestor's or Extended Ancestor's Question which is called the Target Question. The answer of a Defaulted Question may be stored depending on the "Storage Code" property.

The Target Question is element 311 or 313. If the Target Question belongs to an Extended Ancestor, it must be specified via a Reference Question which is itself a link (element 314). The defaulted question is element 312 or 315. Only one Question Relation of type V is needed in either case.

Figure 32:
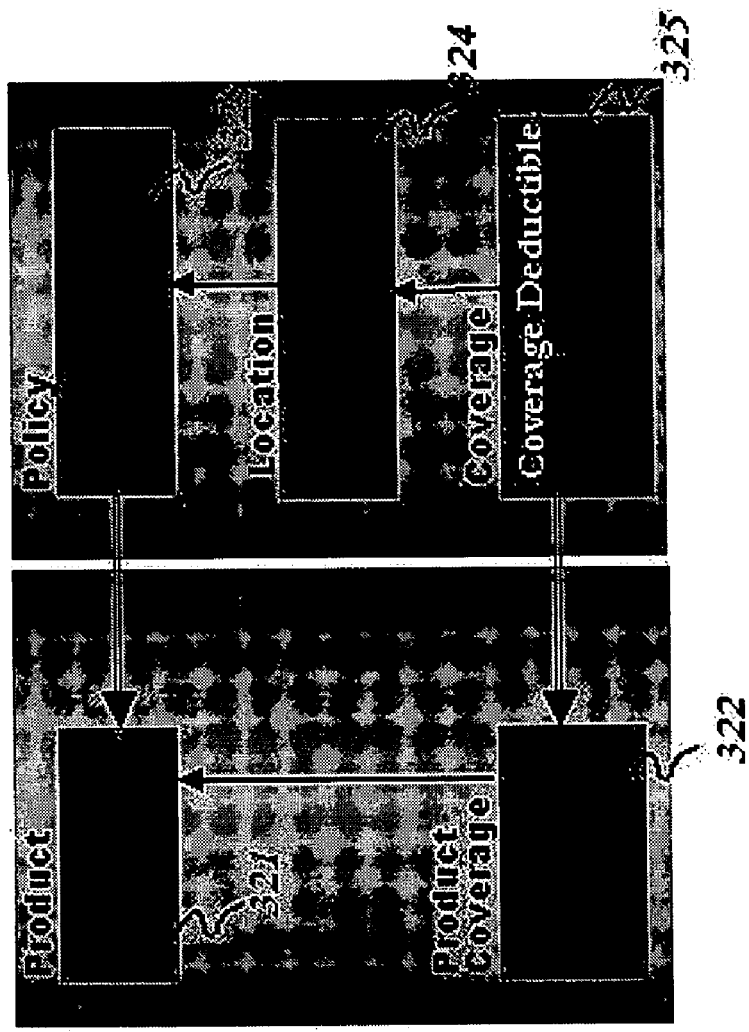

Turning to FIG. 32, the Defaulted Question is the Coverage Deductible (element 325). The Target Question is the Policy Deductible (element 323). One Question Relation row of type V is needed (Target-Q=Policy.Deductible).

Figure 33:
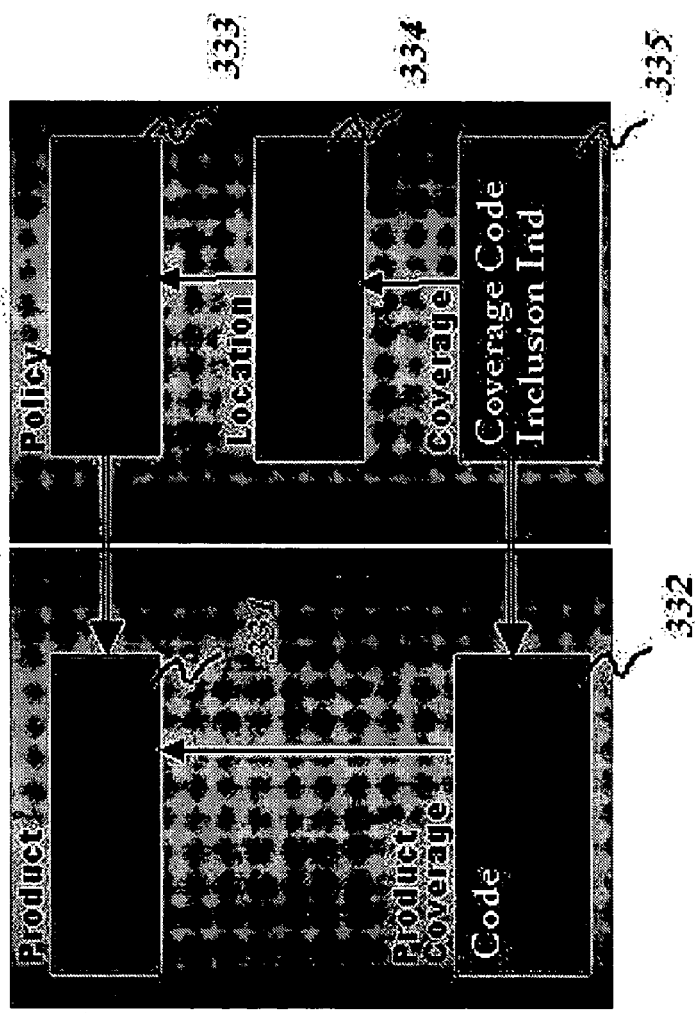

Turning to FIG. 33, the Defaulted Question is the Coverage Inclusion Ind (element 335). The Target Question is the Product Coverage Inclusion Ind (element 332). The Coverage Code is the link that is used to make the connection (Coverage Code in element 335). One Question Relation of type V is needed (where Target-Q=Product Coverage.Inclusion Ind and Ref-Q=Coverage.Coverage Code).

Variable Properties

Answer options and several other properties of Contract Questions are referred to as Variable Properties. Answer options of a Contract Question are set at the level of a designated Product Entity. For example, the answer options for the "Coverage limit" question may differ by the "Product Coverage Type". The remaining Variable Properties are set elsewhere but may be overridden at the level of the designated Product Entity. If a Contract Question requires Variable Properties, it must have a Question Relation of type A, which specifies another Contract Question (Target-Q) that provides the link to a particular occurrence of the Product Entity where the Variable Properties reside.

Figure 34:
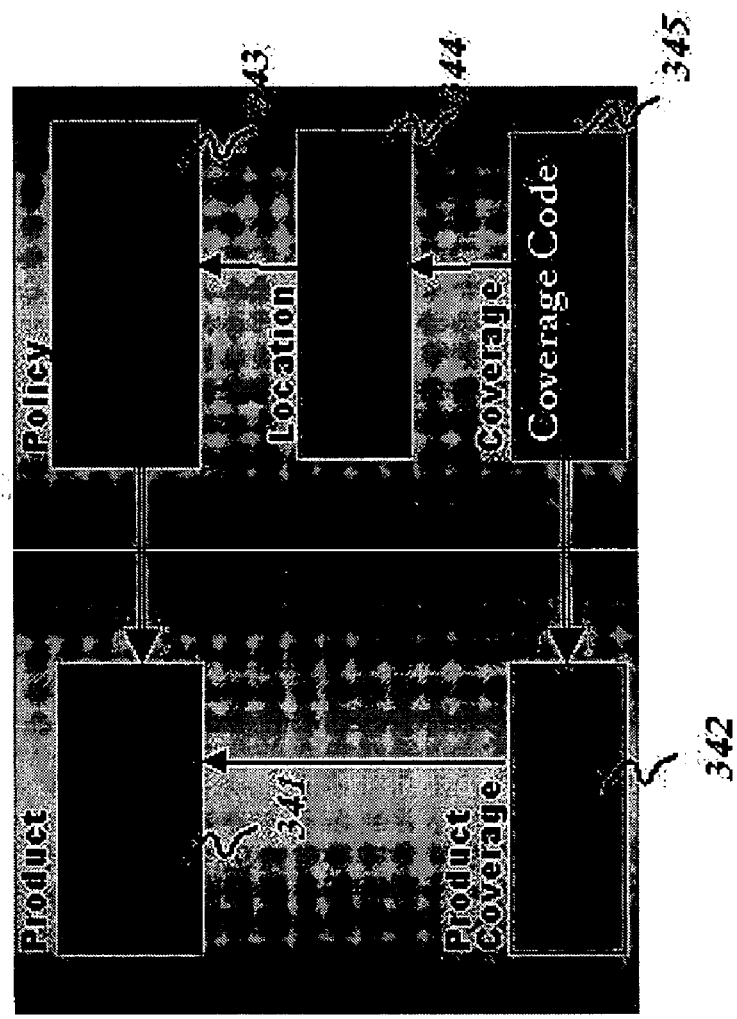
FIG. 34 depicts an exemplary embodiment of a Question Relation of Type A according to another aspect of the present invention.

Turning to FIG. 34, the Limit (element 345) is the Contract Question whose variable property level is being designated. In this case, the Question Relation has Coverage Code (Coverage code in element 345) as the Target-Q. Product Coverage (element 342) is the Product Entity that the Target-Q is linked to.

Summary

Although various embodiments are specifically illustrated and described herein, it will be appreciated that modifications and variations of the invention are covered by the above teachings and are within the purview of the appended claims without departing from the spirit and intended scope of the invention. For example, specific software languages and database types are mentioned, however, the scope of the present invention is not limited to these examples. Furthermore, these examples should not be interpreted to limit the modifications and variations of the invention covered by the claims but are merely illustrative of possible variations.

Appendix A

Entity
This table specifies details of each entity defined in the logical model. For e.g. PRODUCT, PRODUCT COVERAGE, POLICY, POLICY COVERAGE.

| Field Name | Attribute Definition | Description | Possible Values |
|---|---|---|---|
| Id | int | Uniquely Identifies a entity. | |
| Type | T 1 | Identifies the business process (Product Development, Contract Sale) this entity belongs to | P-Product, C-Contract |
| Name | T 50 | Long Descriptive Name of the entity | |
| Standard Reference Code | T 20 | Standard Tag that is associated with the Entity. An example of this is the ACCORD XML Tag. | |

Entity Ancestry
This table specifies the parent-child relationship between two entities in the conceptual model. For e.g., there is a parent-child relationship between POLICY & POLICY LOCATION.

| Field Name | Attribute Definition | Description | Possible Values |
|---|---|---|---|
| Id | N 15 | Unique identifier | |
| Parent-EntityId | FK | Identifies of the parent component of a parent-child/hierarchical relationship | |
| Child-EntityId | FK | Identifies of the child component of a parent-child/hierarchical relationship | |

Question
This table specifies each 'Question' associated with an Entity.

| Field Name | Attribute Definition | Description | Possible Values |
|---|---|---|---|
| EntityId | FK | Identifies the Entity that this question belongs to. | |
| Seq | int | Identifies the question within the Entity. With the EntityId, it uniquely identifies a question. | |
| Source | T 1 | Defines how the question's answer is obtained | N, L, D, F |
| Category | T 1 | Determines how the question can be used. All values besides Other, have a specific meaning to the system that have different logic in the system associated with them. A Question of Type C designates that it is the code, L designates that it is the Literal, S designates it is the display sequence number, D designates the long description for the Code. These are used in building dropdowns. A Question of type "O" is used for all other usage. | C, L, S, D, O |
| Domain | T 3 | Describes the answer type for the question. | TXT-Text, INT-Integer, REL-Real, IND-Indicator, DAT-Date, ZIP-Zip, FIL-File |
| Standard Reference Code | T 20 | Standard Tag that is associated with the Question. An example could be the ACCORD XML Tag. | |

-continued

| Field Name | Attribute Definition | Description | Possible Values |
|---|---|---|---|
| Storage Code | T 1 | Indicates if the answer should be stored. Values Include: Stored, Not Stored, Stored If different. "Stored if different" specifies that the answer for the question is created only if the entered value is different from default. | S, N, D |
| Default Value | T 50 | Default Answer that should be shown when the question is asked. The field will be set with this value and saved if the field is hidden when the details are added and submitted | |
| Answer Option Category | T 1 | Determines what types of answers options are possible (None, specific list, or range). | 0-No specific list of values or range<br>1-The possible values are specified in Answer Option or Product Answer Option, each value in a separate record<br>2-The range is specified using 'Range From', 'Range To' and 'Increment' in one record of the Answer Option or Product Answer Option. |
| Presentation Literal | T 50 | Text that is displayed on the screen for this question (the Label) | |
| Description | T 1000 | Textual description that describes the question and what it is used for. Could be used for documentation/reports in specification packages. | |

View

This table defines one presentation unit. An Interface (a web page or an external interface) consists of one or more Views. Each View consists of elements from one 'Entity'.

| Field Name | Attribute Definition | Description | Possible Values |
|---|---|---|---|
| View-Tag | T 20 | Business identifier for the view. This uniquely identifies a View. | |
| EntityId | FK | Business component for which this view belongs. Each View handles questions from only one Business Entity. | |
| V-Name | T 50 | Textual Description of the view | |

Contract Question By Product
This table specifies the properties for a Contract Question of a Product.

| Field Name | Attribute Definition | Description | Possible Values |
|---|---|---|---|
| Id | N 15 | Unique identifer | |
| EntityId | FK | Identifies the Entity for the Question | |
| QuestionSeq | FK | Identifies the question | |
| ProductId | FK | Identifies which product this question belongs | |
| Standard Reference Code | T 50 | Standard Tag that is associated with the Question. An example could be the ACCORD XML Tag. This overrides the value in QUESTION.. | |
| Answer Option Category | T 1 | Determines what types of answers options are possible (None, specific list, or range). This overrides the value in QUESTION. | 0-No specific list of values or range<br>1-The possible values are specified in Answer Option or Product Answer Option, each value in a separate record |

-continued

Contract Question By Product
This table specifies the properties for a Contract Question of a Product.

| Field Name | Attribute Definition | Description | Possible Values |
|---|---|---|---|
| Source | T 1 | Defines how the question's answer is obtained. This overrides the value in QUESTION. | 2-The range is specified using 'Range From', 'Range To' and 'Increment' in one record of the Answer Option or Product Answer Option. N, L, D, F |
| Storage Code | T 1 | Indicates if the answer should be stored. Values Include: Stored, Not Stored, Stored If different. This overrides the value in QUESTION. | S, N, D |
| Presentation Literal | T 50 | Text that is displayed on the screen for this question (the Label). This overrides the value in QUESTION. | |

Question Relation
This table specifies the relationship between two Questions.

| Field Name | Attribute Definition | Description | Possible Values |
|---|---|---|---|
| Id | N 15 | Unique identifier | |
| ProductId | FK | Identifies which product this question relation belongs. | |
| EntityId | FK | Identifies the Entity for the Question that the relation is defined for | |
| QuestionSeq | FK | Identifies the question that the relation is defined for | |
| Type | T 1 | Type of Relation | A, L, S, V |
| Target EntityId | FK | Identifies the Entity of the target Question | |
| Target QuestionSeq | FK | Identifies the target Question | |
| Ref EntityId | FK | Identifies the Entity of the reference Question | |
| Ref QuestionSeq | FK | Identifies the reference Question | |

View Item
This table defines each item in a View. The View Item can be an Image or a Literal (text) or a Question (label and control for data entry). The View Item specifies the presentation characteristics for each displayed element

| Field Name | Attribute Definition | Description | Possible Values |
|---|---|---|---|
| Id | N 15 | Unique identifier | |
| Seq No | Int 3 | Determines the order of appearance as well as the tab order of the fields on the screen. | |
| View-Tag | FK | Idenifies which View this Item belongs | |
| EntityId | FK | Identifies the Entity for the Question for the View Item | |
| QuestionSeq | FK | Identifies the question for the View Item | |
| ProductId | FK | Identifies which product this view item is associated to | |
| Type | T 1 | Identifies the type of the view item. Image, Literal, Question | I - Image<br>L - Lateral<br>Q - Question |
| Presentation Literal | T 1000 | This specifies the label displayed for the Question or the Literal to be displayed. | |
| Banner Width | Int 4 | Identifies the width of the column in pixels for a List view. | |

-continued

View Item
This table defines each item in a View. The View Item can be an Image or
a Literal (text) or a Question (label and control for data entry). The View Item
specifies the presentation characteristics for each displayed element

| Field Name | Attribute Definition | Description | Possible Values |
|---|---|---|---|
| Protection Code | T 2 | Show, Not protect<br>Show, Protected<br>Show, Protected on Change<br>Show when populated not protect<br>Show when populated protected<br>Hide (use default if applicable)<br>Hide, set to "missing" on Add | SN<br>SP<br>SC<br>CN (previously DN)<br>CP (previously DP)<br>HD<br>HM |
| Display Code | T 1 | Describes how an answer (or list of answers) should display itself on the presentation. Values include Code, Literal, and BothC - the field will be populated with the Code (e.g NY)L - the field will be populated with the Literal value (e.g. New York)B - the field will be populated with the concatenated value of the Code and the Literal (e.g. "NY New York") | C, L, B |
| Segment | Int 3 | Identifies what segment this question belongs to. Often, depending on the responses to a question, a different set of questions may need to be asked or the possible answer options may be different. In such cases the Detail Section should be organized into one with multiple segments. Instead of displaying all the questions at once, the questions will be displayed segment by segment in succession based on the responses to the questions. | |
| Length | Int 3 | Defines the length of the viewable area of the answer (how much of the answer can be seen). | |
| Max Length | Int 4 | Maximum length the field can have (the length is typically smaller . . . ) | |
| Default Value | T50 | If present, it specifies the overriding value for the Default value specified in QUESTION table for the question. | |
| Text Area Height | Int 3 | The number of viewable lines for the a text area | |
| Before Decimal Length | Int 2 | If it is a numeric field, defines the maximum number of digits before the decimal point (integer part) | |
| After Decimal Length | Int 2 | If it is a numeric field, defines the maximum number of digits after the decimal point (decimal part) | |
| Required Ind | T 1 | If it is Y, the field is a mandatory field. The system will not permit the user to submit the page until a valid value is entered in this field. | Y, N |
| Literal Start Row | Int 2 | Identifies what row the literal for the question should be placed | |
| Literal Row Span | Int 1 | Identifis how many rows the literal should span | |
| Literal Start Column | Int 2 | Identifies what column the literal for the question should be placed. | 0–9 (The main body is divided into 10 columns.) |
| Literal Column Span | Int 2 | Identifies how many columns the literal should span. | 1 to 10 |
| Literal Horizontal Alignment | T 10 | Identifies the justification for the literal text within the cell. | Left, Right, Center |
| Literal Vertical Alignment | T 10 | Identifies the how the literal text should be aligned. | Top, Middle, Bottom |
| Question Start Row | Int 1 | Identifies what row the answer should be placed | |
| Question Row Span | Int 1 | Identifis how many rows the answer should span | |
| Question Start Column | Int 1 | Identifies what column the answer should be placed. | 1 to 10 |
| Question Column Span | int 1 | Identifies how many columns the answer should span. | 1 to 10 |

View Item

This table defines each item in a View. The View Item can be an Image or a Literal (text) or a Question (label and control for data entry). The View Item specifies the presentation characteristics for each displayed element

| Field Name | Attribute Definition | Description | Possible Values |
|---|---|---|---|
| Question Horizontal Alignment | T 10 | Identifies the justification for the answer within the cell. | Left, Right, Center |
| Question Vertical Alignment | T 10 | Identifies the how the answer should be aligned. | Top, Middle, Bottom |
| Question Control Type | T 20 | Identifies what type of control should be used on the presentation to capture the answer. | COMBO, LIST, LITERAL, RADIO, CHECKBOX, TEXT, TEXTAREA |
| Question Format | T 20 | Identifies what format the numeric fields should have. DATE1 (##/##/####), ZIP4 (#####-####), SS (###-##-####) COMMA (#,###), USCUR ($###,###.##), PHONE (###) ###-####. Other types most likely will be added in the future | DATE1, ZIP4, SS, COMMA, USCUR, PHONE |
| Image Width | N 4 | The width in pixels of the image | |

View Item Dependency Line

This table defines the dependencies or the condition under which the the View Item (display element) is presented. This provides a way by which a display element can be presented only under certain conditions. Dependency Line along with Dependency Value enables specification of any complex expression. The Dependency Expression is a complex boolean expression with the left side operand is a Question and the right side operand can be a literal or a Question. The comparison operator can be one of <, >, <=, >=, <>, =. The operations can be grouped by appropriate parentheses. For example a valid expression is ((Coverage = C1 or C2 or C3) AND (Vehicle Type = T1 or T2 or T3)).

| Field Name | Attribute Definition | Description | Possible Values |
|---|---|---|---|
| ID | N 15 | Unique identifier for the instance | |
| View Item Id | FK | Identifies the View Item that is the subject of this dependency | |
| Seq-No | T 8 | Defines the order in which the expression is built. | |
| O-Paran-Cnt | Int 2 | # of open parenthesis that precede the line | |
| Primary EntityId | FK | Identifies the Entity of the Primary Question whose value will be used to evaluate the dependency | |
| Primary QuestionSeq | FK | Identifies the Primary Question whose value will is used to evaluate the dependency | |
| C-Operator | T 2 | Comparison Operator | <, > <=, >=, <>, =, ispresent, isnotpresent |
| C-Paran-Cnt | Int 2 | # of closed parentheeis that follow the line | |
| AndOr | T 3 | Identifies how this dependency line should be resolved with the next dependency line | AND, OR |

Dependency Value
This table defines the set of values that need to be satisfied with Dependency Line Primary Q. Each instance specifies one value of the OR expression (in the example C1, C2 and C3). Each value may be a constant or another Question (specified here as the Secondary Question)

| Field Name | Attribute Definition | Description | Possible Values |
|---|---|---|---|
| View Item Dependency Line Id | FK | Foreign key to Dependency Line | |
| Seq-No | Int 4 | Sequence number to identify the occurrence. Along with DL ID, it uniquely identifies the occurrence. | |
| Secondary EntityId | FK | Identifies the Entity of the Secondary Question whose value will be compared against the Primary Question in Dependency Line | |
| Secondary QuestionSeq | FK | Identifies the Secondary Question whose value will be compared against the Primary Question in Dependency Line | |
| Value | t 20 | Literal Value of the question that should be used in the determination of the dependency. | In the example above C1, C2, C3, T1, T2 and T3 are the literal values used for comparison. |

Master Product Occurrence
This table contains one record for every instance of a Product.

| Field Name | Attribute Definition | Description | Possible Values |
|---|---|---|---|
| ProductId | N 15 | Unique identifier for the Product. | |

Product Occurrence
This table contains one record for each occurrence of each entity in the Product hierarchy.

| Field Name | Attribute Definition | Description | Possible Values |
|---|---|---|---|
| P-Id | N 15 | Unique identifier | |
| ProductId | FK | Identifies the Product that this Product occurrence belongs to. | |
| EntityId | FK | Identifies the Entity for the Occurrence | |

Product Ancestry
Identifies the parent-child relationships between Product Occurrences.

| Field Name | Attribute Definition | Description | Possible Values |
|---|---|---|---|
| Id | N 15 | Unique identifier | |
| Parent-P-Id | FK | Product occurrence identifier of the parent. | |
| Child-P-Id | FK | Product occurrence identifier of the child. | |

Product Answer
This table contains the values for the individual attributes of a Product Occurrence.

| Field Name | Attribute Definition | Description | Possible Values |
|---|---|---|---|
| PA-Id | N 15 | Unique identifier | |
| P-Id | FK | Identifies which Product Occurrence this answer is for | |
| EntityId | FK | Identifies the Entity for the Answer | |
| QuestionSeq | FK | Identifies the question for the Answer | |
| Q-Category | T 1 | (Denormalized field from the Question Table) | |
| Value | T 20 | Value of the Answer (if longer than 20, then the value is stored in Long Product Answer Value) | |
| AO id | FK | If the value of the Answer for the product side entity's attribute is a discrete value chosen from an Answer Option list, this field specifies the id of that answer option. | |
| User ID | T 20 | The logon user ID of the user who created this Answer | |
| Timestamp | Timestamp | The date and time this Answer was created | |

Long Product Answer
This table contains the Product Answer value if the Product Answer's size exceeds 20 characters.

| Field Name | Attribute Definition | Description | Possible Values |
|---|---|---|---|
| PA-Id | N 15 | Foreign key to Product Answer | |
| Value | T 1000 | Value of the Answer | |

Contract Question By Product Occurrence
This table specifies the overriding values for presentation characteristics of a Question based on Product Occurrence.

| Field Name | Attribute Definition | Description | Possible Values |
|---|---|---|---|
| PO-Id | N 15 | Unique identifier | |
| EntityId | FK | Identifies the Entity for the Question | |
| QuestionSeq | FK | Identifies the Question | |
| Answer Option Category | T 1 | Determines what types of answers options are possible (None, specific list, or range). | 0-No specific list of values or range<br>1-The possible values are specified in Product Answer Option, each value in a separate record<br>2-The range is specified using 'Range From', 'Range To' and 'Increment' in one record of the Product Answer Option. |
| Default Value | T50 | This field should be always specified. It cannot be null/empty. It specifies the Default value for the contract question as applicable in a product. | |
| Presentation Literal | T 1000 | This field is normally empty/null. If a valid value is present it specifies the label displayed for the Question or the Literal to be displayed. | |
| Protection Code | T 2 | This field is normally empty/null. If a valid value is present it specifies Protection Code for the field as applicable to the product. (See View Item) | |
| Display Code | T 1 | This field is normally empty/null. If a valid value is present it specifies how an answer (or list of answers) should display itself on the presentation. (See View Item) | |
| Required Indicator | T 1 | This field is normally empty/null. If a valid value is present it specifies whether or not the field is a mandatory field. | Y, N |
| Question Control Type | T 20 | This field is normally empty/null. If a valid value is present it specifies the type of control that should be used on the presentation to capture the answer. (See View Item) | |
| Question Format | T 20 | This field is normally empty/null. If a valid value is present it specifies the format the field should have. (See View Item) | |

Product Answer Option
This table specifies the possible values for a the Answer of a Question relative to a particular Product Occurrence. Question. If the Product Occurrence Question Answer Option Category is 1(specific list), each possible value is specified in this table, one record per value. If it is 2 (ranges of values), then each range must be specified in one record using From, To and Increment.

| Field Name | Attribute Definition | Description | Possible Values |
|---|---|---|---|
| PAO-id | N15 | Unique identifier | |
| PO-Id | FK | Identifies which Product Occurrence Option this answer options belongs to | |
| AO-Id | FK | Identifier of the Answer Option this Product Answer Option is linked. | |
| Sequence Number | Int 4 | sets the order in which the answers should be displayed in a dropdown | |
| Value | T 20 | This field specifies the Value that is to be stored in the Contract Answer area | e.g. "NJ" |

Product Answer Option

This table specifies the possible values for a the Answer of a Question relative to a particular Product Occurrence. Question. If the Product Occurrence Question Answer Option Category is 1(specific list), each possible value is specified in this table, one record per value. If it is 2 (ranges of values), then each range must be specified in one record using From, To and Increment.

| Field Name | Attribute Definition | Description | Possible Values |
|---|---|---|---|
| Literal | T 50 | This field specifies the literal text that needs to be displayed in the dropdown. | e.g. "New Jersey" |
| Description | T 1000 | Textual description for the answer. Usually used in help text areas | |
| From | Dec | Starting value of the allowed range of values. The range includes this value. | |
| To | Dec | Ending value of the allowed range of values. The range includes this value. | |
| Increment | Dec | The increment for the range of discrete values. | |

Answer Option (AO)

This table specifies the possible values for all Questions including variations by Product. If the Question Answer Option Category is 1(specific list), each possible value is specified in this table, one record per value. If it is 2 (ranges of values), then each range must be specified in one record using From, To and Increment.

| Field Name | Attribute Definition | Description | Possible Values |
|---|---|---|---|
| AO-Id | N 15 | Unique identifier | |
| Q-Tag | FK | Identifies which quesiton (B-Tag and Q-Seq) this answer option belongs to | |
| Sequence Number | Int 4 | sets the order in which the answers should be displayed in the dropdown | |
| Value | T 20 | Value that is to be stored in the Contract or Product Answer | e.g. "NJ" |
| Literal | T 50 | Textual answer that is displayed in the dropdown boxes for the answer | e.g. "New Jersey" |
| Description | T 1000 | Textual description for the answer. Usually used in help text areas | |
| From | Dec | Starting value of the allowed range of values. The range includes this value. | |
| To | Dec | Ending value of the allowed range of values. The range includes this value. | |
| Increment | Dec | The increment for the range of discrete values. | |

Master Contract Occurrence

This table contains one record for every instance of a Contract. This record ties together all the details for the Contract.

| Field Name | Attribute Definition | Description | Possible Values |
|---|---|---|---|
| ContractID | N 15 | Unique identifier for the Contract. | |

Contract Occurrence (C)

This table contains one record for each occurrence of each entity in the Contract hierarchy.

| Field Name | Attribute Definition | Description | Possible Values |
|---|---|---|---|
| C-Id | N 15 | Unique identifier for the policy side entity type occurrence. | |
| ContractID | FK | Identifies the Contract this Contract Occurrence belongs to | |
| EntityId | FK | Identifies the Entity for the Occurrence | |

Contract Ancestry
Identifies the parent-child relationships between Contract Occurrences.

| Field Name | Attribute Definition | Description | Possible Values |
|---|---|---|---|
| Id | N 15 | Unique identifier | |
| Parent-Id | FK | Contract occurrence identifier of the parent | |
| Child-Id | FK | Contract occurrence identifier of the child | |

Contract Answer (CA)
This table contains the values for the individual attributes of a Contract Occurrence.

| Field Name | Attribute Definition | Description | Possible Values |
|---|---|---|---|
| CA-Id | N 15 | Unique identifier | |
| C-Id | FK | Identifies which Contract Occurrence this answer is for. Each logical record of every policy side entity type is identified by this ID. | |
| EntityId | FK | Identifies the Entity for the Answer | |
| QuestionSeq | FK | Identifies the question for the Answer | |
| Value | T 20 | Value of the Answer (if longer than 20, then the value is stored in Long Contract Answer Value) | |
| PAO ID | FK | If the value of the Answer for the policy side entity's attribute is a discrete value chosen from a Product Answer Option list, this field specifies the id of that answer option. | |
| User ID | T 20 | The logon user ID of the user who created this Answer | |
| Timestamp | Timestamp | The date and time this Answer was created | |

Long Contract Answer
This table contains the Contract Answer value if the Contract Answer's size exceeds 20 characters

| Field Name | Attribute Definition | Description | Possible Values |
|---|---|---|---|
| CA-Id | N 15 | Foreign key to Product Answer | |
| Value | T1000 | Value of the Answer | |

What is claimed is:

1. A computer readable media have encoded thereon a software application that can be adapted to varying business requirements, said software application comprising:
   a plurality of adaptive units adapted to intact with a user and each of said plurality of adaptive units further being programmed to:
   utilize data from a definition database as parameters that govern operations for capturing, manipulating and storing of information;
   store and retrieve information in an occurrence database including meta-model based tables;
   and accommodate storing new data fields in the occurrence database without requiring restructuring said occurrence database.

2. A method for adapting a software application to varying business requirements comprising:
   providing a plurality of adaptive units adapted to interact with a user, perform data manipulation functions, and data persistence functions, said adaptive units: utilizing data from an external source as parameters that govern operations for capturing, manipulating and storing information;
   storing and retrieving information in an occurrence database including meta-model based tables; and
   accommodating storage of new data fields in the occurrence database without requiring restructuring said occurrence database.

* * * * *